(12) United States Patent
Velloso Mohedano

(10) Patent No.: US 12,152,508 B2
(45) Date of Patent: *Nov. 26, 2024

(54) FACILITY FOR GENERATING MECHANICAL ENERGY BY MEANS OF A COMBINED POWER CYCLE

(71) Applicant: Javier Carlos Velloso Mohedano, Villanueva de la Canada (ES)

(72) Inventor: Javier Carlos Velloso Mohedano, Villanueva de la Canada (ES)

(*) Notice: Subject to any disclaimer, the term of this patent is extended or adjusted under 35 U.S.C. 154(b) by 381 days.

This patent is subject to a terminal disclaimer.

(21) Appl. No.: 17/577,710

(22) Filed: Jan. 18, 2022

(65) Prior Publication Data

US 2022/0136414 A1 May 5, 2022

Related U.S. Application Data

(63) Continuation-in-part of application No. 17/262,187, filed as application No. PCT/ES2019/070511 on Jul. 22, 2019, now Pat. No. 11,248,499.

(30) Foreign Application Priority Data

Jul. 23, 2018 (ES) .................................. 2018 30747

(51) Int. Cl.
*F01K 21/04* (2006.01)
*F01K 7/22* (2006.01)
(Continued)

(52) U.S. Cl.
CPC .............. *F01K 21/047* (2013.01); *F01K 7/22* (2013.01); *F01K 7/32* (2013.01); *F01K 9/02* (2013.01);
(Continued)

(58) Field of Classification Search
CPC ........ F01K 21/00; F01K 21/04; F01K 21/042; F01K 21/045; F01K 21/047;
(Continued)

(56) References Cited

U.S. PATENT DOCUMENTS 3,978,661 A * 9/1976 Cheng ................... F01K 21/047
60/39.5
4,292,809 A * 10/1981 Bjorklund ............... F01K 9/023
60/676

(Continued)

FOREIGN PATENT DOCUMENTS

ES 2439619 1/2014
WO WO-2014008531 A2 * 1/2014 ............. F01K 21/04
(Continued)

*Primary Examiner* — Mark A Laurenzi
*Assistant Examiner* — Xiaoting Hu
(74) *Attorney, Agent, or Firm* — Emerson Thomson Bennett; Daniel A. Thomson

(57) ABSTRACT

A facility for generating mechanical energy by means of a combined power cycle is disclosed herein, which includes at least means for carrying out a closed or semi-closed, constituent regenerative Brayton cycle, which uses water as a heat-transfer fluid, means for carrying out at least one Rankine cycle, a constituent fundamental Rankine cycle, interconnected with the regenerative Brayton cycle, and a heat pump (UAX) including a closed circuit that regenerates the constituent regenerative Brayton cycle, as well as to the method for generating energy using the facility.

49 Claims, 9 Drawing Sheets

(51) Int. Cl.
*F01K 7/32* (2006.01)
*F01K 9/02* (2006.01)
*F01K 17/00* (2006.01)
*F01K 23/10* (2006.01)
*F01K 23/14* (2006.01)
*F01K 23/16* (2006.01)
*F01K 25/10* (2006.01)
*F02C 1/00* (2006.01)

(52) U.S. Cl.
CPC ............ *F01K 17/005* (2013.01); *F01K 23/10* (2013.01); *F01K 23/14* (2013.01); *F01K 23/16* (2013.01); *F01K 25/106* (2013.01); *F02C 1/007* (2013.01); *Y02E 20/16* (2013.01)

(58) Field of Classification Search
CPC ........ F01K 17/005; F01K 23/00; F01K 23/02; F01K 23/04; F01K 23/06; F01K 23/08; F01K 23/10; F01K 23/12; F01K 23/14; F01K 23/16; F01K 9/00; F01K 9/02; F01K 7/22; F02C 1/007; Y02E 20/16
See application file for complete search history.

(56) References Cited

U.S. PATENT DOCUMENTS

| | | | | |
|---|---|---|---|---|
| 4,841,721 A * | 6/1989 | Patton | ................... | F01K 21/047 60/39.181 |
| 6,148,602 A * | 11/2000 | Demetri | ............... | F25J 3/04612 60/39.12 |
| 9,038,390 B1 * | 5/2015 | Kreuger | ................... | F03G 6/005 60/670 |
| 2002/0023423 A1 * | 2/2002 | Viteri | ........................ | F02C 6/18 60/39.182 |
| 2008/0041057 A1 * | 2/2008 | Thomas | .................. | F01D 15/00 60/683 |
| 2010/0287934 A1 * | 11/2010 | Glynn | ................... | F28D 20/026 60/645 |
| 2010/0319354 A1 * | 12/2010 | Guidati | ..................... | F02C 3/34 60/39.182 |
| 2011/0252796 A1 * | 10/2011 | Burkhart | ................. | F01K 27/00 60/641.2 |
| 2012/0279220 A1 * | 11/2012 | Palmer | .................... | F01K 25/06 60/645 |
| 2013/0074499 A1 * | 3/2013 | Palmer | .................. | F01K 17/005 60/645 |
| 2013/0312414 A1 * | 11/2013 | Palmer | .................. | F01K 17/005 60/692 |
| 2013/0340434 A1 * | 12/2013 | Palmer | .................... | F01K 19/04 60/676 |
| 2014/0026573 A1 * | 1/2014 | Palmer | .................... | F01K 19/04 60/671 |
| 2017/0009605 A1 * | 1/2017 | Corbishley | ........... | F01K 25/005 |

FOREIGN PATENT DOCUMENTS

| | | |
|---|---|---|
| WO | 2018096217 | 5/2018 |
| WO | WO-2018096217 A1 * | 5/2018 |
| WO | 2020021140 | 1/2020 |

* cited by examiner

FACILITY FOR GENERATING MECHANICAL ENERGY BY MEANS OF A COMBINED POWER CYCLE

CROSS-REFERENCE TO RELATED APPLICATIONS

This application is a continuation-in-part of and claims priority to U.S. application Ser. No. 17/262,187, filed on Jan. 21, 2021, which is in turn, a national phase entry of and claims priority to PCT application No. PCT/ES/2019070511, filed on 22 Jul. 2019, which in turn, claims priority to Spanish Application No. P201830747, filed on Jul. 23, 2018. The entire contents of each of these applications is incorporated herein by reference.

FIELD

The field of application of the present teaching lies in the industrial sector dedicated to generating mechanical energy for use and conversion into other types of energy.

STATE OF THE ART

At the moment, the so-called "combined cycles" are one of the most efficient and eco-friendly technologies for generating energy that exist. A combined cycle is a procedure for generating energy by associating two coupled thermodynamic cycles to enhance the performance.

In the current state of the art for combined cycles to generate mechanical energy and its possible transformation into other types of energy, there is a need to improve the efficiency and reduce the discharges of greenhouse gases into the atmosphere.

One installation to implement a combined cycle consists of a gas turbine operating an open Brayton cycle in which the hot exhaust gases pass through a heat recovery boiler, where steam is generated which is applied to a turbine that generates additional mechanical work following an independent Rankine cycle.

The most common combined cycle power plants work with gas turbines which take in outside air which, after pressurization in a compressor, passes to a combustion chamber where the fuel is burned. The exhaust gases from this leave the burner at a high temperature with excess air, constituting the thermal fluid of an open Brayton cycle, which is expanded in a gas turbine, generating mechanical work. Finally, the turbine gases leave the boiler and are expelled to the atmosphere through a chimney.

The fact that a compressor takes in outside air and that the combustion gases end up discharged into the atmosphere without returning to the cycle means that these are open Brayton cycles, because there is an interchange of matter with the atmosphere.

Therefore, and despite their simplicity, these open cycles have the drawback that they imply the emission of polluting gases, as the combustion products end up discarded into the atmosphere. These polluting gases are fundamentally $CO_2$ and NOx (always provided that the composition of the fuel is sulfur-free). The proportion of $CO_2$ discharged during combustion depends directly on the kind of fuel burned. Currently, natural gas is the most commonly used fuel in the industry in gas turbines because, among other reasons, the methane this fuel contains is the hydrocarbon which produces the least $CO_2$ per unit of work generated.

Moreover, the production of NOx increases fundamentally as the combustion temperature does. Obviously, this creates a conflict of interest with a trade-off between efficiency and environmental impact, as according to the principles of thermodynamics, increasing the combustion temperature boosts performance, but this on the other hand leads to a rise in the emissions of NOx.

The ultimate objective, which would overcome the problems afflicting the state of the art, is to devise a cycle which basically produces mechanical energy, that does not emit any greenhouse gases into the atmosphere, and which offers better performance than what is currently obtained in other conventional combined cycles.

The present teaching refers to an installation to execute a combined cycle process which uses water as thermal fluid, to generate mechanical energy, and which is specifically devised to operate a closed cycle, or to perform a process based on internal oxy-combustion in which there is at least one Rankine cycle which operates in an integrated way with a Brayton cycle variant which is regenerated using a heat pump which interchanges this heat energy (between the Brayton cycle and the heat pump there is no interchange of material), and in such a way that by combining the two cited constituent cycles, mechanical energy is generated with no need to emit greenhouse gases into the atmosphere.

One alternative for avoiding the emission of polluting gases into the atmosphere consists of using combined cycles which operate as closed cycles. In other words, in these cycles the thermal fluid is recirculated and does not need to be replenished, and nor does it come into contact with the atmosphere. Nevertheless, whenever the heat source of the cycle is energy from internal combustion, certain chemical reactants (fuel and comburent) are added continuously, while it is necessary to eliminate the products generated by the chemical combustion reaction from the cycle. This poses important economic, technical, and environmental challenges, especially in relation to the continuous separation of the combustion products within the gaseous phase which acts as thermal fluid. Another drawback is that, as air is not used as comburent, closed cycles require pure oxygen to carry out the process of combustion, and so they depend on some kind of auxiliary process which furnishes this.

An effective way to raise the efficiency of the Brayton cycle is by "Regeneration", with which part of the heating of the cycle is carried out using a source of heat internal to the cycle itself.

As a result of "Regeneration", we attain improved performance for the cycle because the amount of external heat which is supplied to the cycle is reduced, while the amount of waste heat the cycle releases into the environment is reduced.

The term "Regenerative Brayton Cycle" refers to a Brayton cycle which recovers some of the heat given off by the hot gases after the turbine and transfers it, using a heat exchanger, to the compressed gases prior to their entry into the burner. Nonetheless, this method of regeneration is not the only one, as it is also feasible to "regenerate" a Brayton cycle using any other procedure capable of recouping heat from some part of the cycle to reintroduce it back into the process.

One of the innovative aspects of the present teaching is that it includes the means necessary to implement a regenerated Brayton cycle using a "heat pump" connected to one or more Rankine cycles, giving rise to a combined cycle installation with unusual characteristics.

In thermodynamics, a "heat pump" is defined to be any refrigerating machine which takes thermal energy from one body and transfers it to another which is at a higher temperature, thanks to an amount of energy supplied from outside (generally as mechanical work from compression). It can be considered for all purposes that a refrigerating machine is the same thing as a heat pump, and the two terms are employed without distinction, or considering the intended application.

At an industrial level, there exist two types of refrigerating machines or heat pumps, depending on the type of technology they employ: compression refrigerating machines and absorption refrigerating machines. These two types of machine (compression or absorption) have in common that both have a condenser (hot reservoir) and an evaporator (cold reservoir) separated by an expansion device. However, they differ in the manner and type of energy used to make the cold and hot reservoirs operate at different pressures. Compression refrigerating machines use a gas compressor which consumes mechanical work taken from outside, whereas what absorption machines require to operate, basically, is a supply from an external heat source, and these machines are based on the physico-chemical principle of absorption/desorption of a gas in a liquid.

Conventional "absorption" machines can dispense with a compressor, because an "Absorber/Generator" system, with no need for mechanical means, looks after generating the differential pressure, which is required, by making the absorber and evaporator work at a lower pressure than that of the generator and condenser.

Instead of needing compression work to operate, absorption machines require an additional amount of heat to carry out the operation of "desorption" (evaporation of the dissolved gas). Ultimately, this additional amount of heat is eliminated when the reverse process of "absorption" takes place. This additional loss of heat is the reason why, comparatively speaking, absorption machines lose and require more energy to work than compression machines, so that their energy efficiency always turns out to be relatively low. Nevertheless, absorption machines do have the advantage that, except for the solution pump, they need virtually no mechanical work to operate.

The applicability of a "heat pump" to assist the regeneration in the Combined Cycle of the system is severely limited by a series of inescapable thermodynamic constraints, on the one hand, and on the other, by the particular requirements of the operation demanded of it. In other words, a Brayton cycle cannot be regenerated with just some arbitrary heat pump.

For a certain heat pump to be helpful to "regenerate" a Brayton cycle as is proposed here, it satisfies the following requirements:
  the "cold reservoir" of the heat pump works at temperatures close to that of the condensation of water vapor at atmospheric pressure.
  the temperature difference between the cold and hot reservoirs is sizeable enough (several tens of degrees Celsius) to regenerate a vapor at a pressure significantly greater than that at which it was previously condensed.
  the mechanical compression energy is taken from and returned to the Brayton cycle which is being regenerated.
  the performance of the cooling cycle is sufficiently high for this manner of regenerating part of the Combined Cycle to be worthwhile.

The installation working according to the Combined Cycle, which is the object of the present teaching offers, on the one hand, greater efficiency than that of conventional combined cycles and on the other hand, an intrinsic capture of the $CO_2$ (carbon dioxide) when any of the thermal Sources providing heat to the Combined Cycle is made up of a burner. The installation of the present teaching and the procedure conducted with it implicitly offer a carbon dioxide separation-capture system.

It is understood that a Combined Cycle "intrinsically captures CO2" when this gas from combustion is obtained by a single point of the cycle, concentrated and confined (whether in liquid or gaseous form), without any specific additional process other than the normal functioning of the cycle itself for generating useful energy being required. When fuels are used as a source of energy, the functioning of the installation itself separates and confines the polluting gases and prevents them from coming into contact with the atmosphere. On the other hand, when water is generated as a combustion product, this, on the other hand, is eliminated from the Combined Cycle in liquid phase and at ambient pressure.

In conventional combined cycles, each constituent cycle (Brayton and Rankine) uses a particular thermal fluid and, specifically, its Brayton cycle exchanges matter and energy with the atmosphere.

On the other hand, the constituent Brayton cycle and the constituent basic Rankine cycle which comprise this Combined Cycle work in a coupled manner, exchanging matter (given that both use water as common thermal fluid) and energy, in such a way as to make up a single Cycle in its own right for the generation of mechanical energy and with unusual characteristics.

One characteristic of this Combined Cycle is, if we except the inevitable "real losses", heat is only lost to the outside through a single heat sink, and as a consequence, better performance is obtained than in other conventional combined cycles.

Considering that the constituent Brayton and Rankine cycles making up the Combined Cycle of the present teaching possess particular characteristics which set them apart from these thermodynamic cycles in certain essential aspects, the terms "Brayton cycle" and "Rankine cycle", when referring to the sections which comprise the overall Combined Cycle, are not strictly correct, because they differ from these cycles in certain fundamental ways (for example, Brayton cycles, by definition, do not work with a condensable fluid). Nevertheless, it is the case the Combined Cycle of the present teaching consists of variants or modifications of the two cycles—Brayton and Rankine- and they do work in a mutually interconnected way. This is why in this report we refer to these modified Brayton and Rankine cycles, always accompanied by the word "constituent", to prevent confusion and facilitate comprehension and identification of the components being referred to.

DEFINITIONS

HEAT PUMP: Absorber unit for exchanging heat. This is the system which performs the duties of the "heat pump", assisting in the regeneration of this Combined Power Cycle. The Heat Pump, as an independent operational unit, is identified by the number (200). It is employed to regenerate the constituent Brayton cycle. The Heat Pump (200), although it does not interchange matter with the Combined Power Cycle, works in "symbiosis" with it, and is an indispensable system for the Combined Cycle for the generation of mechanical energy to work. The Heat Pump is an essential component of the installation of the present teaching which works with ammonia and water.

Concentrated solution: this is the solution of ammonia in water which emerges from the Absorber. A UAX is a particular type of heat pump that is possible to use in the installation and procedure of the present teaching. Commercial heat pumps can be used on condition that they are able to work in the temperature range of 80 to 120° C. in the cold reservoir, and, obviously, higher temperature in the hot reservoir.

Dilute solution: this is the solution of ammonia in water which emerges from the Generator (201).

Intermediate concentration solution: this is the solution of ammonia in water which emerges from the Generator (202) and which enters the Generator (201).

Combined Cycle: Unless otherwise specified, the term "Combined Cycle" refers to the cycle, which is the object of the present teaching, whose purpose is to obtain mechanical energy from heat energy. In this report, the terms "Combined Cycle", "Power Cycle" and "Combined Power Cycle" are used without distinction. The term "conventional combined cycle" is employed herein to refer to any possible combined cycle from the current state of the art.

Regenerative Cycle: This is a cycle with a system of heat exchangers to "regenerate" it, in that some of the heating of the cycle is carried out using a source of heat internal to the cycle itself.

Constituent Brayton Cycle: This is the part of the Power Cycle of the present teaching which is regenerated by the Heat Pump (for example, UAX) (200). The functioning of this part of the Power Cycle is based on a modification to the Brayton cycle, which in the present teaching possesses particular specific characteristics as a condensable fluid (water) is used, it works interconnectedly with a Rankine cycle and it is regenerated by a Heat Pump (for example, UAX) (200).

Constituent Basic Rankine Cycle: This is the part of the Power Cycle of the present teaching which is driven by the Feedwater Pump (119) and by the Turbine TAP (122). The functioning of this part of the Power Cycle is based on a Rankine cycle, although in the present teaching the "Basic Rankine Cycle" possesses particular specific characteristics as it works interconnectedly with a "Constituent Brayton Cycle" and the two share certain common elements. The Constituent Basic Rankine Cycle is an essential part of the Power Cycle.

Secondary Rankine Cycle: This is an auxiliary Rankine cycle: in other words, it is not a system essential to the Power Cycle. In the configurations of the Combined Cycle which have a "Secondary Rankine Cycle", its Condenser (128) always performs the essential function of "heat sink". The "Secondary Rankine Cycle" is characterized by having its own Turbine TBP (127) and because it always works at lower pressure than the Constituent Basic Rankine Cycle.

Open cycle: This is a cycle in which the thermal fluid is not recycled but is renewed constantly. In open cycles, there exists at least one point where fluid enters from outside, and another where fluid leaves the cycle to the outside.

Closed cycle: Cycle in which thermal fluid neither enters nor leaves, in which the supply of outside heat always takes place through heat exchangers, so there is no interchange of the fluid material in the cycle with the outside. The Combined Power Cycle is closed when it contains no burner which provides energy to it.

External combustion cycle: This is a closed cycle where the source supplying heat is a combustion process taking place outside the cycle.

Internal combustion cycle: This is a closed cycle where the source supplying heat is a combustion process in which the products of the chemical reaction make up or form part of the thermal fluid.

Oxy-combustion: This is a combustion process in which the comburent used is not air, but rather pure oxygen diluted in the thermal fluid itself (water vapor in the present teaching).

Semi-closed cycle: In the present teaching, this term is used for a cycle which is simultaneously an internal combustion and oxy-combustion one and in which, moreover, the thermal fluid is recycled once the combustion products have been eliminated from it.

CoP: The CoP (Coefficient of Performance) of a "heat pump" is defined to be the ratio or quotient yielded by dividing the useful heat energy transferred by the energy added to achieve this. In other words, the CoP is the coefficient determining the performance of any refrigerating machine. The notion of CoP changes according as the machine is a compression one (in which the energy added is the mechanical work consumed by the compressor) or an absorption one (in which the energy added is basically heat supplied to the generator).

Installation: Mechanical energy generator arrangement made up of the Combined Power Cycle and the Heat Pump (for example, UAX) (200).

Heat exchanger element: Either of the sides making up a heat exchanger, without regard to whether it receives or gives off heat. Any heat exchanger is made up of at least two elements. In the present teaching, the term "Element", accompanied by the number which identifies it explicitly, is used for brevity. In the present teaching, any heat exchanger is identified by indicating the numbers of the two or more "Elements" comprising it.

Coil: Heat exchanger element made up of tubular pipes, in any kind of configuration. In the present teaching, this term is used to refer to the element of an exchanger which works at higher pressure. The functioning may under no circumstances be linked to the shape of the heat exchanger element so referred to.

Shell Side of a Heat Exchanger: This term is employed herein to refer to an element of an exchanger which works at lower pressure, and which contains the Heat Exchanger Element working at higher pressure inside it.

Condensation Exchanger: This is a heat exchanger in which condensation (partial or total) of the water vapor circulating through the "Shell Side" Element takes place. This condensation heat is transferred to one or more coils or exchanger elements to raise the temperature of the fluid circulating through them.

Heat Sink: In the present teaching, the term "Heat Sink" is used to denote the heat exchanger element through which the Combined Cycle gives off lost heat to outside the cycle. In the Combined Power Cycle, the "Heat Sink" is always made up of an Element (128) which produces the condensation of vapor at the end of or after the Heat Recovery Conduit CRC (103). When a secondary Rankine cycle is employed at this location to perform this function, that auxiliary cycle will always have a final condensation element referred to as (128) to clearly identify that this is the only element through which heat is transmitted outside the cycle.

Real losses: This term refers to the inevitable irreversibilities and losses of heat by conduction, convection and radiation in any component caused by the mere fact that it is at a higher temperature than its surroundings. Given that the real losses are inevitable in any real cycle, even where not mentioned explicitly in this report, they are considered obvious.

In this report, although it would not be accepted as correct to do so in thermodynamics, the latent heat held in the combustion products obtained in the Combined Cycle is also considered to be "real losses" because, in reality, these emerge at such a low temperature—liquid water on the one hand, and $CO_2$ from the element (107)—, that this is irrelevant or can be considered negligible for practical purposes.

Thermal fluid: This is the fluid which contains, circulates and transports the energy transferred in the different elements which make up a thermodynamic cycle.

Cogeneration: In this report, cogeneration is understood to be an optional procedure with which, in addition to mechanical energy, an additional amount of thermal energy is obtained which turns out to be useful for any kind of process outside the Power Cycle itself. In this report, it is assumed for all purposes that the heat the Combined Cycle releases to the outside as a result of "cogeneration" is always useful heat and never represents a loss of energy from the cycle because it is considered that the installation is so designed as to take this extraction of thermal energy from the Power Cycle into account: this would take place in accordance with specific requirements and subject to the temperature specifications imposed by the external consumption system for which this heat is intended.

Useful energy: This term is considered to be the sum of the heat for use external to the cycle as "cogeneration" plus the net mechanical work generated by the Power Cycle.

Power shaft: the power shaft (130) is made up of the assemblage of mechanical elements with which the machines of the Power Cycle and the Heat Pump (for example, UAX), receive or provide mechanical energy.

Physically, the power shaft need not be necessarily constituted of a common mechanical shaft to which all the turbo-machines of the cycle are coupled, as there is also a feasible option of coupling each compressor to an independent motor, with each turbine coupled to its corresponding electricity generator. Nonetheless, using this notion of power shaft facilitates comprehension, as it is considered that the net mechanical work of the Combined Cycle is obtained from the power shaft (130) as the result of summing all the mechanical work of the machines comprising it (with their signs).

Industrial pure oxygen: The term "Industrial pure oxygen" is used in this report to refer to this gas when, under its supply conditions, it meets the international standards to be considered "industrial-quality pure oxygen". It is considered evident that. even though they are undesirable, traces of impurities will always accompany the oxygen as a comburent for industrial use.

Supercritical pressure and temperature: These are conditions of pressure and temperature higher than the critical point for a given substance. The critical point is that at which the densities of the vapor and the liquid are the same.

Ambient pressure: The term "ambient pressure" is used herein to refer to a range of pressure corresponding to the saturation pressure of water vapor between 80° C. and 120° C. That is to say, ambient pressure is considered to be the range of pressures from 0.5 bars to 2.0 bars, approximately.

Bar: absolute bar

DESCRIPTION OF THE FIGURES

This report includes nine figures. The first four and FIG. 6 are schematic representations of the different configurations or design versions of the Combined Power Cycle presented. Finally, the fifth figure is a schematic representation of the configuration of the "Absorber unit for exchanging heat" (for example, UAX), which performs the essential function of assisting the Power Cycle as a "heat pump".

This configuration of the Combined Cycle has the particular feature that it uses part of the flow of water vapor circulating through the CRC (103) to be sent directly to the Turbine (127) of a secondary Rankine cycle which uses the same thermal fluid as the rest of the Power Cycle. Moreover, the condensed water obtained from the Condenser (128) is also used directly as feedwater for the rest of the Combined Cycle. This means that in this version of the Power Cycle, the secondary Rankine cycle does not form an independent cycle, but rather is integrated into it, forming a single cycle.

Figure 5:
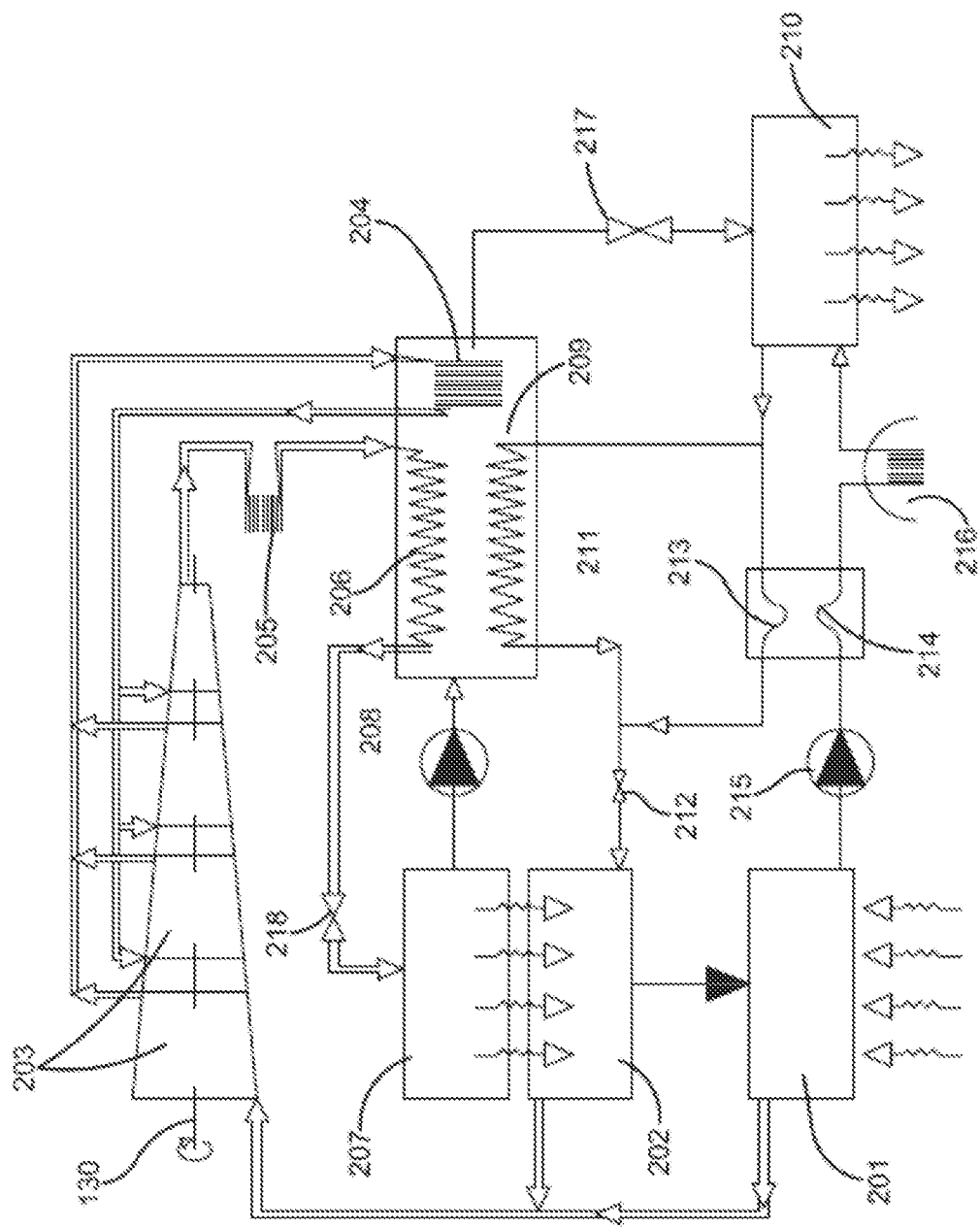

FIG. 5 is a schematic representation of the configuration of the "Absorber unit for exchanging heat" (for example, UAX), which performs the function of a "heat pump", indispensable for the operation of the Combined Cycle of the present teaching.

Figure 6:
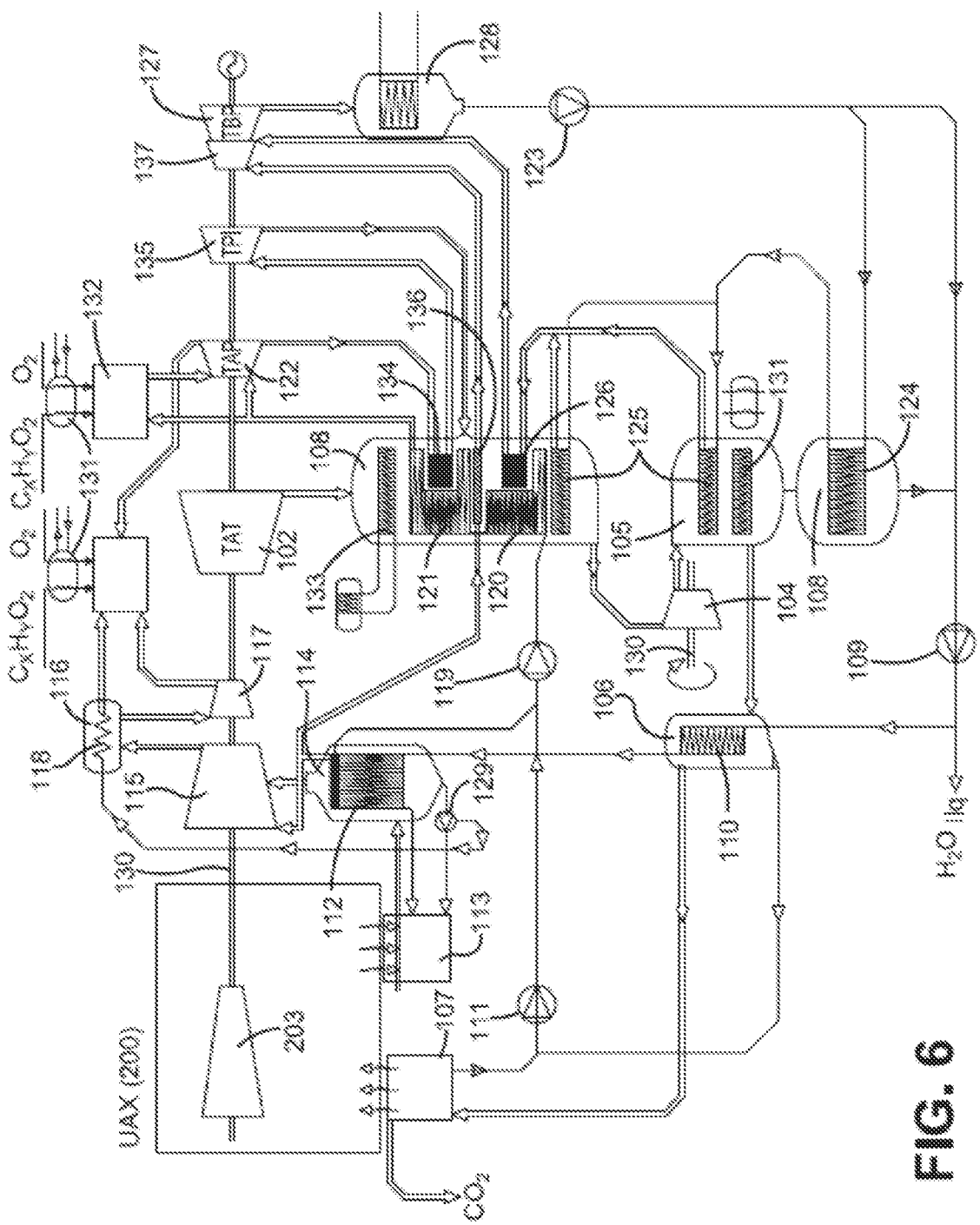

FIG. 6 shows schematically the design version of the installation to implement the Combined Cycle for the generation of mechanical energy pursuant to Configuration-5 of the present teaching assisted by UAX (200), which includes all the equipment of the cycle in any of its configurations. It enables functioning either in closed cycle or semi-closed cycle using any kind of fuel that the rest of the configurations can employ. Configuration 5 has the same elements as Configuration-3, plus a Superheater (136) and a Turbine (137). Configuration-5 differs from Configuration-3 in that one Element (112) has two additional outlet currents (one of vapor and another of preheated feedwater). Another difference is that in Configuration-5, one Compressor (115) has an additional stage of compression compared with Configuration-3.

Figure 7:
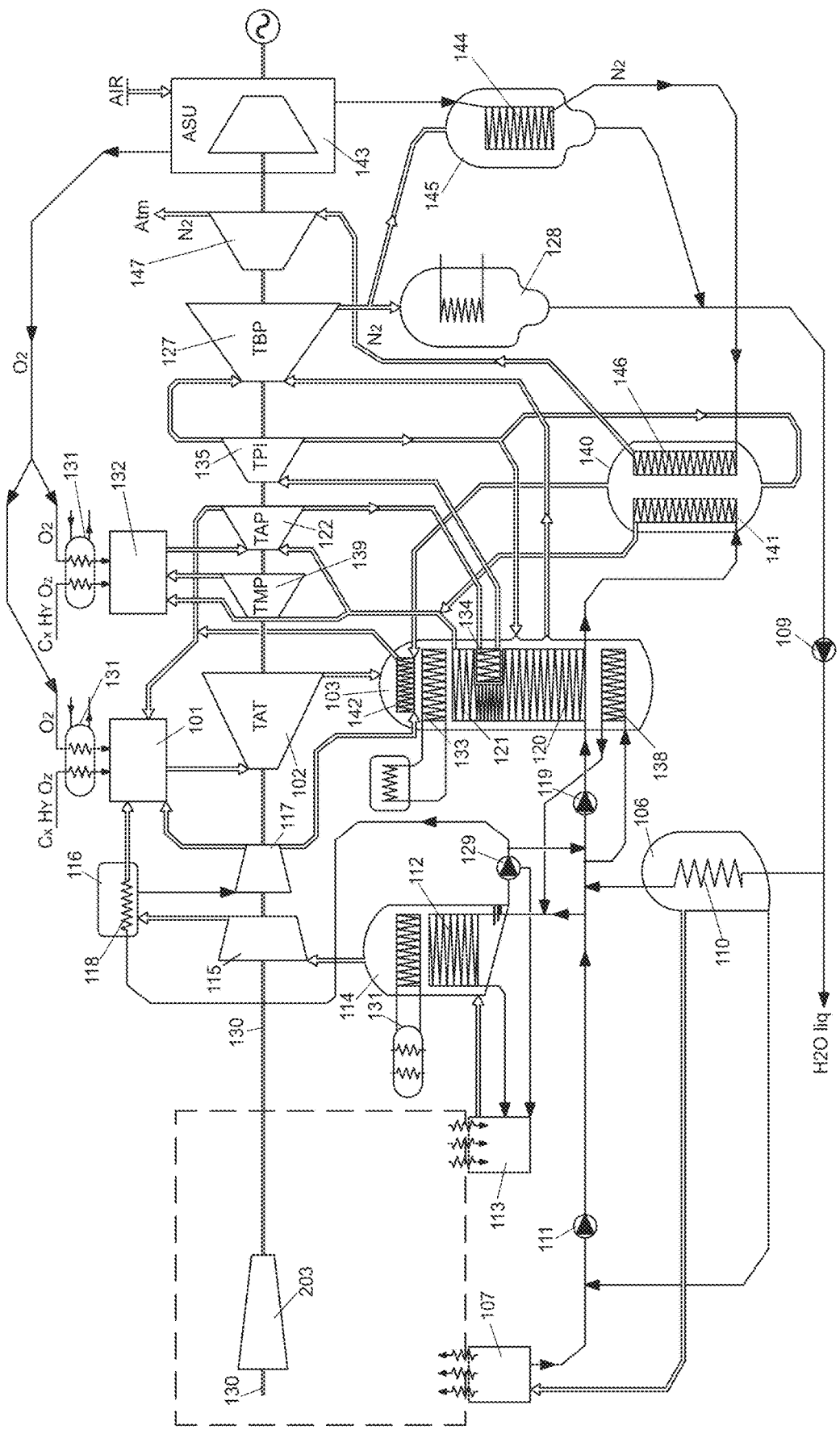

FIG. 7 shows, by way of example, Configuration-4 (of FIG. 4), with all optional, and additional elements (which separately or in blocks as explained in the "description of the present teaching" are compatible with all aspects, except for the bypass line between elements (135) and (127).

Figure 8:
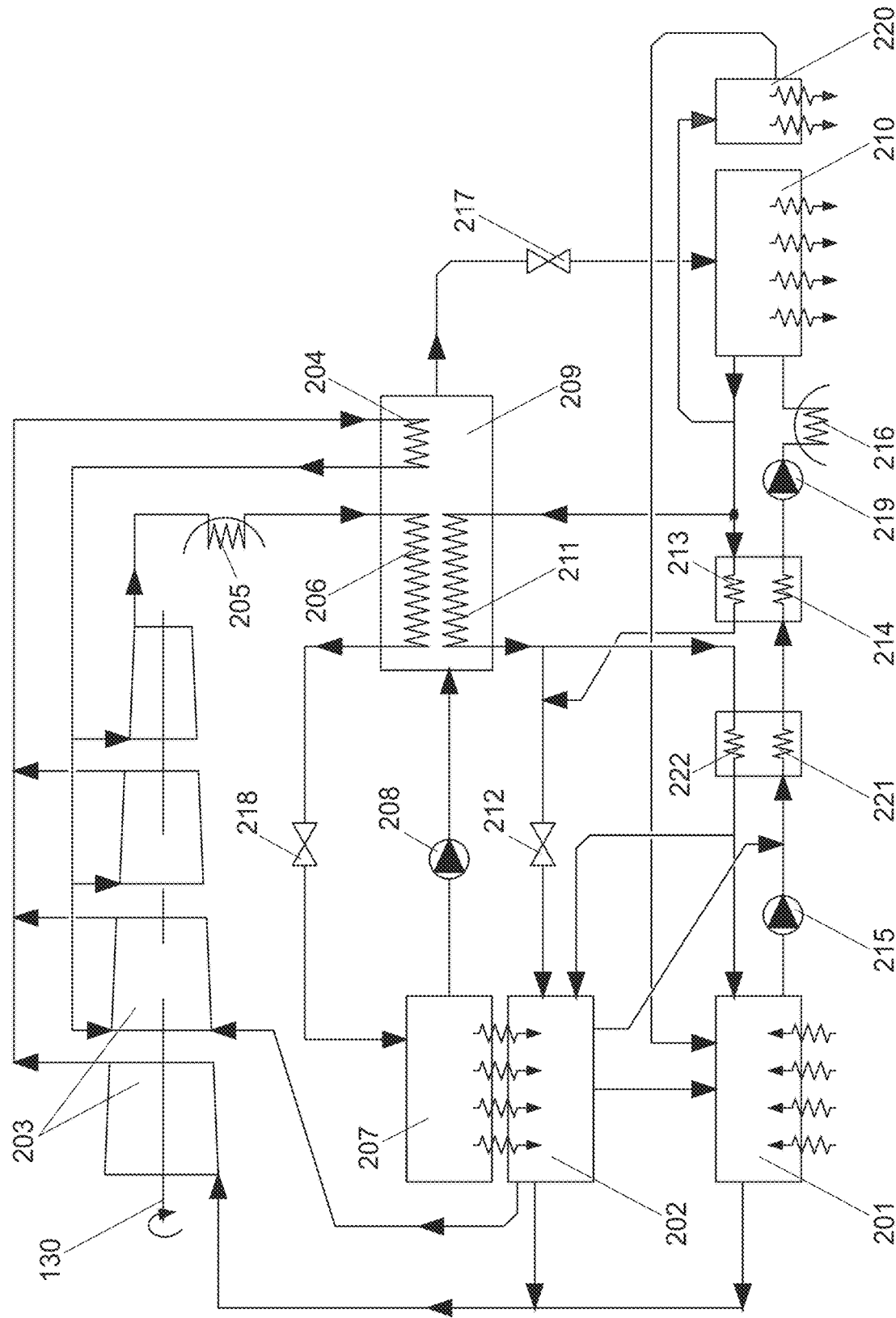

FIG. 8 shows an example heat pump with the additional elements (219) to (222).

Figure 9:
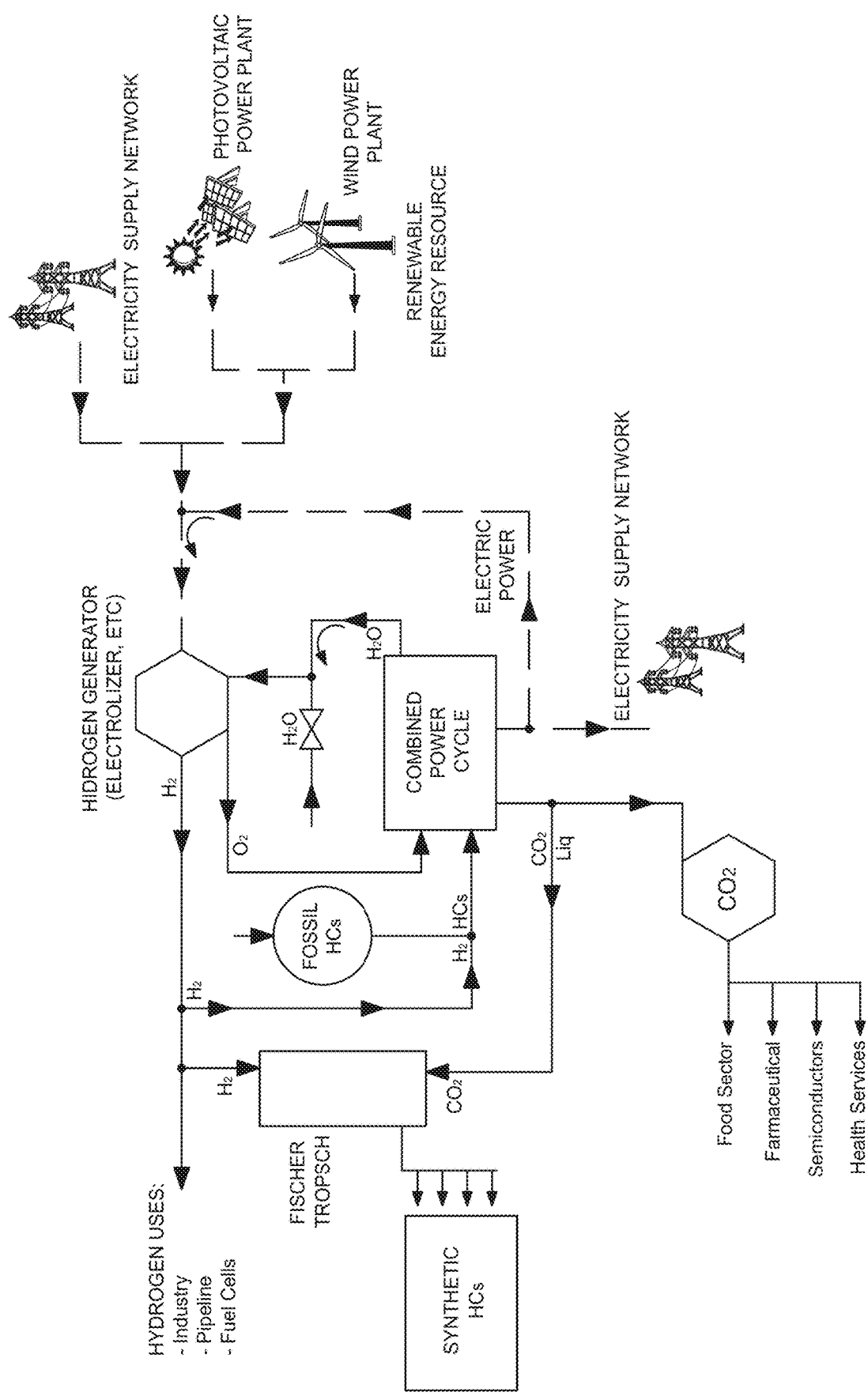

FIG. 9 shows a scheme of the industries in which the installation of the present teaching can be used and the results of carrying out the procedure of obtaining energy with such installation. Specifically, it shows a scheme of how to integrate a power generation installation according to the present teaching in an electrical generation installation of renewable origin to satisfy the intermittent generation to the actual energy demand at any time.

DESCRIPTION

The present teaching refers to an installation according to claim 1, as well as a procedure for the generation of energy according to the principal claim of the procedure. Particular aspects of the installation and the procedure are described in the respective dependent claims.

The present teaching refers to an installation for the generation of energy using a Combined Power Cycle which comprises, at least:
  means to implement a closed or semi-closed regenerative constituent Brayton cycle which uses water as thermal fluid,
  means to implement at least one Rankine cycle, the constituent basic Rankine cycle, interconnected with the regenerative constituent Brayton cycle, and
  a heat pump which makes up a closed circuit that regenerates the constituent Brayton cycle.
  According to particular aspects, the heat pump:
  1—comprises a cold reservoir that works at temperatures between 80° C. and 120° C.,
  2—comprises a hot reservoir, that works at a temperature higher than the temperature at with the cold reservoir works,
  3 exchanges heat exclusively with the Power Cycle and
  4—obtains mechanical work with the Power Shaft (130).
  The installation for the generation of energy also includes an essential Heat Source (101), selecting between:
  a heat exchanger and
  an oxy-combustion burner,
  such that in the cited essential Heat Source (101), currents from the two cycles, the constituent Brayton and the constituent basic Rankine, come together.

According to particular additional aspects of the present teaching, when the Combined Power Cycle is semi-closed, with oxy-combustion and capture of $CO_2$, it comprises at least one internal combustion burner by which it receives energy from outside.

According to particular additional aspects of the present teaching, when the Combined Power Cycle is closed, it does not have any burners and includes at least one heat exchanger by which it receives energy from outside and has no internal combustion burner.

For any of the aforementioned aspects, the installation also includes:
  an element (107) which may be:
    a regeneration condenser (107), by which the installation transmits energy to the cold reservoir (201) of the heat pump, which condenses in one simple stage or
    a $CO_2$ liquefaction plant which receives work from the power shaft (130) and condenses gases in multiple stages and only transfers the heat released in the successive stages of compression of that $CO_2$ liquefaction plant to the cold reservoir (201 of the heat pump.
  a Reboiler (113), with which heat is returned to the Power Cycle from the hot reservoir (210) of the heat pump
  a condensate regeneration Pump (111), which drives the condensate obtained in the bottom of the Element (107), and makes it flow towards the Reboiler (113),
  a heat recovery Conduit (CRC) (103), in which water vapor is generated,
  at least two turbines, one of which is a high-pressure Turbine TAP (122), which sends steam to the essential Heat source (101), and another high-temperature Turbine TAT (102), which sends vapor to the heat recovery Conduit CRC (103).
  at least one common Power Shaft (130), from which the useful mechanical energy of the cycle is obtained,
  a system which performs the function of a heat Sink by condensing vapor in the bottom of, or after, the CRC (103),
  a condensate return Pump (109),
  a feedwater Pump (119) for the constituent basic Rankine cycle,
  a vapor generator for the constituent basic Rankine cycle consisting of:
    Economizers (120),
    Evaporators and Superheaters for the water vapor (121) situated inside the CRC (103),
  one condensation heat exchanger Element (106), before the entry of vapor and gases to the Element (107), which relinquishes heat to a condensate return Preheater (110),
  one condensation heat exchanger Element (114), provided at the outlet of the Reboiler (113), which relinquishes heat to
  a bypass line which joins the constituent Brayton cycle with the constituent basic Rankine cycle, situated at the Element (112), selecting between:
    a Preheater (112) for the intake water to the Reboiler (113) itself,
    and a heat recovery exchanger (112), which in addition to preheating the intake water for the Reboiler (113) itself, can heat the feedwater to the Pump (119) and generate vapor which can be directed to the compressor (115) and/or a turbine a heater (137) once its temperature has been raised in a Superheater (136)

between the impulsion of the regeneration condensate Pump (111) and the aspiration of the feedwater Pump (119).

In the event that the constituent Brayton cycle is closed, uses oxy-combustion, and in the case that fuels with carbon are used, the installation includes:
an outlet for the $CO_2$ produced in the combustion, situated in the regeneration Condenser (107) in gaseous state or liquid state if the regeneration Condenser (107) is a liquefaction plant, and
an outlet for the liquid water produced by the combustion in the condensate return line.

In the event that in the installation for generating energy, the Brayton cycle is closed, or in the case that it uses solely hydrogen as fuel, the heat sink can consist of a secondary Rankine cycle which uses the same fluid as the rest of the Power Cycle and is interconnected with the installation through the CRC (103) and the condensate return Pump (109).

In any of the foregoing aspects, the installation for generating energy may include, apart from the essential Heat Source (101), another supplementary heat source (132) which provides extra heat to the Power Cycle from outside (this could be an exchanger or pressurized burner), situated between the final Superheater (121) and the Turbine TAP (122).

In any of the foregoing aspects, the installation for generating energy may include, in addition, one (115) or several vapor compressors (117), connected in series, situated at the vapor outlet of the exchanger Element (114), and before the vapor intake of the essential Heat Source (101).

In any of the foregoing aspects, the installation for generating energy may include, in addition, a vapor cooling exchanger (116/118) between the compressors connected in series, (115) and (117).

In any of the foregoing aspects, the installation for generating energy may include, in addition, in the condensate line which emerges from the bottom of the condensation exchanger Element (114), a return line to the Reboiler (113).

In any of the foregoing aspects, the installation for generating energy may include, in addition, an additional exchanger provided at the vapor intake of the heat recovery Conduit (103) to generate heat which could be used outside the installation, useful, among other things, for applications of cogeneration, using a heat exchanger Coil (133).

In any of the foregoing aspects, the installation for generating energy may include, in addition, a heat exchanger Element for cogeneration (133) provided inside the heat recovery Conduit (103), from which it extracts useful heat energy which could be destined for external use in any type of industrial application.

In any of the foregoing aspects, the installation for generating energy may include, in addition:
a Fan (104), which takes the outlet vapors from the heat recovery Conduit CRC (103) and compresses them for sending to a condensation exchanger Element (105), in which at least one component section of the evaporator (125) of an independent secondary Rankine cycle is housed.

In the aspect mentioned in the previous paragraph, the installation for generating energy may include, in addition:
a heat Exchanger (108/124) in which, on the shell side (108), the condensate from the Conduit (105) is cooled, and in whose interior there is housed an economizer (124) of the independent secondary Rankine cycle.

In any of the foregoing aspects, the Heat Pump UAX (200) of the installation includes:
a main Generator (201) of gaseous ammonia, acting as cold reservoir, which exchanges heat solely with the Element (107),
a secondary Generator (202), which receives an ammonia solution from an Absorber (210), and sends the ammonia vapor to some Compressors (203), while the remaining ammonia solution is sent to the main Generator (201),
at least two ammonia Compressors (203), connected in series, with cooling in between, which receive ammonia from the main (201) and secondary Generators (202)
a compressed ammonia Condenser (207) which receives the ammonia compressed and cooled in a supercritical ammonia Evaporator (209), and transmits the heat to the secondary Generator (202),
a supercritical ammonia Evaporator (209),
a Pump (208) for ammonia condensate from the compressed ammonia Condenser (207), which impels it to the ammonia Evaporator (209), where ammonia vapor is produced at supercritical pressure,
an ammonia Absorber (210), which receives the vapor from the Evaporator for supercritical ammonia (209) and dissolves it in an aqueous phase, and
a transfer Pump (215) which transfers the dilute ammonia solution from the main Generator (201) to the Absorber (210).

The Heat Pump (such as UAX) (200) may additionally include:
a heat Exchanger (213/214) between the dilute ammonia solution from the main Generator (201) and the concentrated ammonia solution from the Absorber (210),
a Coil (211) housed inside the ammonia Evaporator (209), which harnesses the heat contained in the concentrated ammonia solution from the Absorber (210), to produce supercritical ammonia,
a cooling Coil (206) for the compressed ammonia from the Compressors (203), which provides heat to the supercritical ammonia Evaporator (209).

The present teaching refers also to a procedure for the generation of energy based on a Combined Cycle implemented using the installation defined earlier.

The procedure defined consists of:
implementing a constituent Brayton cycle, closed or based on oxy-combustion, regenerated by a heat pump, which uses water as thermal fluid and produces mechanical energy in the high-temperature Turbine TAT (102),
implementing a constituent Rankine cycle interconnected with the foregoing Brayton cycle, and which exchanges matter and energy with it, as both use water as common thermal fluid, and produces mechanical energy at the Turbine TAP (122),
using a heat pump (200) which exchanges energy with the constituent Brayton cycle to regenerate it and absorb mechanical energy in certain compressors (203).

In the procedure of the present teaching, all the water vapor of the cycle can be condensed completely in the Element (107) where the $CO_2$ is released in gaseous phase in the case that the Cycle is using fuels other than hydrogen.

According to particular aspects of the procedure, the water vapor which circulates through the Element (107) condenses completely as a result of the heat which is transmitted to the cold reservoir of the heat pump (such as UAX) (200), leaving as residue liquid or gaseous $CO_2$ only, as applicable, in the case that the Cycle is using fuels other than hydrogen.

In the procedure according to the present teaching, the regeneration of the constituent Brayton cycle can be accomplished by the action of the heat Pump (for example, UAX) (200), recycling the vapor condensation heat at the temperature of the cold reservoir, to then return it to the cycle through the hot reservoir, to regenerate water vapor at higher pressure and temperature than those at which it was previously condensed.

According to particular aspects, the procedure includes:
- condensing the water vapor at ambient pressure in the Element (107), relinquishing the heat obtained to the cold reservoir (201) of the heat pump UAX (200)
- regenerating water vapor in the Reboiler (113) at a higher pressure than that at which it was condensed in the Element (107), using the heat provided by the hot reservoir (210) of the heat pump UAX (200).

According to particular additional aspects, the procedure includes the use of a supplementary heat Source (132), which provides additional heat to the power Cycle from outside, situated between the Superheater (121) and the Turbine TAP (122).

According to particular additional aspects, the procedure includes the use of a single heat sink, through which the Cycle releases lost heat outside. The function of the heat sink can be performed by an independent secondary Rankine cycle.

According to particular additional aspects, the procedure includes the use of a heat recovery Conduit CRC (103), which uses the remaining heat form the outlet of the Turbine TAT (102) to generate superheated vapor of the constituent basic Rankine cycle.

According to particular additional aspects, the procedure includes implementing an oxy-combustion Combined Cycle, and uses liquid or gaseous fuels, of general formula $C_xH_yO_z$ in pure or mixed form, where x, y and z take values corresponding to real chemical compounds capable of being burned with oxygen. The preferred fuels are hydrocarbons which are gaseous or of low boiling point, such as, for instance: methane, ethane, propane, or mixtures of these, such as purified natural gas. Simple alcohols such as methanol or ethanol are also usable fuels. CO (carbon monoxide) is the only substance free of hydrogen which is amenable to use as a fuel in the burners of the Combined Power Cycle.

According to particular additional aspects, the procedure includes condensing part of the water vapor from the heat recovery Conduit (103) using the heat sink and the condensation exchanger (106/110) before the Element (107) finally condenses all the water vapor which is at ambient pressure.

Another part of the condensation heat of the heat exchanger Element (114) can be used to preheat the fuel and the comburent separately using a heat exchanger Coil (131). This application, of preheating the fuel and comburent of the Combined Cycle using the heat obtained in the Coil (131) does not preclude any other kind of additional use to which this heat could be put, and even if these are applications beyond the scope of the Power Cycle. When the cycle has a heat exchanger Element (131) to preheat the fuel and comburent of the Combined Cycle, this can, without distinction, be located inside the Element (114), or at the end of the Conduit (103) or (105), prior to the entry of vapors and gases into the Element (106).

According to particular additional aspects, the procedure includes raising the pressure of the vapor provided by the Element (112) and the vapor pressure of the Reboiler (113) and which emerges from the condensation exchanger Element (114) using the additional mechanical Compressors (115) and (117), connected in series and capable of supplying sufficient pressure to send this vapor to the essential heat Source (101).

One part of the condensate generated in the Element (114) is employed to cool the vapor between the stages of compression circulating through the cooling Coil (118) while the rest of the condensate is returned directly to the Reboiler (113).

According to particular additional aspects, the procedure includes a bypass that connects the constituent Brayton cycle to the constituent basic Rankine cycle, with which water is exchanged, that bypass being located between the impulsion line of the regeneration condensate Pump (111) and the aspiration of the feedwater Pump (119).

According to particular additional aspects, the procedure also includes using the partial condensation heat of the vapor emerging from the Reboiler (113) for other applications, in a particular way suitable for its use in an independent application external to the Installation making use of the Coil (131).

According to particular additional aspects, the procedure includes raising the pressure of the vapor provided by the Reboiler (113) using the additional mechanical Compressors (115) and (117), connected in cascade, with cooling in-between and capable of supplying sufficient pressure to send this vapor to the essential heat Source (101).

According to particular additional aspects, it includes:
- in the case that the Combined Power Cycle is implemented as closed, or burns only hydrogen, to send vapor directly from the heat recovery Conduit CRC (103) to the Turbine TBP (127) of the secondary Rankine cycle, which operates under vacuum conditions provided by the Condenser (128), from where the condensate is returned as feedwater to the constituent basic Rankine cycle. With this procedure, the secondary Rankine cycle uses the same thermal fluid as the rest of the Power Cycle.

According to the procedure of the present teaching, the outlet gases from the heat recovery Conduit CRC (103) can be compressed using a Fan (104) which sends them to a condensation exchanger Element (105), in which vapor is generated in an Evaporator (125) of an independent secondary Rankine cycle.

According to the procedure of the present teaching:
- the heat pump (such as a UAX) (200) is a refrigerating machine which functions by combining operations of compression and absorption, using $NH_3$ as thermal fluid and water as solvent,
- the main Generator (201) of the heat pump (200) acts as the cold reservoir, absorbing the heat from the Element (107), exclusively,
- the only cold reservoir of the heat pump (200) works at temperatures between 80° C. and 120° C.,
- the ammonia Absorber (210) of the heat pump (200) acts as the hot reservoir, transferring the heat to the Reboiler (113), exclusively,
- in the heat pump (200), the compression of the $NH_3$ vapor takes place, in successive stages with cooling in between,
- the compressed ammonia vapor Condenser (207) of the heat pump (200) relinquishes all of the heat released by the secondary Generator (202), and
- the ammonia Evaporator (209) of the heat pump (200) generates $NH_3$ in a supercritical state using the heat supplied to it by the cooling coils between the stages of compression (204 and 206), and with part of the latent heat held by the concentrated solution which emerges hot from the Absorber (210).

An alternative of the Heat Pumps a Heat Pump of hybrid compression-absorption operation, "UAX" (Absorber unit for exchanging heat) which is capable of fulfilling these requirements efficiently and economically to accomplish the regeneration of the constituent Brayton cycle of the Combined Cycle of the present teaching.

The Absorber unit for exchanging heat UAX (200) is a thermodynamic system of mixed functionality, compression and absorption, and water-ammonia, which works cyclically and continually, which is employed as heat pump to transfer heat energy from a main Generator which desorbs ammonia (201) and acts as cold reservoir, to an ammonia Absorber (210) which works at higher temperature and acts as hot reservoir, making use of a certain amount of mechanical energy provided from the outside by a compressor system (203).

The absorption heat pump UAX does not interchange matter with the Combined Power Cycle, but it does receive from it both the mechanical work of compression and the heat absorbed by its cold reservoir to, subsequently, restore all this energy to the Cycle by means of its hot reservoir.

The Combined Cycle transfers mechanical energy from the power Shaft (130) to the system of compressors of the UAX and heat energy from an Element (107) to the cold reservoir of the UAX, while the latter returns to the Combined Cycle all this energy by transferring heat from the hot reservoir to a Reboiler (113) which regenerates water vapor at a higher temperature than that at which it was previously condensed.

From the functional point of view, the heat pump UAX (200) operates a thermodynamic cycle which works in "thermodynamic symbiosis" with the Combined Power Cycle to which it is energetically coupled, in such a way that the functioning of the Installation according to the present teaching is determined by the establishment of this functional link between the Power Cycle and the UAX. This represents a key difference with respect to the combined cycles of the current state of the art.

Components of the Combined Power Cycle

For an installation to function according to the Combined Cycle of the present teaching as such, an array of equipment is shown, without taking into account its efficiency and ignoring any other types of factors decisive to the economic viability of an installation of this type.

The components for an installation to function according to the Combined Cycle of the present teaching are as follows:

101: Essential heat Source. This is the indispensable focus by which heat enters the constituent Brayton cycle. The Combined Power Cycle receives energy from outside, and indispensably, by means of the essential heat Source.

Three currents reach the essential heat Source (101) (in addition to the fuel and comburent in the cases of semi-closed cycles). On the one hand, the vapor from the Turbine TAP (122) of the constituent basic Rankine cycle, and, secondly, the compressed vapor from the constituent Brayton cycle. The final intake current, part of the condensate impelled by the Pump (129), which may circulate through the heat exchanger Element (118) before reaching the heat Source (101), in the case that the Power Cycle has a vapor cooling system between the stages of compression.

The essential heat Source (101) is, therefore one of the points where currents belonging to the constituent Brayton cycle and the constituent basic Rankine cycle converge, which means that implicitly, this is a point of interchange of matter between the two constituent cycles.

When the Combined Cycle is working as a closed cycle, the essential heat Source (101) is always a high-temperature heat exchanger that receives heat energy from outside. In such a case, the only substance that reaches the essential heat Source (101) is water which, after increasing its enthalpy here, emerges in the form of superheated vapor which is sent to the high-temperature Turbine TAT (102).

When the essential heat Source (101) is a pressurized internal oxy-combustion burner, the Combined Cycle is semi-closed. In such a case, the water vapor sent to the high-temperature Turbine (102) circulates accompanied by the gases of the combustion itself (basically made up of carbon dioxide and more water vapor).

102: High-temperature Turbine. TAT. This is the gas turbine, basic to the constituent Brayton cycle, whose function is to generate mechanical work with the hot gaseous phase sent to it by the essential heat Source (101). It is referred to as TAT for short (an acronym for High-Temperature Turbine in Spanish) because it is the turbine that works at the highest temperature in the entire installation.

The gaseous phase moved by the Turbine TAT (102) is made up of steam accompanied by the combustion gases in the case that the essential heat Source (101) is a burner. This gaseous phase, after being expanded, emerges from the Turbine TAT (102) at high temperature and is sent to the heat recovery Conduit CRC (103) to harness the enthalpy it contains.

103: Heat recovery Conduit. CRC. This is the gas side of the heat exchanger which recoups the heat from the escape gases from the Turbine (102). This heat held in the turbine gases is employed in the CRC (103) to generate the essential high-pressure vapor for the constituent Rankine cycle using the Evaporators and Superheaters (121). Part of the heat contained in the escape gases from the Turbine TAT (102) can be used for external applications beyond the scope of the Cycle itself, in what is known as "cogeneration". Optionally, for this purpose, and depending on the operational design parameters of the Combined Cycle, in the interior of the CRC (103), there can be some independent heat exchanger Element (133).

Moreover, when the medium-pressure Reheater (134), the Superheater (136), the Superheater (126) and the low-pressure Evaporator (125) are present, these will always be located inside this CRC (103). Optionally, the heat exchanger Coil (131) can be deployed within the CRC (103), situated at the end of this conduit, prior to the exit of the gases.

Finally, the gases always leave the CRC (103) at the water vapor saturation temperature corresponding to the "ambient pressure".

In Configuration-2 (FIG. 2) and in the essential configuration (FIG. 1) of the Combined Cycle presented, the design considers that partial condensation of the water vapor circulating within the final section of the heat recovery Conduit CRC (103) takes place.

Figure 3:
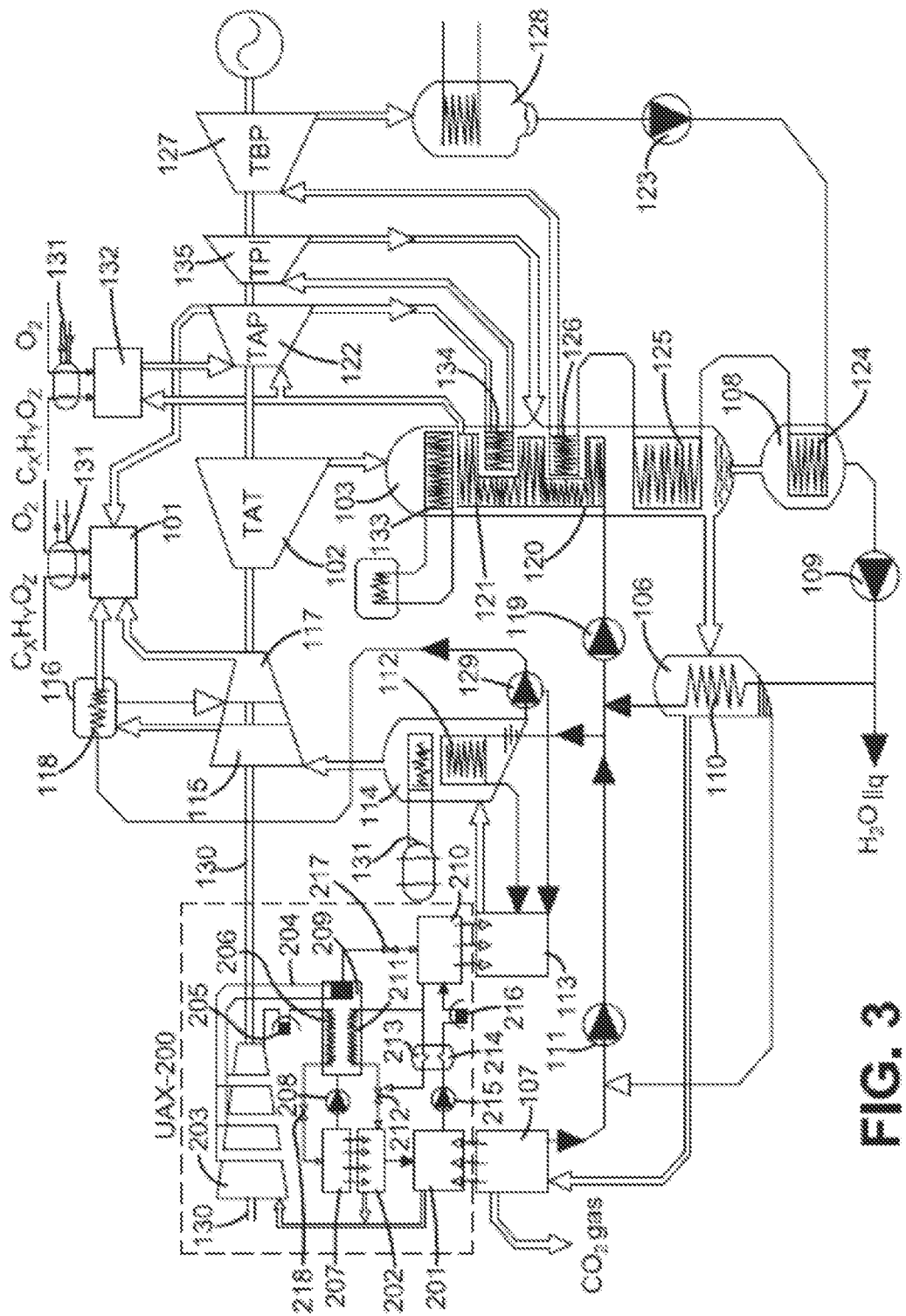
FIG. 3 shows schematically the design version of the installation to implement the Combined Cycle for the generation of mechanical energy according to Configuration-3 of the present teaching, which includes, in addition to the essential equipment of the cycle (shown in FIG. 1), the elements which confer improved efficiency upon the Combined Cycle, with the particular feature that in this configuration of the Combined Cycle, there is no condensation within the Heat Recovery Conduit (CRC) (103), and rather there is an independent Conduit (105), where partial condensation of the water vapor circulating through it takes place. Between the two conduits, (103) and (105), respectively, there exists a Fan (104) which sucks the gases and released vapor from the CRC (103) and raises the pressure in the section of the Conduit (105) that houses at least one part of the Evaporator (125) for a secondary Rankine cycle which uses its own thermal fluid independent of the rest of the Power Cycle.

Configuration-3 or the design version of the Combined Cycle according to FIG. 3, and Configuration-5 according to FIG. 6, are characterized by the fact that condensation does not happen in the heat recovery Conduit CRC (103) and a specific Conduit (105) is provided where the condensation takes place.

Figure 4:
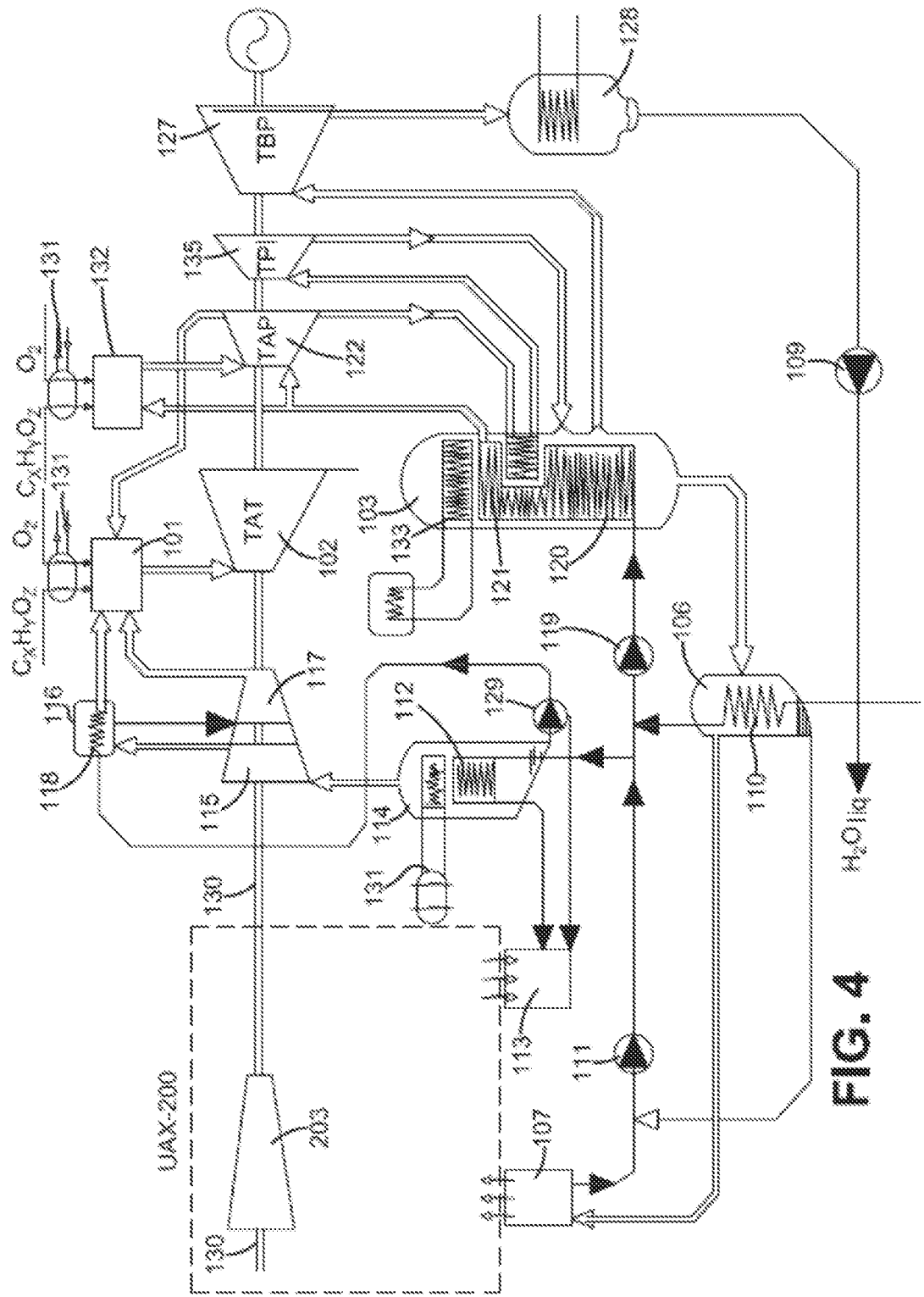
FIG. 4 shows schematically the design version of the installation to implement the Combined Cycle for the generation of mechanical energy pursuant to Configuration-4 of the present teaching assisted by a heat pump, in this case a UAX (200) which includes, in addition to the essential equipment of the cycle (shown in FIG. 1), the elements which confer improved efficiency upon the Combined Cycle, which due to its simplicity is more appropriate when the installation is intended to work in closed cycle or when only hydrogen is used as the fuel. That is to say, when there is no presence of $CO_2$ in the Power Cycle.

For its part, Configuration-4, or the design version of the Combined Cycle according to FIG. 4, is characterized by the fact that there exists a vapor extraction connection in the CRC (103), just before condensation takes place, and by means of which steam is sent directly to the Turbine TBP (127).

128: Heat Sink In this report, the heat Sink (128) is considered to be any equipment, device, or system through which the Power Cycle transmits lost heat to the outside environment. In the present teaching, this is always a vapor Condenser, a single element through which lost heat energy is carried to the exterior. Nevertheless, this function is indispensable for the functioning of the constituent basic Rankine cycle, for the Installation of the present teaching as a whole. Any heat exchanger element which condenses water vapor contained in the outlet gases from the CRC (103) can perform the function of a heat Sink (128); nevertheless, and for reasons of energy efficiency, the most economical solution consists of providing some system which recovers that heat (which is capable of producing the condensation of water vapor at ambient pressure on the other side of the heat exchanger), such as, for instance, an evaporator belonging to another additional Rankine cycle or a coil which extracts heat intended for any type of application of interest (perhaps, for example, a heat recovery system coupled to an absorption machine to produce industrial cold). When the Combined Cycle has a secondary Rankine cycle, its Condenser (128) is always the equipment by which heat is transmitted to outside.

109: Condensate return Pump to the constituent basic Rankine cycle. This is the pump which displaces the condensate produced by the heat Sink (128) and makes it circulate through a condensate return Preheater (110) before distributing the water which feeds different parts of the cycle.

110: Feedwater preheater Element. This comprises a heat exchanger together with the Element (106) within which it is located. This is a tubular coil or heat exchanger element of any other configuration whose mission is to raise the temperature of the condensate it returns to the cycle impelled by the Pump (109), using the heat from the vapor condensation that takes place on the shell side of the exchanger (106).

106: Shell side of the condensation exchanger of the feedwater preheater. This comprises a heat exchanger together with the condensate return preheater Element (110). This is the element of the exchanger through which the remaining vapor obtained from the bottom of the CRC (103) circulates, accompanied by the incondensable gases at atmospheric pressure in the case of an oxy-combustion cycle. In the element (106), partial condensation of the water vapor takes place. With the heat released in this condensation, the temperature of the return condensate is raised, making use of the condensate return Preheater (110).

Emerging from this condensation heat exchanger Element (106), to be directed to the Element (107), is the current of water vapor accompanied by all the incondensable gases, when there are any, produced in combustion (when the cycle is closed there are no burners and when the fuel is hydrogen with pure oxygen, no incondensable gases are produced in the combustion).

In the bottom of the heat exchanger Element (106), liquid water is obtained from the condensation which is then impelled by the regeneration condensate Pump (111) together with the condensate current from the Element (107).

107: Regeneration condenser or liquefaction plant. The Element (107) transfers all the heat from the condensation of the vapor to the main Generator (201) which acts as "cold reservoir" of the heat pump (200).

The regeneration Condenser (107) receives the vapor and incondensable gases at atmospheric pressure from the Element (106). In turn, from (107), the incondensable gases are obtained on one side, for being liquified in a $CO_2$ compression-intercooling-stripping facility, and the condensed water vapor on the other side. The regeneration Condenser (107) works at "ambient pressure" which corresponds to working at the lowest temperature of the constituent Brayton cycle. The simplest option, although this is not indispensable, is to make the regeneration Condenser (107), just like the heat exchanger Element (106) and the outlet from the CRC (103), operate at pressures close to atmospheric, in which case the condensation temperatures in these three components will be close to 100° C.

The element (107), for the aspects described according to Configuration-2 and Configuration-3, may be an integrated Plant for obtaining liquefied $CO_2$ that performs the function of the regeneration Condenser (107). by means of the known industrial procedure based on compressor-cooler-stripper in multiple stages, in such a way that:

the water vapor in the stream received from element (106) is condensed, separating the moisture from the incondensable gas stream and transferring the heat of condensation to the cold reservoir of the heat pump (e.g., a UAX), the gaseous fraction saturated with residual moisture from the previous stage is compressed, the adiabatic heat from this compression stage is transferred in its entirety to the heat pump's cold reservoir and the moisture is separated by condensation, the resulting gaseous fraction after the previous compression stage, passes to a second compression stage where, in the same way, the adiabatic heat generated in this second stage is also transferred in its entirety to the cold reservoir of the heat pump and the moisture is separated again by condensation, starting from the resulting incondensable fraction after the second compression stage, proceeding in the same way as in the previous case in a third stage, and so on, until the $CO_2$ is obtained in liquid state, finally, after the successive of Compression-cooling stages in cascade, the $CO_2$ is obtained in liquid state free of humidity that is cleaned by stripper before leaving the regeneration Condenser (107) for its commercial use.

Although it entails a reduction in the overall performance, a feasible option, more complex but of greater relevance from the point of view of the interest in the industry in semi-closed cycle configurations, consists of making the Element (107) a $CO_2$ liquefaction plant, in which all the heat released in the successive cycles of compression is transmitted to the Generator (201) of the heat pump (such as a UAX) (200). The objective of this configuration is to extract the liquefied oxy-combustion CO2 from the Power Cycle for storage, transport, and handling, instead of taking it out in a gaseous state.

The condition demanded of the Element (107) for it to be a $CO_2$ liquefaction plant is that the heat generated in the different stages of compression is at a sufficient temperature to be transmitted from the cooling exchangers between the $CO_2$ compression stages, to the main Generator (201) of the heat pump (e.g., a UAX).

In this case, it should be considered that the mechanical work of the compressors is supplied by the power Shaft (130) itself of the Installation (for reasons of simplicity this representation has been omitted in all the figures attached).

This heat that the power Cycle relinquishes to the heat pump (e.g., a UAX) (200) is returned later at a higher temperature by means of the Reboiler (113), which works with the heat provided to it by the "hot reservoir" of the heat pump (e.g., a UAX) (200) Without regard to whether the Combined Cycle is working in a closed or semi-closed cycle, in the Element (107), complete condensation of the water vapor arriving there from the Element (106) always takes place. As a consequence of this operation, the water vapor turns to liquid while the $CO_2$ generated in the combustion remains confined in concentrated gaseous or liquid phase.

Among other things, this means that the $CO_2$ which emerges from the cycle does so at very much lower temperatures with respect to other conventional combined cycles. This $CO_2$ exit temperature can be reduced even more if, for example, some other additional heat exchanger for the condensate return current of the Combined Cycle is provided. This separation of phases which takes place in the Element (107) means that all the $CO_2$ generated in burners and any other incondensable gaseous waste at atmospheric pressure, that may accompany it, can be eliminated from the cycle, with no need for it to come into contact with the atmosphere.

This confers an important environmental advantage upon the power Cycle of the present teaching over conventional open combined cycles, because it does not entail the direct emission into the atmosphere of any type of environmentally polluting gases.

It is common in oxy-combustion processes to burn with about 2 or 3% excess oxygen over the stoichiometric value to ensure complete combustion. This amount of oxygen which has not reacted circulates from the burners passing through the CRC (103) and the heat exchanger Element (106), diluted in the thermal fluid, until it finally reaches the Element (107), where it is eliminated from the cycle as an incondensable gas together with the $CO_2$. When this happens, the excess oxygen used for the combustion can be recovered in the carbonic anhydride treatment plant to be reused as comburent for the Cycle.

Finally, in the bottom of the Element (10t), degassed water is obtained which is returned to different part of the Combined Cycle impelled by the regeneration condensate Pump (111). Therefore, the only section of the Power Cycle which may contain $CO_2$ is that from the burners (101) and (122) to the Element (107).

113: Regeneration Reboiler of the constituent Brayton cycle. This is the regenerator element of the constituent Brayton cycle by which the "heat pump" returns to the Combined Cycle, in the form of heat, the amount of energy previously recouped from the Cycle itself using the Element (107) as well as the amount of energy the Compressors (element (203) in the case of the UAX) take from the power Shaft (130).

The Reboiler (113) is the heat exchanger element by means of which heat is returned to the Power Cycle from the ammonia Absorber (210), which acts as "hot reservoir" of the UAX (200). With this heat supplied by the hot reservoir of the heat pump (200) by means (the Absorber (210) in the case of UAX), the Reboiler (113) regenerates water vapor at a temperature and pressure above those at which it previously condensed in the Element (107).

Therefore, the regeneration of the constituent Brayton cycle using the heat pump (200) takes place by recycling the vapor condensation heat at the temperature of the "cold reservoir" to subsequently return it to the cycle, using the "hot reservoir", to regenerate water vapor at a temperature and pressure above those at which it previously condensed.

111: Regeneration condensate Pump of the constituent Brayton cycle. The Pump (111) aspirates the condensate generated in the condensation heat exchanger Element (106) together with the degassed water obtained in the bottom of the Element (107) and impels it to the Element (112) at sufficient pressure for it to, finally, feed the Reboiler (113).

In the impulsion line of this regeneration condensate Pump (111), a bypass is provided with the aspiration line of the feedwater Pump (119), by means of which water is exchanged between the constituent Brayton and Rankine cycles to establish the balance of matter and energy which is indispensably required to enable constitution of the Combined Cycle according to the present teaching, and which depends on the design variables of the installation and the conditions of operation of the cycle.

112: Element (112), selected from:
 a Preheater (112) for the intake water to the Reboiler itself (113)
 and a heat recovery exchanger (112), which in addition to preheating the intake water for the Reboiler (113) itself, can heat the feedwater to the Pump (119) and generate vapor which can be directed to the compressor (115) and/or a turbine (137) once its temperature has been raised in a Superheater (136)

The Element (112) is a tubular coil or heat exchanger element of any other configuration which is inside a condensation heat exchanger element (114) from which it receives heat, raising the temperature of the water that feeds the regeneration Reboiler (113). What enters the Element (112) is the condensed water from the pumps (109) and (111).

What leaves the heat exchanger Element (112) is
 a current of heated liquid water which is sent to the Reboiler (113), and if it performs solely this function it is termed Preheater (112).

In addition, two further currents may emerge from the Element (112):
 A current of heated liquid water which is sent to the feedwater Pump (119).
  A current of steam (at pressure above atmospheric) which is sent to the first additional stage of the vapor Compressor (115) or/and the Superheater (136) to then expand partially inside the additional Turbine (137) before it enters the Turbine TBP (127).

114: Shell side of the condensation exchanger of the Element (112). This is a condensation heat exchanger element inside which is found the Element (112). The vapor from the regeneration Reboiler (113) circulates through the present Element (114), where the water vapor condenses partially, entailing that the enthalpy is recovered in the Element (112) which in addition to preheating the water feeding the Reboiler (113) itself can heat the feedwater for the Pump (119) or/and generate vapor. As a result of the partial condensation that takes place, a current of liquid water is obtained from the bottom of the Element (114). This condensed water is impelled using a condensate Pump (129) and part of it is sent to the essential heat Source (101), passing previously through a heat exchanger Element (118) that cools the vapor between the stages of mechanical compression (115) and (117). The other part of the condensate impelled by the condensate Pump (129) is recirculated directly to the Reboiler (113). In the case that the Combined Cycle does not have the supplementary vapor Compressors (115) and (117), part of the condensate impelled by the Pump (129) can be sent directly to the essential heat Source (101). Optionally, and with a view to improving the performance of the Cycle, it is also possible to provide an additional Coil (131) inside the Element (114) which, among other applications, could be employed to preheat the fuel and the comburent from the conditions of their supply. This Coil (131) could also, without distinction, be located immediately before the vapor and gases enter the Element (106). This Coil (131) can also be used to extract heat from the Element (114) intended for other types of external applications beyond the Installation itself.

129: Bottom condensate Pump of the condensation Exchanger (114). This is the pump that impels the condensate obtained from the bottom of the Element (114) at a pressure sufficient for sending to the essential heat Source (101). When the Combined Cycle has Compressors (115) and (117), this current of water impelled by the condensate Pump (129) circulates through the Coil (118) to cool the vapor between the two stages of compression. After the condensate Pump (129), this current is divided in two. One part is sent to the essential heat Source (101), passing previously through the heat exchanger Element (118) in the case that the Combined Cycle has a Compressor (115), while the remaining part of the condensate impelled by the Pump (129) is returned directly to the Reboiler (113).

119. Feedwater Pump (119) for the constituent basic Rankine cycle. This is the pump that impels water through the vapor generator elements of the basic Rankine cycle. This pump provides the highest pressure value yielded in the entire installation.

The feedwater Pump (119) is fed fundamentally by the return current of the condensate impelled by the Pump (109). In addition, the Combined Cycle has a bypass, between the impulsion of the Pump (111) and the aspiration of the Pump (119), through which it is possible to exchange thermal fluid (water) between the constituent Brayton cycle and the constituent basic Rankine cycle. There exists the possibility of also supplying the feedwater Pump (119) with a current of water heated in the Element (112). The direction of flow in this bypass is determined by the design and cycle operation variables.

120: Economizers or Economizer tubular Pipes of the constituent basic Rankine cycle. These are the heat exchanger elements located inside the CRC (103) which serve to preheat the supply water from the feedwater pump (119) to a temperature close to that of its boiling point, with the pressure at which vapor is generated in the constituent basic Rankine cycle.

121: Tubular pipes of the Evaporator and Superheater of the constituent basic Rankine cycle. The Evaporators and Superheaters are the heat exchanger elements located inside the CRC (103) which generate the pressurized vapor of the constituent basic Rankine cycle. The water preheated in the Economizers (120) enters the evaporator pipes, and finally superheated water emerges which is sent to the Turbine TAP (122) or to the supplementary heat Source (132) in the event that the Power Cycle incorporates this element.

122: (High-pressure) Turbine of the constituent basic Rankine cycle TAP. The purpose of this vapor turbine is to generate work according to the constituent basic Rankine cycle. The Turbine TAP (122) receives superheated steam from the tubular pipes of the last Superheater (121) or the supplementary heat Source (132) if this is available. It is characterized by being the turbine that works at the highest pressure in the entire installation, so that it is referred to as TAP for short (an acronym for High-Pressure Turbine in Spanish). This turbine works at back pressure, carrying out a partial expansion of the gaseous fluid in such a way that the outlet vapor is at sufficient pressure to reach the essential heat Source (101) to which the escape vapor is sent.

When, although this is inessential, the Power Cycle has a Turbine TPI (135), this receives vapor from the escape or extracted from the Turbine TAP (122).

130: Power Shaft of the installation. This is the element or array of elements to which all the machines of the installation requiring or generating mechanical work (turbines, pumps, and compressors) are coupled. This power Shaft represents the point from which the useful mechanical energy of the installation (to which the turbines, compressors and pumps of the installation are coupled) is obtained.

With the exception of the pumps and Fan (104), a common power Shaft (130) is represented in the attached figures to facilitate comprehension of how the net mechanical Combined Cycle is obtained, although it is also feasible to embody any Power Cycle according to the present teaching employing individual power shafts connected to independent generators or motors.

Components of the Heat Pump (UAX)

The heat pump, as has been indicated, is a component of the installation of the present teaching which works with ammonia and water.

The components comprising the heat pump, specifically, the UAX are shown in FIG. of the drawings. The equipment making up a UAX is:

201: Main Generator. This is an ammonia desorber which acts as the "cold reservoir" of the UAX and is responsible for receiving the heat released by the Element (107) belonging to the Combined Power Cycle. The main Generator is fed by the intermediate concentration solution of ammonia-water from a secondary Generator (202), and on one side humid gaseous ammonia emerges for compression, while on the other side the dilute solution which is sucked in by a transfer Pump (215) comes out.

202: Secondary Generator. This is a partial ammonia desorber which works using the heat supplied to it by a compressed ammonia vapor Condenser (207). The entire concentrated solution produced at an ammonia Absorber (210), after having been previously cooled, enters the secondary Generator. What emerges from the secondary Generator is, on one side, humid gaseous ammonia to be compressed together with the ammonia obtained from the main Generator (201) and, on the other side, the partially degassed water obtained from the bottom, to be sent to feed the main Generator (201). The secondary Generator (202) works at a pressure slightly higher than the main Generator (201) to get the solution to flow from one of these to the other.

203: Ammonia Compressors. This term is applied to the array of compressors connected in series whose function is to raise the pressure of the humid gaseous ammonia from the two Generators (201) and (202). Compression of the gaseous ammonia is conducted in successive stages of compression connected in series with intervening cooling of the gas, with the aim of maximizing the overall efficiency of the process. To achieve this, the compressor array receives mechanical work from the power Shaft (130) of the Combined Cycle installation. The array of Compressors (203) raises the pressure of the gaseous ammonia to, at least, enable the $NH_3$ saturation temperature to exceed the temperature at which the secondary Generator (202) carries out desorption so that transmitting the heat to this latter equipment is possible.

This refrigerant gas compression stage does not take place in conventional absorption machines, so that this is an essential characteristic of the UAX. By making use of an absorption-desorption cycle in addition to compressors, it is considered that the UAX (200) is a hybrid absorption and compression system that, taken as a whole, acts as a heat pump.

The compressed ammonia vapor which emerges from the last stage is made to circulate through a final compressed ammonia cooling Element (205), and immediately another cooling Coil (206), which means that the heat contained in this compressed vapor is reused in other elements of the UAX.

204: Gaseous ammonia cooling Elements between the successive stages of compression. This is made up of all the heat exchanger elements responsible for cooling the gaseous ammonia between each pair of stages making up the Compressor (203). All these heat exchanger elements are situated inside a supercritical ammonia Evaporator (209), to which they relinquish all the heat they give off, for which reason the temperature of operation of each of these cooling Elements (204) has to exceed the operational temperature of the supercritical ammonia Evaporator (209).

205: Final compressed ammonia cooling Element. Taken together with the final dilute solution heater Element (216), this comprises a heat exchanger. What circulates through the final compressed ammonia cooling Element (205) is the vapor that emerges from the final stage of the Compressors (203), relinquishing heat to the final heater Element (216) with the object that the dilute solution should reach the ammonia Absorber (210) at a temperature no lower than that at which absorption of the gas in this Element (210) takes place. In view of this fact, this Element (205) is the one that has the highest temperature in the entire UAX (200).

206: Compressed ammonia cooling Coil. This lies inside the supercritical ammonia Evaporator (209), downstream from the final compressed ammonia cooling Element (205). In this Coil (206), the compressed gaseous ammonia is cooled before it reaches the compressed ammonia vapor Condenser (207). The heat released by the Coil (206) is used internally to generate gaseous ammonia in the ammonia Evaporator (209), so that it works at a temperature above (that of) the critical point of $NH_3$.

207: Compressed ammonia vapor Condenser. In this equipment, the saturated ammonia vapor under pressure supplied by the Compressors (203) is converted into the liquid phase and transmits all the heat, which it releases by condensation, to the secondary Generator (202) so that the latter can carry out desorption. The compressed ammonia vapor Condenser (207) receives the ammonia in gaseous state from the exchanger Element (206) at the lowest temperature possible, although in such a way that the secondary Generator (202) can function properly. The Expander (218) is what separates the Coil (206) from the Condenser (207).

The liquid ammonia obtained from the compressed ammonia vapor Condenser (207) is impelled to the supercritical ammonia Evaporator ((209) using a condensed ammonia Pump (208).

208: Condensed ammonia Pump. This is the Pump that impels the condensed ammonia, with an outlet pressure above its critical point, from the compressed ammonia vapor Condenser (207) to a supercritical ammonia Evaporator (209). In the impulsion line of the Pump (208), the highest pressure in the entire UAX (200) is reached, unless a TMP turbine (139) is present.

209: Supercritical pressure ammonia Evaporator. This receives the ammonia condensate impelled by the condensed ammonia Pump (208) and converts it into a gas at a temperature and pressure above the critical point of ammonia (113.5 bar/133.5° C.). To achieve this, the Evaporator (209) reuses the residual heat received, on the one hand, from the compressed ammonia cooling Coil (206) and the cooling Elements (204), which transmit the heat that has been generated by the Joule-Thomson effect in the Compressors (203). On the other hand, it also reuses the latent heat transmitted to it by a concentrated solution Coil (211) (more concentrated than the solution that comes out of the desorber), through which one part of the concentrated solution emerging from the Absorber (210) circulates. This implies that the supercritical ammonia Evaporator (209) performs its function by using recycled heat from the UAX system itself, with no contribution from other external sources of heat being required.

The gas that emerges from the ammonia Evaporator (209) in a supercritical state is carried immediately to the Absorber (210).

210: Ammonia Absorber. The purpose of this is to dissolve the gaseous ammonia in water under conditions of supercritical pressure and temperature. This is the element that acts as the "hot reservoir" of the UAX, and which is responsible for transmitting the heat it gives off to the regenerator Reboiler (113) of the Combined Power Cycle.

The Absorber (210) is fed by the gaseous ammonia from the supercritical ammonia Evaporator (209), making use of the Expander (217), and, moreover, it is also fed by the dilute ammonia-water solution from the main Generator (201) after having been impelled by the transfer Pump (215) and preheated by the heat exchanger Elements (214) and (216), successively.

Emerging from the Absorber (210) is the concentrated ammonia solution that is sent to the secondary (202) and main (201) Generators, thus closing the absorption-desorption cycle. Following its emergence from the Absorber (210), the flow of concentrated solution is divided into two currents. One part is made to circulate through the heat exchanger Element (213) of the counterflow exchanger, while the remaining flow circulates through the concentrated solution Coil (211) which provides heat with which supercritical ammonia is generated in the Evaporator (209). Finally, having exchanged their heat, the two solutions of concentrated solution are united again before the Expander element (212).

The dissolution of ammonia in water under supercritical conditions is an exothermic process. The heat released by the ammonia Absorber (210) is transferred to the Reboiler (113) to regenerate vapor in the Combined Power Cycle. Thus, the Absorber (210) discharges the function of "hot reservoir" of the UAX (200).

211: Concentrated solution Coil in the Evaporator (209). This is found inside the supercritical ammonia Evaporator (209), where it releases heat at the cost of lowering the temperature of the concentrated solution circulating through this Coil (211) from the ammonia Absorber (210).

213: Heat exchanger Element between the dilute and concentrated solutions. Concentrated solution side. This Element (213) forms part of a counterflow heat exchanger together with the heat exchanger Element (214). to which it transfers heat. Through this Element (213) circulates the complementary part of the concentrated solution that emerges from the ammonia Absorber (210) but does not circulate through the concentrated solution Coil (211). The mission of this exchanger Element (213) is to lower the temperature of the concentrated solution before it enters the secondary Generator (202).

212: Concentrated solution Expander. Once the two currents of concentrated solution which have been cooled in the heat exchanger Elements (211) and (213), respectively, have been reunited, the Expander (212), situated just before this concentrated solution enters the secondary Generator, procures that the operational pressure of desorption in the secondary Generator (202) is attained.

214: Heat exchanger Element between the dilute and concentrated solutions. Dilute solution side: This Element (214) forms part of a counterflow heat exchanger together with the Element (213). from which it receives heat. The mission of this counterflow heat exchanger is to make the concentrated solution enter the secondary Generator (202) at the lowest temperature possible, while at the same time managing to heat the dilute solution prior to its entry into the ammonia Absorber (210).

Circulating through this heat exchanger Element (214) is the dilute solution from the main Generator (201) impelled by a transfer Pump (215) before it reaches the Absorber (210), with the objective of heating it in counterflow with part of the concentrated solution.

215: Dilute solution transfer Pump. This is the pump that displaces the dilute solution leaving the main Generator (201) and sends it to the ammonia Absorber (210), but passing previously through the heat exchanger Elements (214) and (216) whose purpose is to raise its temperature.

216: Final dilute solution heater Element. The heat exchanger Element (216) constitutes a counterflow heat exchanger together with the final compressed ammonia cooling Element (205). Circulating through this element is the dilute solution from the heat exchanger Element (214), and it uses the heat transmitted by the vapor that emerges from the final stage of Compressors (203) to ensure that the solution reaches the ammonia Absorber (210) at the same operational temperature.

217: Gaseous ammonia Expander towards the Absorber (210). The Expander (217) serves to match the pressure of the supercritical ammonia from the Evaporator (209) to the operating pressure of the ammonia Absorber (210).

218: Gaseous ammonia Expander towards the compressed ammonia Condenser (207). The ammonia Expander element (218) generates the fall in pressure and temperature necessary for the operation of the compressed ammonia vapor Condenser (207) in such a way that the exchange of heat between the Condenser (207) and the secondary Generator (202) can be established.

According to further aspects, the UAX further comprises,

219: an additional Dilute Dilution Pump, which is connected in series with the transfer pump (215) and is located between the heat exchanger elements (214) and (216), in the dilute dilution line to further increase the pumping pressure immediately before the dilute dilution enters the Absorber (210).

220: Additional economizer. This is an additional exchanger element that transfers heat to the reboiler (113)—shown in FIGS. 2, 4). It is, therefore, an optional element that transmits heat to the hot reservoir of the power cycle. The Economizer (220) receives part of the hot concentrated solution leaving the Absorber (210) (and is arranged downstream of this Absorber (210)) through a new bypass line. The Concentrated solution leaving the additional Economizer (220) is sent directly to the Main Generator (201) through the new Bypass line mentioned in this paragraph.

In the case that the UAX Heat Pump (200) includes the new additional element—Economizer (220), this means that the Absorber (210) will not be the only element that constitutes the "Hot Reservoir" of the Heat Pump, but in this case, there will be two elements of heat transfer to the Power Cycle: besides the Absorber (210), also the additional Economizer (220) transmits heat to the Reboiler (113).

221: Dilute solution preheater (221) together with a subcooler coil (222) constitute an additional heat exchanger. The dilute solution preheater (221) is in the dilute solution line coming out of the Main Generator (201), located between the transfer pump (215) and the heat exchanger (214) to preheat this solution.

222: Additional concentrated solution subcooler coil. This element (222) together with the dilute solution preheater (221) constitute an additional heat exchanger. The additional subcooler coil (222) is fed from a new bypass located in the concentrated solution line just downstream of coil (211) which is housed inside the Supercritical Ammonia Evaporator (209). The dissolution cooled flow exiting from the additional subcooling coil (222) is distributed in two new flow lines towards Generators (201) and (202) respectively.

Furthermore, according to any aspect of the present teaching, the installation may comprise one, or two additional bypass lines, which are defined as follows:

An optional $NH_3$ vapor outlet line from the secondary Generator (202) to the second stage of the multistage Compressor (203).

An optional dilution outlet line from the secondary Generator (202) to the dilute dilution line leaving the main generator (201) located just downstream of the transfer pump drive (215).

The particular characteristics of the Absorber unit for exchanging heat (UAX) are determined by the operational requirements and variables of the Combined Cycle which it is assisting.

To "regenerate" efficiently the constituent Brayton cycle of the present teaching, the heat pump, such as UAX (200), meets the following conditions:

Exchange energy solely with the Power Cycle being assisted. That is, all the heat absorbed by the cold reservoir should be taken from the Power Cycle and all the heat released by the hot reservoir should be transferred, anew, to the Power Cycle at a different point. Exchanging energy with the outside would represent a loss of efficiency;

The cold reservoir of the heat pump captures, for the purposes of recovery, the water vapor condensation heat at ambient pressure (between 80° C. and 120° C.).

It is required to attain as great a thermal step (temperature difference) between the reservoirs of the heat pump as possible, as the hot reservoir regenerates condensed saturated water vapor in advance, but at the highest pressure possible to enhance the efficiency of the system;

The performance (CoP) should be as high as possible: in other words, the number of calories transferred from the cold reservoir to the hot one should be very large in comparison with the mechanical work consumed by the compressor;

All of the energy (mechanical and thermal) that the heat pump takes from outside is supplied by the power Shaft (130) of the very Combined Cycle being assisted;

The entirety of the thermal energy (except for the real losses of the heat pump itself) that the heat pump releases should emerge by means of its "hot reservoir" and be used to regenerate vapor in the Power Cycle through its Reboiler (113).

Every absorption machine, and therefore also the heat pump, such as a UAX, works according to a cyclic process of absorption-desorption. Absorption is the name given to the process of dissolution of a gas in a liquid solvent. The inverse, reversible process under which the gas is released from the solution is known as desorption. In the specific case of the UAX, ammonia is used as the solute and water as the solvent.

The absorption of ammonia in water is a reversible exothermic process, so that in every Absorber, there is a release of heat when the gas is dissolved into the liquid phase. For its part, the reverse process of desorption of ammonia in water that takes place in the Generator turns out always to be endothermic, meaning that it needs a supply of heat for it to function.

It is considered that the UAX is a hybrid compression-absorption heat pump as its functioning shares common characteristics with both systems. This means that the UAX is necessarily comprised of absorber, desorber, evaporator, condenser, and compressors, in addition to pumps, gas expander elements and heat exchangers.

Conventional absorption machines are systems consisting of two foci by which the machine absorbs heat from outside (generator and evaporator) and another two by which the machine releases heat to the outside (absorber and condenser).

Nevertheless, for a "heat pump" to be useful in regenerating the Combined Cycle of the present teaching, it is absolutely necessary that it consist of only one "cold reservoir" (from which it receives low-temperature heat from the Power Cycle) and only one "hot reservoir" (by which the heat is returned to the cycle but at a higher temperature). This is precisely the fundamental characteristic of the UAX that distinguishes it from other absorption machines.

Although the UAX (200) consists of the same fundamental elements as any other absorption machines, it is characterized by absorbing external heat at only one focus and releasing it by only one other (considering that real losses can be neglected). This is achieved by recycling the heat released by some of its elements and reusing internal heat to provide the heat required by others of its elements.

Due to the physico-chemical affinity displayed by the components of a solution, the process of dissolution of a gas in a liquid always turns out to be more exothermic than its mere condensation. A direct consequence of this is, in an absorption machine, the foci that work by absorption-desorption—Absorber (210) and main Generator (201)—release and absorb, respectively, more heat than that released in the compressed ammonia vapor Condenser (207) and absorbed in the supercritical ammonia Evaporator (209).

To successfully transfer the maximum specific quantity of heat from its cold reservoir to its hot reservoir, the UAX reuses internally certain flows of heat to prevent its compressed ammonia vapor Condenser (207) and its supercritical ammonia Evaporator (209) from exchanging energy with the outside, so as to maintain the Absorber (210) and the main Generator (201) as the sole hot and cold reservoirs, respectively.

From the thermodynamic point of view, and unlike compression refrigerating machines, conventional absorption machines cannot strictly be considered heat pumps, because they do not transport heat from the cooler reservoir to the warmer one. Normally the machine absorbs heat simultaneously through the coldest element (the Evaporator) and the hottest (the Generator).

One particularity of the UAX (200) distinguishing it from the other conventional absorption machines is that it really does work as a heat pump, transferring heat energy from a cold point to a warmer one. This is achieved by making the heat pump UAX work with its operating pressures reversed with respect to how refrigerating machines commonly work.

In any refrigerating machine, whether based on compression or absorption, there exists one part of the circuit that works at high pressure and another working at low pressure (the condenser works at higher pressure than the evaporator).

In the case of a compression heat machine, the difference in pressure between the evaporator and the condenser is forced by a compressor. The zones of different pressure are demarcated between the compressor and the expander.

In absorption machines, the generator and the condenser work at higher pressures than the evaporator and the absorber. it is the functioning of the absorber-desorber system itself which induces the pressure difference existing between some components and others.

One specific characteristic of the UAX is that it works with operating pressures reversed with respect to conventional refrigerating machines: in other words, its Absorber (210) and supercritical ammonia Evaporator (209) function at higher pressure than its compressed ammonia vapor Condenser (207) and its main (201) and secondary (202) Generators. To achieve this, the transfer Pump (215) makes the dilute solution circulate from the Generator (201) to the ammonia Absorber (210), that works at a higher pressure. To work with pressures inverted, the UAX (200) needs mechanical means. On this point, the UAX is distinguished from any other conventional absorption machine in that the pressure differential in the circuit is not induced, but forced, by employing compressors and pumps for this purpose.

To make the UAX work with inverted pressures, the operational temperatures of the Absorber (210) and the main Generator (201) is determined precisely, as two countervailing effects which affect the solubility of the ammonia in water are produced simultaneously. On the one hand, the liquid phase is capable of dissolving more gas at higher pressures, but on the other, the gas will turn out to be less soluble at higher temperatures.

Obviously, for the system to be able to work as a heat pump it is required that the solubility of the ammonia in water always be higher in the Absorber (210) than in the main (201) and secondary (202) Generators, as in any absorber, there is always a rise in the concentration as the gas is dissolved, whereas in any generator, a dilute solution is always yielded because it is here that desorption of the gas takes place.

To reach the maximum efficiency it is necessary to find the ideal tradeoff between the operational temperatures and pressures in each case because, on the one hand, desorption is fomented in the main (201) and secondary (202) Generators by lowering the pressure, while the efficacy of the ammonia Absorber (210) rises with its operational pressure. However, bearing in mind that the mission of the UAX is to act as a heat pump, it is intended that the thermal step between the hot and cold reservoirs should be as large as possible. Given this, as the temperature rises in the Absorber (210), the ammonia tends to become more insoluble, while as the temperature falls in the main (201) and secondary (202) Generators, the solubility tends to rise, hindering the performance of the desorption. A thermodynamic system that can transfer heat from a point at low temperature to another warmer one using a compressor is known as a "heat pump", and this is precisely the function discharged by the "Absorber unit for exchanging heat" which is the object of the present teaching.

In view of the foregoing, it should be pointed out that to get the "Absorber unit for exchanging heat" (UAX) to work as a heat pump assisting the Power Cycle of the present teaching it is necessary to carry out a series of specific modifications, which constitute particular characteristics of the UAX (200). These specific modifications that distinguish the UAX from other absorption cycles are:

1.—To get the ammonia Absorber (210) to give off heat, but at a higher temperature than that at which the main Generator works (201), it is necessary to invert the pressures of operation: in other words, the Absorber (210) should work at higher pressure than the component with which ammonia is desorbed, the main Generator (201). To achieve this, a transfer Pump (215) is needed, which impels the dilute solution to the ammonia Absorber (210) and an Expander (212) element for the concentrated solution before it enters the secondary Generator (202).

2.—For the UAX not to lose heat to the outside, it is necessary to recycle the heat the compressed ammonia vapor Condenser (207) releases, transferring it to the secondary Generator (202) desorber, so that the working temperature of the former is slightly higher than the temperature of the latter. It is necessary to raise the vapor pressure of the ammonia using the Compressors (203), for it to condense at a higher temperature than that at which it evaporates in the solution in the generator.

3.—Bearing in mind that the heat released by the compressed ammonia vapor Condenser (207) is recycled in the UAX itself, the ammonia Absorber (210) constitutes the only point through which heat is released to the outside (if the real losses of heat from conduction, convection and radiation are considered negligible).

4.—To raise efficiency, the compression of the ammonia employed as refrigerant gas is undertaken in several stages with intervening cooling. This implies that between the stages of compression, there is an amount of heat that is eliminated. Moreover, it is of interest for the compressed ammonia vapor to reach the compressed ammonia vapor Condenser (207) at the lowest temperature possible, always provided it can still transmit heat to the secondary Generator (202).

Making appropriate selections of the operational temperatures of the system it is possible to provide the heat the Evaporator (208) needs, by transferring to it the excess heat contained in the vapor current after the Compressors (203) and the concentrated solution that emerges from the Absorber (210), to convert the ammonia to a supercritical state. When the sum of these excess heats satisfies the demand of the ammonia Evaporator (209), it becomes unnecessary to furnish heat from outside to produce ammonia in conditions beyond its "critical point", and at the same time the need to evacuate cooling heat to the outside vanishes.

5.—By supplying the heat the supercritical ammonia Evaporator (209) needs with heat recycled from the system itself, the main Generator (201) becomes the only focus by which the UAX receives heat from the outside.

Undertaking all these modifications appropriately, it turns out to be feasible to design an absorption machines which, by making use of an array of Compressors connected in cascade (203), prevents its compressed ammonia vapor Condenser (207) and its supercritical ammonia Evaporator (209) from exchanging heat with the outside, leaving the main Generator (201) as the only cold reservoir by which the system absorbs heat from the outside, while the Absorber (210) works at a higher temperature, acting as the only hot reservoir by which heat is released to the outside.

Functioning of the Heat Pump (UAX)

1.—In order that the UAX (200), just like any other absorption system, can operate continuously in a closed cycle, it is necessary to establish a circuit for interchanging solutions between a component that "absorbs" the gas, producing the concentrated solution, and another that "desorbs", yielding the dilute solution. In other words, the dilute solution emerges from the main Generator (201) and circulates to the ammonia Absorber (210), while the concentrated solution leaves the Absorber (210) and circulates to the main Generator (201) in the opposite direction, to be recycled afresh.

According to the foregoing, a counterflow circulation is established for the two solutions between one piece of equipment and another (Absorber (210) and Generator (201), but in the opposite direction.

Given that the generators (desorbers) and absorbers of an absorption machine always work at different pressures, the solution flows form the machine at higher pressure toward the one at lower pressure with no need for mechanical assistance. However, the other solution circulating in counterflow from the equipment at lower pressure toward the one at higher pressure needs to be driven by a pump.

In the UAX (200), unlike conventional absorption machines, the Absorber (210) works at a higher pressure than the main Generator (201) and, in consequence, the transfer Pump (215) impels the dilute solution from the main Generator (201) to the Absorber (210).

2.—The UAX (200) consists of two desorbers or generators, one which we call secondary Generator (202) and the other the main Generator (201). The two generators work in cascade, meaning that the partially desorbed solution emerging from the secondary Generator (202) constitutes the supply for the main Generator (201).

Desorption of the ammonia requires the addition of heat, as this is an endothermic process, so that all the generators require the supply of heat to function. In the UAX, each Generator receives heat from a different source: The secondary Generator (202) is supplied with heat by the compressed ammonia vapor Condenser (207), while the main Generator (201) receives heat from the Combined Cycle. As a consequence, the working temperature of the main Generator (201) is always determined by the condensation temperature of the fluid in the constituent Brayton cycle. This condensation takes place in the Element (107).

The operating pressure of the Generators (201) and (202) of the UAX (200) depends on the degree of desorption (concentration of the dilute solution) for which the UAX is designed, although the secondary Generator (202) always works at a pressure significantly higher than the main Generator (201) so that the intermediate concentration solution flows from one of these to the other without the need for mechanical means. The main Generator (201) is the equipment that works at the lowest pressure in the UAX (200) and therefore it is required that the dilute solution obtained from this component circulates impelled by the transfer Pump (215) at pressure sufficient to feed the ammonia Absorber (210).

3. The ammonia vapor obtained from the two Generators, the main (201) and the secondary (202), just like that obtained in any conventional desorber, always contains a certain amount of humidity. In this patent, the term "ammonia vapor" in the UAX (200) always refers to a "humid" ammonia vapor unless otherwise indicated. In this report, no special consideration is afforded to this humid ammonia as this degree of humidity is very low under the pressure and temperature conditions demanded of the UAX, and this does not alter the essential functioning of the cycle.

This ammonia desorbed in the Generators (201 and 202) is sent to the array of Compressors (203). Here, the process of compression is carried out in successive stages with intervening cooling of the fluid, which is being compressed, for the twin purposes of improving the mechanical efficiency of the compression, on the one hand, and on the other, to have several thermal reservoirs capable of providing heat to the supercritical ammonia Evaporator (209). That is to say, the set of cooling Elements (204) between the stages of compression, transfers this heat to the ammonia Evaporator (209), thus averting its loss outside the cycle.

The set of Compressors (203) obtains its mechanical work from the Combined Cycle itself by means of the power Shaft (130), so that this work is considered as self-consumption by the Combined Power Cycle. Given that the lower the self-consumption of mechanical energy, the greater the net efficiency of the Combined Cycle, it is of interest for the process of compression to be as efficient as possible.

The final pressure of the vapor emerging from the final stage of the Compressors (203) is determined by the operational pressure of the compressed ammonia vapor Condenser (207), and this in turn is a direct function of the temperature at which desorption takes place in the secondary Generator (202) with which it exchanges heat.

4.—It is an operational requirement of the UAX that the ammonia vapor has to come out of the last stage of Compressors (203) at a temperature higher than that of the Absorber (210), so that the final compressed ammonia cooling Element (205) can heat the dilute solution to ensure that the liquid phase enters the Absorber (210) at a temperature no lower than that at which the ammonia vapor dissolves in this equipment.

5.—It is also an indispensable requirement for the functioning of the UAX (200) for the compressed ammonia vapor emerging from the different gaseous ammonia cooling Elements (204), as well as the final compressed ammonia cooling Element (205), to be at a higher temperature than that of the supercritical ammonia Evaporator (209), so that this heat can be transferred using the compressed ammonia cooling Coil (206) with which ammonia is generated in a supercritical state.

6.—After relinquishing heat, the ammonia vapor is made to emerge from the compressed ammonia Coil (206) at the lowest temperature possible—temperature close to that of saturation in the compressed ammonia vapor Condenser (207)—and this is then partially expanded in the Expander (218) to reach the working pressure of the Condenser (207).

7.—In the Condenser (207), the compressed ammonia vapor is converted into liquid, releasing heat which is transferred in its entirety to the secondary Generator (202) so that the latter can perform the partial desorption of the concentrated solution.

To transfer heat from the compressed ammonia vapor Condenser (207) to the secondary Generator (202), the temperature of the saturation of the ammonia vapor that takes place in the compressed ammonia vapor Condenser (207) has to be rather higher than the temperature of the desorption that takes place in the secondary Generator (202). Given that the saturation temperature corresponds to a specific pressure, the latter is what determines the final pressure of the Compressors (203).

8.—The ammonia in liquid phase collected in the bottom of the compressed ammonia vapor Condenser (207) is sent to the supercritical ammonia Evaporator (209), impelled by the condensed ammonia Pump (208) at a pressure above that of its "critical point".

9.—Upon entering the supercritical ammonia Evaporator (209), the liquid ammonia is first heated and then changes to gaseous state at a pressure and temperature above those of the "critical point" of ammonia (113.5 bar/133.5° C.).

The heat the supercritical ammonia Evaporator (209) needs to perform its function is obtained by recuperating the excess heat released by the elements (204), (206) and (211) of the UAX itself, at a temperature sufficient for this.

The heat exchanger elements which supply the heat demanded by the supercritical ammonia Evaporator (209) are the following:

The array of cooling Elements (204) between the different stages of compression.

The cooling Coil (206) that cools the compressed ammonia vapor before it enters the compressed ammonia vapor Condenser (207).

The exchanger Element (211) through which part of the hot concentrated solution that emerges from the ammonia Absorber (210) circulates.

In order that the UAX can work efficiently, depending energetically on the Combined Cycle alone, it is necessary to maintain at all times the equality between the amount of heat demanded by the supercritical ammonia Evaporator (209) and that added by the array of exchanger Elements (204), (206) and (211), respectively.

In the UAX, this thermal balance is attained and controlled by making the Evaporator (209) work at a pressure above that of the critical point of ammonia. This is a fundamental characteristic that distinguishes the UAX from any other conventional absorption machine.

When working at pressures slightly above that of the critical point of $NH_3$ in the Evaporator (209), it is feasible to modify the amount of heat which is absorbed here. When the pressure and temperature of the ammonia exceed its critical point, a "thermal anomaly" appears, in which small variations in pressure in the supercritical fluid require large changes in enthalpy for very small variations of temperature (in the Pressure-Enthalpy diagram for ammonia, the isotherm lines become almost horizontal as soon as the critical point is passed).

A direct consequence of the foregoing is that the energy balance in the supercritical ammonia Evaporator (209) is achieved by making minimal modifications to the pressure at which it operates. This is achieved in its turn through the joint action of the condensed ammonia Pump (208) and the Expander (217), endowing the system as a whole with an extraordinary flexibility of operation.

10.—Once the ammonia leaves the Evaporator (209) under supercritical conditions, it flows to the Absorber (210) as a result of its own pressure.

In the entry line for gas into the Absorber (210), there is the Valve (217) which is responsible for matching the operational pressure of both the ammonia Absorber (210) and the supercritical ammonia Evaporator (209).

By regulating the operational pressure of the Absorber (210), this controls the concentration of ammonia in the solution, the operational temperature and the heat released in this equipment.

11.—In addition to ammonia in a gaseous state, the ammonia Absorber (210) also receives all the dilute solution from the main Generator (201), after it has been impelled by the transfer Pump (215) and heated in the heat exchanger Elements (214) and (216). When the two currents are mixed, this produces the gaseous ammonia solution by means of which the aqueous solution increases its concentration of ammonia, giving rise to what we call the "concentrated solution". Obviously, for this to happen as described, the ammonia is always be more soluble in the Absorber (210) than in the Generators (201 and 202). This is achieved by making appropriate selections of the operational pressures and temperatures of the Absorber (210) and the Generators (201 and 202).

To be able to raise the solubility of the ammonia in water, when the design conditions so require, it is possible to add chemical substances capable of forming complex radicals with the ammonia ion (such as silver chloride, as an example) to the solution.

The solution concentrated in ammonia obtained in the Absorber (210) is sent to the Generators (202 and 201) after it has been cooled, thus closing the working cycle.

As a result of the process of dissolution of the gaseous ammonia, the amount of concentrated solution emerging from the Absorber (210) always exceeds the amount of the dilute solution leaving the main Generator (201).

This is important for the design of the exchangers because the concentrated solution leaves the Absorber (210) at a temperature sufficient for its enthalpy to be reusable at the counterflow Exchanger (213/214), on the one hand, and the Heater (211) located inside the Evaporator (209), on the other.

12.—To carry out this twin heat exchanger function, the current of concentrated solution emerging, hot, from the ammonia Absorber (210) is divided into two. On the one hand, a certain amount of the solution circulates through the heat exchanger Element (213) to preheat, in counterflow, the dilute solution that circulates through the heat exchanger Element (214), while the remaining solution circulates through the concentrated solution Coil (211) relinquishing heat to the Evaporator (209) to produce ammonia in a supercritical state.

13.—After relinquishing their enthalpy and having been cooled, the two currents of concentrated solution are combined into one again before entering the secondary Generator (202).

An Expander (212) element, situated downstream from the secondary Generator (202) acts at the pressure at which partial desorption of the ammonia contained in the concentrated solution in this equipment takes place.

14.—As a result of the partial desorption that takes place in the secondary Generator (202), a certain amount of humid gaseous ammonia is given off, which is sent directly to the Compressor (203).

The heat required by the secondary Generator (202) to desorb the ammonia gas is received by exchange of heat with the compressed ammonia vapor Condenser (207), without any other additional source of heat being necessary.

The intermediate concentration solution obtained from the bottom of the secondary Generator (202) flows to the main Generator (201), which it feeds, under its own pressure, without need for mechanical means.

15.—In the main Generator (201), a second phase of desorption in cascade takes place. As a result of this process. an additional amount of ammonia vapor is released which is sent directly to the Compressors (203) together with the vapor obtained in the secondary Generator (202).

From the bottom of the main Generator (201), a dilute ammonia solution is obtained (more dilute than that emerging from the secondary Generator (202)) and that is what is sent anew to the Absorber (210) by means of the dilute solution transfer Pump (215), thus closing the absorption-desorption cycle.

The heat that the main Generator (201) needs to conduct the final stage of desorption is supplied from outside the UAX, by exchanging heat with the Element (107) of the Combined Power Cycle.

The main Generator (201) is the equipment that works at the lowest temperature of the UAX, being the only point of the cycle by means of the UAX receives heat from outside in such a way as to play the role of "cold reservoir" of this heat pump.

In order for the UAX can work efficiently, the operational pressure and temperature of the main Generator (201) is meticulously specified to satisfy a series of indispensable requirements. On the one hand, it is necessary for the solubility of the ammonia gas under the conditions of the secondary Generator (202) to be lower than in the ammonia Absorber (210) at all times. This is attained by raising the desorption temperature: nevertheless, and on the other hand, the purpose of the UAX (200) is to work as a heat pump and, as such, it is of interest for the main Generator (201) that acts as cold reservoir, to do so at the lowest temperature possible, which means, precisely, that the solubility tends to rise, contrary to what is intended.

16.—The dilute solution obtained in the main Generator (201) is sent to the Absorber (210) so that the UAX works in a closed cycle. For this, it is required for the transfer Pump (215) that displaces the dilute solution to do so at pressures above those of the critical point of ammonia, at which the Absorber (210) operates.

17.—Given that the ammonia Absorber (210) acts as hot reservoir, to improve the efficiency it is of interest that it can transfer as much heat as possible to the Reboiler (113) of the Combined Cycle. This is favored by having the dilute solution arrive at the Absorber (210) at the highest temperature possible.

Countervailing this, the efficiency of the UAX is improved when the main Generator (201) which acts as cold reservoir receiving heat from outside, receives the dilute solution at low temperatures.

To improve the overall efficiency of the UAX (200) and simultaneously satisfy both demands, a counterflow heat exchanger is provided between the dilute and concentrated solutions, made up of the heat exchanger Elements (214) and (213), respectively. 18.—The dilute solution, after having been preheated in the foregoing exchanger, passes through another final additional heater Element (216) that raises the temperature of this solution even more, before it enters the ammonia Absorber (210).

As has been mentioned before, the final heater Element (216) for the dilute solution receives heat from the final compressed ammonia cooling Element (205) (which is at the highest temperature in the entire UAX (200)), through which circulates the ammonia vapor emerging from the final stage of the Compressors (203).

19.—This UAX (200) cycle is closed in the Absorber (210) when the dilute solution mixes with the gaseous ammonia so as to dissolve this latter and giving rise to a concentrated ammonia solution. This is an exothermic process, meaning that it releases heat. This is the heat that is transmitted to the exterior Reboiler (113), thus making the Absorber (210) the "hot reservoir" of the UAX.

Ideally, or in other words, ignoring the inevitable real losses of heat by conduction, convection and radiation, the Absorber (210) is the only point at which the UAX emits heat to the outside.

The process of dissolution of gaseous ammonia that takes place in the Absorber (210) does so at unusually high temperature and pressure (above those of the critical point of NH$_3$), procuring that the solubility of ammonia in the Absorber (210) is always greater than that in the Generators (201 and 202).

This is achieved, contrary to what is intended for the Generator (201), by reducing the temperature of the solution: nevertheless, and to the contrary, given that the function of the UAX is to operate as a heat pump, it is intended that the ammonia Absorber (210) that acts as hot reservoir should do so at the highest possible temperature, which definitely does not further a rise in solubility.

20.—The overall result of the operation of the UAX (200) cycle, taken together, is that this system works as a heat pump in such a way that there is a single hot reservoir made up of the ammonia Absorber (210) and a single cold reservoir comprising the main Generator (201).

Ignoring the real losses and pursuant to the principle of the conservation of energy and the second law of thermodynamics, the UAX releases an amount of heat to the Power Cycle through the Absorber (210), equivalent to the sum of the heat that the main Generator (201) captures from the Power Cycle and the mechanical energy the Compressors (203) and pumps of the cycle receive from the power Shaft (130). This implies that a heat pump UAX (200) always relinquishes more heat by means of the regenerator Reboiler (113) to the Combined Cycle of the present teaching than the heat it has taken from the Combined Cycle of the present teaching through the Element (107), this difference in heat being the lesser, the better the performance of the UAX (200) (high CoP is equivalent to high performance). This has direct implications for the Power Cycle because it means that the Reboiler (113) will need to be supplied with an additional quantity of water, as well as all the condensate produced in the Element (107).

Integration of the Heat Pump into the Combined Power Cycle

For the Combined Cycle according to the present teaching to operate, it is necessary for the Absorber unit for exchanging heat (among which, one particular type is UAX) (200) to be integrated within a single installation, performing the function of "regenerating" the constituent Brayton cycle, recycling the heat released at the coldest point of the cycle to prevent its loss, just as occurs in other conventional combined cycles.

Regeneration of the constituent Brayton cycle by means of a Heat Pump in the present teaching is accomplished by:
using a condensable thermal fluid (water vapor) instead of a gas, as happens in normal Brayton cycles,
taking a certain amount of mechanical work from the Power Cycle to make the heat pump function,
capturing the condensation heat released from the Power Cycle by means of the "cold reservoir" of the heat pump,
returning the heat and work received from the Power Cycle by means of the "hot reservoir" heat pump generating water vapor at higher pressure and temperature than those prevailing previously during the condensation.

To accomplish this class of "regeneration" of the constituent Brayton cycle, the installation avails of:

a heat exchanger system formed by the Element (107) that transfers the water vapor condensation heat at ambient pressure to the cold reservoir of the heat pump,
the regenerator Reboiler (113) that operates at higher temperature than the Element (107) generating water vapor at higher pressure with the heat returned to it by the heat pump through its hot reservoir,
the regeneration condensate Pump (111) that impels the condensate from the Element (107) to the regenerator Reboiler (113). The condensed water is sent from the Element (107) to the regenerator Reboiler (113).

The Regeneration procedure for the constituent Brayton cycle using a heat pump presented in the present teaching confers two singular advantages over conventional regenerative Brayton cycles:

It enables heat released by the constituent Brayton cycle to be recycled precisely at the point of the cycle where the temperature is lowest.

It regenerates the compressed fluid because the water vapor condenses at one pressure and the vapor is then regenerated, but at a higher pressure. This minimizes consumption of the mechanical work of compression necessary to carry the vapor to the essential heat Source (101) of the constituent Brayton cycle.

For this type of regeneration using a heat pump (200) to be possible, it is also required for the power Shaft (130) of the installation to supply the mechanical work of compression necessary for its functioning, this being regarded as an additional self-consumption.

Without considering the real losses and pursuant to the principle of the conservation of energy, the heat pump releases an amount of heat energy through its hot reservoir equal to that which was absorbed by its cold reservoir, plus the work consumed by the compressor. In other words, more heat is always released by the hot reservoir than is absorbed by the cold reservoir. Given that the heat pump does not exchange energy with outside, this mechanical work of compression absorbed from the Power Cycle is later returned in the form of additional heat by the Reboiler (113). For this reason, apart from all the condensate generated in the Element (107), it is necessary to supply the Reboiler (113) with an additional amount of water to be evaporated.

In any case, as is logical, it turns out that the higher the performance (CoP) of the heat pump, the higher will be the net efficiency of the Combined Power Cycle.

One singular characteristic of using a variant of the "constituent Brayton cycle" in which a condensable fluid is used is that it enables thermal fluid to be exchanged with the "constituent basic Rankine cycle" of the Combined Cycle of the present teaching. In the Combined Cycle, which is the object of the present teaching, the amount of additional water it is necessary for the Reboiler (113) to evaporate, with respect to the Element (107), is obtained from currents from the constituent basic Rankine cycle or interconnecting lines between the constituent cycles (Brayton and Rankine).

This possibility of interconnecting the constituent Brayton and Rankine cycles of the Combined Cycle of the present teaching gives rise to other types of advantages, such as the possibility of simplifying the installation by using elements common to both cycles. The objective of incorporating a heat pump into the constituent Brayton cycle is to accomplish its "regeneration", recycling the heat released at the coldest point of the cycle and thus preventing its loss. This type of regeneration turns out to be feasible only when the Brayton cycle is "closed" or "semi-closed": in other words, only when the thermal fluid is not expelled to the atmosphere but returned to the cycle.

Operation in "closed cycle" is accomplished when the Installation functions without material being supplied from outside, in which case the input energy is supplied by exchanging heat with an external source at a temperature sufficient for the purpose (this could be of solar or nuclear origin, to cite examples).

Operation in "semi-closed cycle" is accomplished when the input of energy into the Installation takes place by means of a process of "internal oxy-combustion" performed in a burner.

In the case that the Combined Cycle is semi-closed, it will have at least one burner as a source for supplying energy to the Power Cycle. Any burner of the Combined Cycle employs as comburent only industrial pure oxygen diluted in pressurized water vapor in a process known as "oxy-combustion", in which the gases of this chemical reaction come to form part of the thermal fluid in the burner, Thus, the semi-closed Combined Cycle, apart from employing "oxy-combustion", also employs "internal combustion".

Any element or substance other than $O_2$ present in the comburent (such as Nitrogen, Sulfur, etc.) is undesirable because it contaminates the thermal fluid and poses operational problems for the Combined Cycle. This precludes the possibility of using air as comburent in this Combined Cycle.

The semi-closed Combined Cycle can use any fuel meeting the following requirements:

The fuels employed are liquids or gaseous but never solids.

The fuel employed in the burners of the Combined Cycle may comprise a single substance or be a mixture of several fuels.

The chemical composition of the substances employed as fuels satisfies the generic formula $C_XH_YO_Z$, where the letters C, H and O refer to the elements Carbon, Hydrogen and Oxygen, respectively, and the subscripts "X, Y, Z" represent the stoichiometric content of each of those elements pursuant to the following prescriptions:

The subscript "Z" for oxygen in the generic formula may be zero or any other value. According to this, any hydrocarbon fulfilling all the foregoing requirements is amenable for use as fuel in the Combined Cycle.

Pure hydrogen can be used as fuel in any case. Nevertheless, for installations using $H_2$ as sole fuel, and for reasons of efficiency and simplicity of the Installation, this needs to be considered as a special case, according to Configuration-4 (FIG. 4) of the Combined Cycle.

case that the subscript "Y" for hydrogen can take the value zero.

Any other chemical compound containing elements other than Carbon, Hydrogen and Oxygen is undesirable.

The fuels amenable to use are real chemical substances capable of reacting chemically with oxygen in an exothermic process of combustion.

The chemical reaction of combustion is conducted without any other kind of secondary chemical reaction taking place simultaneously.

In any "semi-closed internal oxy-combustion" process, a continuous input of matter to the cycle takes place intrinsically (in the form of fuel and comburent), so that to establish the matter balance of the cycle, it is indispensable that the amount of matter entering be eliminated in another part of the cycle in the form of combustion products. As only combustion products are eliminated from the cycle ($CO_2$ in liquid or gaseous state and liquid $H_2O$, separately), later processing of these for any kind of industrial use turns out to be very simple, without the emission of greenhouse effect gases entailed by open cycles. In the cycle of the present teaching, the water emerges in liquid form at ambient temperature, representing an insignificant environmental impact while, on the other hand, the $CO_2$ is obtained in a concentrated and confined form, with no specific procedure for its capture being necessary.

In fact, this particular feature of the Combined Cycle, under which the combustion products are eliminated "separately, concentrated and at low temperature" is one of the fundamental grounds on which the present Power Cycle yields higher efficiencies than other open combined cycles of the state of the art.

One of the fundamental features of the Power Cycle of the present teaching that distinguishes it from conventional combined cycles is its indispensable condition that there be an energy balance at all times, in that the energy entering the Power Cycle by means of the heat Sources (101) and (132) is equal the sum of the energies emerging from the Power Cycle through the power Shaft (130), as net work of the Cycle, plus the heat lost through the Sink (128).

Any variation arising between the constituent Brayton cycle, the constituent basic Rankine cycle, and the UAX are offset to maintain this equality by transferring heat between them and, there exists a temperature differential between one fluid and another permitting this. Otherwise, it will be necessary to evacuate energy from the Cycle, losing mechanical power and/or performance One of the fundamental aspects of the present teaching lies in establishing a permanent energy balance between the Power Cycle and the heat pump so that they interchange energy, and avoid excess heat because these will have to be carried to the outside environment, implying a loss of efficiency.

For the two cycles to work in "symbiosis" in the manner described, it is necessary for the Power Cycle to be capable of capturing all the heat that the heat pump returns to it by means of its Hot Reservoir.

For the reasons set out in the immediately foregoing paragraphs, the preferred aspect of the present teaching is that of configuration 6 which envisages the possibility of extracting a certain vapor flow from the Element (112).

In order to apply this vapor flow generated in the Element (112) according to the present teaching usefully within the Power Cycle, three possible options are proposed:

A.—Send this vapor flow to an initial additional stage of the vapor Compressor (115) so that this vapor is added to the flow of vapor from the Element (114) for them to be compressed together and sent to the essential heat Source (101).

B.—Send this vapor flow to a superheater Coil (136) which raises its temperature for immediate expansion in an additional Turbine (137) whose outlet is connected directly to the inlet of the Turbine TBP (127). In this case, this additional flow of vapor circulating through the Low-Pressure circuit is returned to the constituent basic Rankine cycle along a bypass line after the Pump (123).

C.—Send one part of this flow of vapor to each of the foregoing options A and B, in combination.

These three alternatives are shown in configuration 5—FIG. 6.

PARTICULAR ADVANTAGES OF THE INSTALLATION OF THE PRESENT TEACHING

The fundamental advantages brought by the Combined Cycle of the present teaching with respect to other procedures for the generation of mechanical energy are basically the following:

With the Power Cycle of the present teaching, performance as good or better than that offered today by other available procedures in the current state of the art is obtained.

With the Power Cycle of the present teaching, a lower environmental impact than that generated by other available procedures in the current state of the art is obtained.

The most advantageous singular features characterizing the Combined Cycle of the present teaching are:

The Combined Power Cycle employs water as thermal fluid common to all the equipment comprising it. This makes it possible for:

The Combined Power Cycle to integrate, at least, one constituent Brayton cycle and one constituent basic Rankine cycle into a single cycle. This makes it possible for:

The Combined Power Cycle to be capable of working both in closed cycle and in semi-closed cycle (internal oxy-combustion).

The Combined Power Cycle is regenerated using the heat pump. This makes it possible for:

The Combined Power Cycle to perform the capture of the $CO_2$ (generated in the process of oxy-combustion) as a concentrated gaseous or liquid residue which is obtained confined in a specific component of the cycle—Element (107).

When a $CO_2$ liquefaction plant is present, integrated into the installation and performing the function of the Element (107), the efficiency of the process for obtaining liquid $CO_2$ turns out to be very high, because the heat generated in the successive stages of compression of the $CO_2$, instead of being lost, is recouped by transferring it to the cold reservoir (201) of a heat pump capable of reusing it.

The Combined Power Cycle (excepting the real losses and the cogeneration heat) releases heat to the environment through a single thermal reservoir—heat Sink (128). The heat released by the remaining elements is reused by some other element of the same cycle.

The integration of an absorption heat pump) into the tail of the constituent Brayton cycle is a key and innovative element introduced by the Combined Cycle of the present teaching, The heat pump integrated into the power cycle enables the following characteristic effects, particularly novel and advantageous, to be achieved:

1) Enhancement of the overall efficiency of the Power Cycle. The heat pump captures heat from the Power Cycle at its cold reservoir to reintroduce it into the cycle by its hot reservoir. This means that there are no losses of heat from the thermal fluid to the outside in the isobaric cooling stage of the constituent Brayton cycle. This means that the Condenser (128) performs the function of the sole heat sink of the Combined Cycle through which heat is relinquished to the outside.

2) Regeneration of the constituent Brayton cycle. The present teaching is a novel procedure of "Regeneration" for the constituent Brayton cycle, according to which, with the heat energy transferred by the "heat pump", part of the vapor of the Power Cycle is regenerated.

3) Reduction of the mechanical work of compression in the constituent Brayton cycle. In the Power Cycle, the heat pump achieves an effect equivalent to that of compressing vapor, because the process of transfer of heat energy performed by the heat pump implies the condensation of vapor at ambient pressure (with the heat absorbed by the "cold reservoir") to later produce vapor again at a higher pressure (with the heat released by the "hot reservoir"), at another point of the same cycle.

4) Reduction of environmental impact. In the present teaching, the process of sequestration of carbon dioxide is conducted intrinsically, in that the functioning of the Combined Cycle itself disposes of this combustion product gas at a specific point of the Combined Cycle—Element (107). By integrating the heat pump) into the semi-closed Combined Cycle of the present teaching, the complete condensation of the thermal fluid (water) is achieved, leaving only the $CO_2$ free. With this procedure, the Combined Cycle of the present teaching does not emit any kind of gases from combustion directly into the atmosphere.

The overall effect accomplished by coupling the heat pump to the constituent Brayton cycle is equivalent to compressing its thermal gas, in the sense that, starting from a gaseous fluid it has at low pressure and temperature, a process (of regeneration) is conducted which yields this same gaseous fluid but at higher pressure and temperature.

The key difference lies in, to obtain this compressed fluid, instead of mechanical means, a heat pump is employed. The use of a heat pump to generate a compressed vapor furnishes, additionally, a clear environmental advantage when compared with other methods based upon the use of hydrocarbons as fuel in the current state of the art, because it induces the capture of the gases from the combustion, whose emissions entail harmful effects upon the environment.

Provided that fuels are used in a semi-closed oxy-combustion cycle, $CO_2$ is going to be produced, which accompanies the water vapor until it is cooled by the cold reservoir of the heat pump. All this $CO_2$, which is obtained concentrated and in a gaseous state, is removed from the Power Cycle when all the water vapor it contains has condensed. The capture of the $CO_2$ generated in the burners of the Combined Cycle takes place as a direct consequence of the operation of the equipment of the cycle, and in no case is any specific procedure to "capture" the $CO_2$ conducted: that is to say, that even if the capture of $CO_2$ were not of environmental interest, the Cycle would work in the same manner and the $CO_2$ captured could be discharged directly into the atmosphere. In this Cycle, the capture of $CO_2$ is an advantage and not an option.

This means that the capture of $CO_2$ occurs intrinsically in the Power Cycle as a direct consequence of regenerating the constituent Brayton cycle with a heat pump. With this procedure, no other additional procedure to sequester the $CO_2$ from the combustion in this Combined Cycle is necessary.

PARTICULAR ASPECTS OF THE INSTALLATION OF THE PRESENT TEACHING

In the particular aspects described below, the heat pump UAX can be replaced by any heat pump, provided that it meets the conditions indicated above:

1—that the cold reservoir of said heat pump (200) works at temperatures between 80° C. and 120° C.

2—that the hot reservoir, obviously, works at a higher temperature,

3—that the heat pump exchanges heat exclusively with the Power Cycle.

4—that the heat pump obtains the mechanical work from the Power Shaft (130).

To successfully maximize performance, it is necessary for the Combined Cycle of the present teaching to avail of a series of additional equipment.

Figure 1:
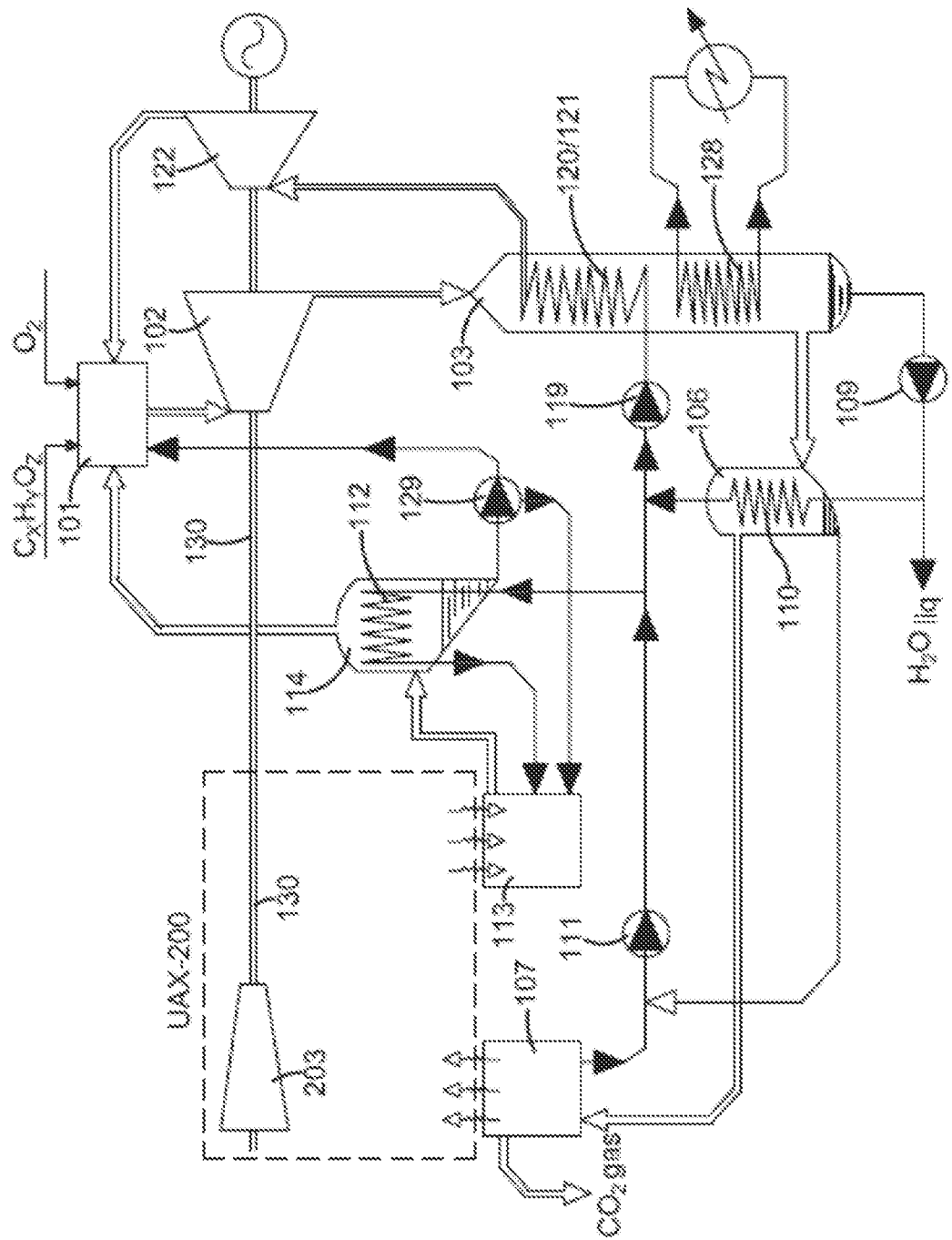
FIG. 1 shows the conceptual design version of an "Essential Combined Cycle" according to Configuration-1 which has the elements indispensable for the Combined Cycle to be able to function assisted by a heat pump (for example, UAX), pursuant to the present teaching. Whatever may be the design configuration of the Power Cycle, it contains all the elements included in this FIG. 1.
Figure 2:
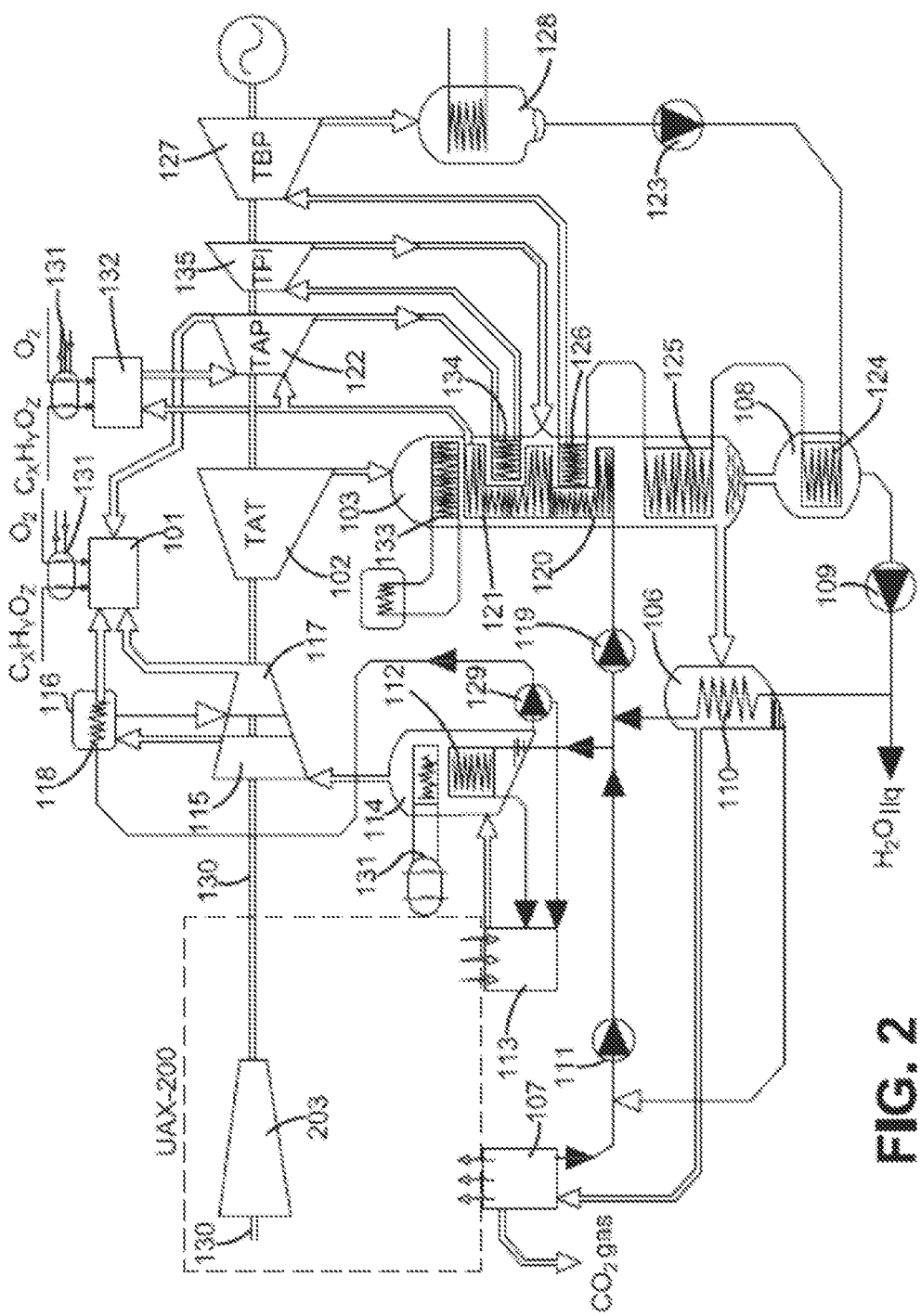
FIG. 2 shows schematically the design version of the installation to implement the Combined Cycle for the generation of mechanical energy according to Configuration-2 of the present teaching, which includes, in addition to the essential equipment of the cycle (shown in FIG. 1), the elements which confer improved efficiency upon the Combined Cycle, with the particular feature that it works at a pressure above atmospheric pressure throughout the Heat Recovery Conduit (CRC) (103). In the final section of the CRC (103), vapor is generated in a secondary Rankine cycle which uses its own thermal fluid independent of the rest of the Power Cycle. This configuration supposes that, within the CRC (103), there exists a final conduit section where partial condensation of the water vapor circulating in it to generate vapor in the secondary Rankine cycle takes place.

With the objective of improving the overall efficiency of the Combined Cycle, the Combined Cycles corresponding to FIGS. 2, 3 and 4 yield basically four types of improvement with respect to the Essential Cycle shown in FIG. 1:

1.—Increase the pressure in the essential heat Source (101). This is achieved by raising the pressure of the vapor regenerated in the Reboiler (113) and to this end, one or more additional stages of mechanical compression are provided using certain compressors (115) and (117). This process of compression is undertaken in several stages with intervening cooling, making use of the exchanger formed of the Elements (116) and (118).
2.—Increase the temperature of the vapor entering the Turbine TAP (122). This is achieved by providing an additional supplementary heat Source (132) that raises the enthalpy of the vapor of the constituent basic Rankine cycle.
3.—Use part of the heat held by the outlet gases from the Turbine TAT (102) for industrial uses unrelated to the Power Cycle. By doing so, mechanical and useful heat energy are obtained simultaneously in a process which is known as "cogeneration".
4.—Reuse part of the heat which is released at the heat Sink. It turns out to be feasible to successfully enhance the performance of the Combined Cycle of the present teaching when the heat sink is made up of a heat recovery circuit that generates vapor in another secondary Rankine cycle at lower pressure than the constituent basic Rankine cycle. To attain this, the present teaching proposes four different types of configurations (represented in FIGS. 2, 3, 4 and 6).

These four types of improvements to the Combined Cycle are mutually compatible in their entirety. Nevertheless, with regard to the fourth type of improvements indicated above, it should be said that there exist different methods for reusing the heat released by the essential sink of the Cycle—Condenser (128) Element of FIG. 1—replacing this by a secondary Rankine cycle in such a way as to harness part of the heat captured to convert it into work using the Turbine TBP (127), and in such a way that the Condenser of this secondary Rankine cycle passes to performing the indispensable role of "sink" for the heat of the Combined Power Cycle. There exist four different configurations of the Combined Cycle, depending on how the secondary Rankine cycle is integrated. These three configurations correspond to FIGS. 2, 3, 4 and 6 respectively. Each of these configurations consists of particular equipment and elements, detailed later on, where the particularities of each configuration are set out separately.

To accomplish the first three types of improvements, the Combined Cycle of the present teaching is designed to include a series of additional equipment. It is important to emphasize that the additional equipment is that not forming part of the essential basic cycle, and these are so designed as to operate in a way to implement different versions of the Combined Cycle which are more efficient and confer additional advantages beyond those brought by the essential configuration pursuant to FIG. 1.

The fourth type of improvement mentioned above is founded upon partial reuse of the heat released in the heat Sink, availing in its place of a secondary Rankine cycle. The present teaching envisages four types of configurations, depending on how the secondary Rankine cycle is integrated into the Combined Cycle. Each of these configurations requires its own additional equipment, as will now be detailed.

The additional equipment making up the different versions of the Combined Cycle according to the present teaching are as follows:

115: First water vapor Compressor. This Compressor (115) undertakes a first stage of compression of the water vapor from the condensation heat exchanger Element (114). Moreover, in those cases in which the design of the Installation so envisages, there exists the possibility that a certain amount of vapor generated in the Element (112) is compressed in a first additional stage of the Compressor (115). In this particular case, that first additional stage in the Compressor (115) is required because the pressure of this vapor generated in this Element (112) is always lower than that of the vapor entering the Compressor (115) from the Element (114).

The thermodynamic performance of the Power Cycle rises as the pressure in the Turbine TAT (102) increases, and this is achieved by raising the pressure of the vapor entering the essential heat Source (101). To get the water vapor to reach the essential heat Source (101) at a higher pressure than that of the vapor generated in the Reboiler (113), it is possible to use additional mechanical means. For this, the Compressor (115) which increases the pressure of the water vapor emerging from the side of the exchanger (114) is provided, employing mechanical work obtained from the power Shaft (130) of the installation.

When the vapor is compressed, this increases the temperature (due to the Joule-Thomson effect), although the process of mechanical compression is more efficient as the gas being compressed is colder. The conclusion to be drawn from this is that the thermodynamic performance of the process of compression is greater when it is carried out in multiple stages. For this reason, the vapor emerging from the Compressor (115) is sent for cooling to the heat exchanger Element (116) before the next stage of compression is conducted.

Vapor cooling exchanger between stages of compression consisting of the Elements (116) and (118):

116: Shell side of the vapor cooling exchanger between stages of compression. This Element (116), together with the heat exchanger Element (118), forms a heat exchanger. The outlet vapor from the Compressor (115) is cooled by circulating it through an Element (116) before passing to the next Compressor (117) so as to improve the mechanical efficiency of this equipment. Inside it, there is the heat exchanger Element (118), through which condensate obtained from the bottom of the element (114) circulates and serves as refrigerant.

118: Vapor cooling Element between stages of compression. This heat exchanger Element (118) together with the heat exchanger Element (116) forms a heat exchanger. This heat exchanger (116/118) will always exist provided that a second Compressor (117), in cascade with the first one (115), is available. In the case that the Installation does not have the Compressor (117), the exchanger (116/118) is optional.

The heat exchanger Element (118) is a coil or any other heat exchanger element through which water circulates, that serves as refrigerant to cool the vapor between the successive stages of mechanical compression performed by the Compressors (115) and (117). The condensate Pump (129) impels the water that circulates through this heat exchanger Element (118) and the current emerging from this is sent to the essential heat Source (101).

117: Final water vapor Compressor. Made up of another additional compressor connected in series with the preceding Compressor (115). This Compressor (117) receives the cooled vapor from the Element (116), and from it emerges vapor at sufficient pressure to feed the essential heat Source (101).

It is obviously also feasible to compress the vapor using only one vapor compressor and conduct this operation in just one stage. Therefore, there exists the option of forgoing this additional vapor Compressor (117), but it if does exist, it will always be connected in series with the Compressor (115) after the intermediate cooling exchanger (116/118).

131: Auxiliary heat exchanger Element for preheating of fuel and comburent (prior to their entry into burners). This is a tubular pipe, coil or other heat exchanger element through which circulates an auxiliary fluid located, optionally, according to the particular design requirements of the Installation, after some Low-Pressure Evaporator (125) element, or inside the condensation heat exchanger Element (114), and from which it absorbs heat which is used to preheat, separately, both the fuel and the comburent above the conditions of their supply to the temperature at which they are sent to the oxy-combustion burners.

Apart from being used to preheat the fuel and comburent of the Combined Cycle, the heat from the Coil (131) can be destined for any other application independent of the Power Cycle, in which case, and for all purposes this is deemed to be "cogeneration".

132: Supplementary heat Source. When a supplementary heat Source (132) is incorporated, it is situated immediately after the tubular pipes of the Evaporators and Superheaters (121) for the vapor at the exit from the CRC (103) and its mission is to raise the enthalpy of the vapor in the constituent basic Rankine cycle for it to enter the Turbine TAP (122) with a higher level of superheating.

When the Combined Cycle is "closed", the supplementary heat Source (132) consists of an additional heat exchanger that receives heat from an external source. When the Combined Cycle is "semi-closed", the supplementary heat Source (132) can be an additional oxy-combustion burner that operates at higher pressure than the essential heat Source (101).

133: Heat exchanger Element for cogeneration. This comprises a tubular heat recovery circuit for use in external applications of cogeneration beyond the Power Cycle. Therefore, it works by circulating a fluid independent of the rest of the installation.

The heat exchanger Element (133) represents an additional focus of heat by which heat is released outside the Combined Cycle, but this is considered as useful heat that is given industrial uses. Indeed, it is considered that the heat energy extracted from the Power Cycle by the heat exchanger Element (133) emerges at temperature sufficient to put it to use in different types of common industrial processes in a range that could run between 175° C. and 600° C., depending on the design of the installation.

In some cases, depending on the pressure and temperature variables with which the Cycle is designed, it is required that the heat exchanger Element (133) should extract heat from the CRC (103) so it can establish the energy balance of the cycle permanently (especially when the Combined Cycle has two heat sources).

In accordance with the unavoidable requirements to have to establish the energy balance, the amount eliminated from the Cycle in the form of cogeneration heat is determined by the needs of the Combined Cycle and not by the thermal demand from any equipment of external consumption, unless the Combined Cycle has some additional internal system enabling it to modify its energy balance.

Whether or not there is a cogeneration coil (133) to extract heat from the CRC (103), the Combined Cycle of the present teaching can include an "auxiliary heat relief system" made up of two additional pieces of equipment—Reheater (134) and Turbine TPI (135)—which are provided to establish the energy balance that is maintained permanently in the installation, reducing the amount of vapor entering toward the heat Sources (101) and (132), and consequently to the CRC (103) as well. In other words, it is possible to alleviate the heat by modifying the internal functioning of the cycle instead of having to shed heat to the outside.

The "auxiliary heat relief system" is formed by a vapor extraction device at the outlet of the Turbine TAP (122), which circulates through the Reheater (134), then through the Turbine TPI (135) and finally reintroduces the outlet vapor into the final section of the CRC (103).

The "auxiliary heat relief system" is useful as a way to dampen the energy imbalances that arise during the normal operation of the Combined Cycle, and even changes in load. For certain design configurations, especially in those cases where a double heat Source (101) and (132) is available, this equipment may become indispensable.

The "auxiliary heat relief system" uses as its working fluid one part of the water vapor belonging to the constituent basic Rankine cycle, so that when present it is considered to form part of this.

134: Auxiliary Reheater of the constituent basic Rankine cycle. The Reheater (134) is found inside the CRC (103) itself and is made up of a tubular circuit that heats the vapor extracted from the outlet of the Turbine (122) and immediately sends it to the auxiliary Turbine TPI (135).

135: Auxiliary intermediate-pressure Turbine TPI of the constituent basic Rankine cycle. The function of this steam Turbine is to generate work, following the constituent basic Rankine cycle.

The Turbine TPI (135) receives vapor from the outlet of the Turbine TAP (122) after it has been previously reheated in the Reheater (134) to increase the mechanical efficiency. It is characterized by being the turbine that works at a pressure lower than the Turbine TAT (102) and higher than the Turbine TBP (127) so that it is denoted by its initials in Spanish TPI (Intermediate Pressure Turbine). This Turbine works at back pressure, in other words, carrying out a partial expansion of the vapor so that the outlet is at sufficient pressure for the vapor to be introduced at a certain point of the CRC (103) (where the temperature of the vapor entering the conduit and the temperature of the gases circulating through the conduit match).

In order that certain high-efficiency designs of the Power Cycle can work coupled to low-efficiency heat pumps UAX, without needing to transmit losses to the exterior, it is necessary that an additional current of water vapor should emerge from the Element (112) (at pressure above atmospheric).

Thus, the Power Cycle can transform the amount of excess heat transmitted to it by the UAX into a certain amount of vapor.

There exists the option of sending this vapor generated in the Element (112) directly to the Compressor (115). This option does not require considering any additional equipment, and it is only required to endow the Compressor (115) with means to carry out a first additional stage of compression so as to match the pressure of the vapor entering from the Element (114).

Configuration-2 and Configuration-3 are the most appropriate for the design of oxy-combustion Combined Cycles which use, in addition to hydrogen, the other possible fuels containing carbon, because their combustion gives rise to carbon dioxide. The presence of this gas requires that the secondary Rankine cycle should be independent of the rest of the Power Cycle because incondensable gases prevent the "vacuum" pressures necessary to operate economically from being reached. In these configurations of the Combined Cycle that include an independent secondary Rankine cycle, there is the possibility that the latter Rankine cycle should use thermal fluids other than water such as, for instance, the ORC (Organic Rankine Cycles) that use organic fluids as thermal fluid.

The vapor generated in this independent secondary Rankine always works at a pressure below that of the constituent basic Rankine cycle because its temperature is very different. With the steam produced in the secondary Rankine cycle, the Turbine TBP (127) is moved, and this provides additional work to the power Shaft (130) of the Combined Cycle. Subsequently, the steam emerging from this Turbine TBP (127) passes to a Condenser (128) which genuinely carries out the function of heat sink, so that the resulting Combined Cycle loses energy, transferring it to the outside. The condensate obtained in the bottom of the Condenser (128) is impelled by the Pump (123) to the Economizer (124), Evaporator (125) and Superheater (126) in succession before it is returned to the Turbine (127) and thus closing the cycle. When the Installation has a Superheater (136) and a Turbine (137) for regenerated steam, there exists a bypass line along which this additional vapor, after the condensate Pump (123), returns to feed the Brayton and basic Rankine cycles.

Configuration 2

The installation of the present teaching according to additional aspects corresponding to Configuration-2, shown in FIG. 2, is characterized by the following:

- It includes an independent secondary Rankine cycle that uses its own thermal fluid, independently of the rest of the Power Cycle.
- The heat recovery Conduit CRC (103) works at pressure above atmospheric.
    - Condensation of vapor takes place in the final section of the CRC (103) where the temperature of the gases is lower.

The mode of operation of the installation according to Configuration-2 consists basically of providing an Evaporator circuit belonging to an independent Rankine cycle in the interior of the heat recovery Conduit CRC (103). This Evaporator circuit generates its vapor with the heat from the condensation that takes place in the final section of the CRC (103) where the temperature is lower, The condensed water obtained in the bottom of this CRC (103) is sent to an external exchanger (108/124) where the heat the condensate holds is transferred to the Economizer (124) of the secondary Rankine cycle.

Configuration-2 includes all the elements of configuration 1, and in addition, the following:

108: Shell side of the economizer exchanger of the secondary Rankine cycle. The Element (108) makes up a heat exchanger together with the Economizer (124). Through the heat exchanger Element (108) circulates the condensate collected, either from the bottom of the heat recovery Conduit CRC (103) or from the bottom of the Conduit (105), in accordance with the design in question, transferring heat to the Economizer (124) of the secondary Rankine cycle.

124: Economizer of the secondary Rankine cycle. Together with the heat exchanger Element (108), this constitutes a heat exchanger. The Economizer (124) is the heat exchanger element of the secondary Rankine element deployed inside the heat recovery Element (108) from which it receives heat, raising the temperature of the condensate (to bring it close to its boiling point) that it returns to the Condenser (128) impelled by the secondary Rankine cycle feed Pump (123).

123: Secondary Rankine cycle feed Pump (low pressure). This is the Pump that impels the thermal fluid from the Condenser (128) to the Economizer (124) of the secondary Rankine cycle.

125: Secondary Rankine cycle Evaporator (low pressure). This is the heat exchanger element provided—according to Configuration-2—in the last section of the heat recovery Conduit (103) from which it receives condensation heat. Its mission is to receive the fluid from the Economizer (124) and convert it into vapor for the secondary Rankine cycle.

When the Installation is designed according to Configuration-5, the Evaporator (125) of the secondary Rankine cycle can be divided into two sections connected in parallel.

126: Secondary Rankine cycle Superheater (low pressure). This is the heat exchanger element provided inside the recovery Conduit CRC (103) and whose mission is to raise the temperature of the vapor generated in the Evaporator (125) element of the secondary Rankine cycle before it enters the Turbine TBP (127).

127: Secondary Rankine cycle Turbine (low pressure) TBP. This is the Turbine of the secondary Rankine cycle that furnishes additional mechanical work to the power Shaft (130). The Turbine TBP (127) receives the vapor from the Superheater (126) and the output vapor is sent to the Condenser (128) which acts as the heat sink for the Combined Cycle.

Optionally, Configuration-2 can include all the elements mentioned above in the section entitled "particular aspects of the installation of the present teaching".

Configuration 3

The installation of the present teaching according to additional aspects corresponding to Configuration-3, shown in FIG. 3, is characterized by the following:

- It includes an independent secondary Rankine cycle that uses its own thermal fluid, independently of the rest of the Power Cycle.
- The heat recovery Conduit CRC (103) works at ambient pressure.
- There is no condensation of vapor in the CRC (103) unless an independent condensation Conduit (105) is provided for that purpose.
    - It includes a Fan (104) that extracts the gases from the CRC (103) and compresses them in such a way that the condensation Conduit (105) operates at a higher pressure than that of the output from the CRC (103).

The fundamental difference with respect to Configuration-2 consists in the fact that in its operation in Configuration-3, the recovery Conduit CRC (103) works at a lower pressure (generating a greater amount of work at the Turbine TAT (102) and making the input temperature of gases into the CRC (103) lower) and then, by means of the Fan (104), the gases emerging from this Conduit are compressed to get the condensation temperature of the steam to rise and thus raise the working pressure of the secondary Rankine cycle. By successively transmitting heat at a higher temperature to the secondary Rankine cycle, it increases the mechanical work generated by the Turbine TBP (127).

This Configuration-3 includes, in addition to all the elements included in Configuration-2, the following:

104: Fan. This is an induced-draft Fan situated at the outlet of the gases from the heat recovery Conduit (103), that separates the condensation zone of the heat recovery Conduit CRC (103) by situating it in an independent condensation Conduit (105). The Fan (104) produces an increase in the pressure of the vapor aspirated by the CRC (103) by getting the saturation temperature of this vapor to rise. This increase in the vapor saturation temperature on the side of the Conduit (105) means that the vapor of the secondary Rankine cycle can be generated at a higher temperature, which leads to an improvement in efficiency.

Provided that the Installation has a Fan (104), the Evaporator (125) of the secondary Rankine cycle can be divided into two sections working in parallel, one of them situated in the Conduit (105) and another in the Conduit (103) after the Economizer (120). This design alternative is feasible in any of the configurations 2, 3 and 5, although it is only represented in configuration 5 (FIG. 6).

105: Independent condensation Conduit. This is a section of the heat recovery conduit in which water vapor contained in the gaseous phase emerging from the CRC (103), impelled by the Fan (104), condenses.

Unlike what happens in Configuration-2, in Configuration-3, the Evaporator (125) belonging to the secondary Rankine cycle is located inside the section of the condensation Conduit (105) with which condensation heat is exchanged to generate the vapor of the secondary Rankine cycle.

When the cycle is designed according to Configuration 5, the Evaporator (125) is made up of two sections that work in parallel: one within the Conduit (103) and another within the Conduit (105).

Configuration 4

The installation of the present teaching according to additional aspects corresponding to Configuration-4, shown in FIG. 4, is characterized by the following:

- It includes a secondary Rankine cycle that uses the thermal fluid common to the rest of the Power Cycle.
- The secondary Rankine cycle does not have economizers, evaporators, or superheaters.
- The heat sent to the Turbine TBP (127) is obtained directly by extracting it from the heat recovery Conduit CRC (103).
  - The condensate obtained from the secondary Rankine cycle is employed directly as feedwater to the rest of the Combined Cycle.

Configuration-4 is a design simplification of the Combined Cycle in which the steam circulating through the Combined Cycle is also used as the fluid of the secondary Rankine cycle that is possible, always provided there is no presence of $CO_2$ or other gases incondensable at atmospheric pressure at any point of the Combined Cycle. This only happens when the installation is designed to work on a closed cycle and when hydrogen is the only fuel possible.

It should be said that hydrogen can be used as fuel in any of the possible configurations of the Combined Cycle although, when hydrogen is used as the only fuel, it is preferred to use this version of the design (as shown in FIG. 1) because it is simpler and may be more efficient.

In this Configuration-4 of the Power Cycle, the secondary Rankine cycle works with the same fluid as the rest of the Combined Cycle. The vapor of the secondary Rankine cycle according to this Configuration-4 is obtained from a current extracted directly from the Conduit CRC (103), which is sent directly to the Turbine TBP (127) of the secondary Rankine cycle, and, on the other hand, condensate obtained from the Condenser (128) is returned directly to feed the rest of the Combined Cycle using the Pump (109). A direct consequence of this is that in this design version, there are no heat exchanger elements generating their own vapor: that is to say, there are neither Economizer (124), Evaporator (125), nor Superheater (126)

In this configuration, the Secondary Rankine cycle feed Pump (123) is also dispensed with because the Pump (109) returns the condensate directly from the Condenser (128), as feedwater for the rest of the Combined Cycle.

When a semi-closed cycle is implemented with hydrogen as fuel in accordance with Configuration-4, water is the only product obtained from the combustion, and is eliminated from the cycle in liquid form from this condensate return line (just as happens in the rest of the configurations).

When a closed cycle is implemented in accordance with Configuration-4, there are no burners which supply matter to the Combined Cycle continuously, and therefore no type of residue is obtained continuously from it either.

In view of this, the only equipment of the Combined Cycle through which there can be circulation of $CO_2$ is:

When the main heat Source (101) is made up of a burner (of some fuel other than $H_2$): The Burner (101) itself, the Turbine TAT (102), the CRC (103), the condensation exchanger Element (106) and finally, the Element (107) whence the $CO_2$ is eliminated from the cycle.

When the Power Cycle has another burner playing the role of supplementary heat Source (132), in addition to all the equipment cited previously, there is circulation of $CO_2$ through the supplementary Burner (132), the Turbine TAP (122), the Reheater (134) and the Turbine TPI (135)—considering that the Power Cycle can also include the latter two optional elements—

When the Power Cycle is implemented according to Configuration-3, in addition to in the foregoing equipment, there is circulation of $CO_2$ through the Fan (104) and the condensation exchanger Element (105).

According to an additional alternative, this vapor generated in the Element (112) can be carried to the Secondary Rankine Cycle to be finally expanded in the Turbine TBP (127).

This option corresponds to the additional aspects with Configuration-5, shown in FIG. 6.

Additional Modified Configuration-4

According to additional particular aspects, in configuration-4, the installation may comprise, in addition:

A new optional Bypass line between the steam outlet of the TPI Turbine (135) and the steam inlet of the TBP Turbine (127), as shown in FIG. 7.

Configuration-5 is the preferred aspect of the present teaching as it is the most complete and because it includes all the elements of which the present teaching consists, whether these elements are considered to be essential or optional. It enables both closed cycle and semi-closed cycles to be implemented, using any type of fuel that the remaining configurations can employ.

Configuration-5 includes all the elements of configuration 3, and in addition, requires two specific pieces of equipment:

136: Superheater for the vapor generated in the Element (112). This element (136) consists of a coil situated inside the CRC (103) which receives saturated vapor from the Element (112), and whose mission is to raise its temperature so it can then be expanded in another Turbine (137) before it enters the Secondary Rankine Cycle.

137: Turbine for the vapor generated in the Element (112). Turbine (137) will only be present, and optionally, in the case of configuration-6. This Turbine (137) consists of an additional turbine whose outlet vapor pressure matches the pressure and temperature of the vapor entering the Turbine TBP (127). When it expands in the Turbine (137), the vapor generates additional work which is furnished to the common power Shaft (130) and the outlet of this turbine connects with the inlet to the Turbine TBP (127) to continue expanding together with the vapor of the secondary Rankine cycle from the Superheater (126).

To establish the essential matter balance, whenever additional vapor is introduced into the secondary Rankine cycle, it is required that there exists a bypass line in the impulsion line of the Pump (123) which returns this flow to feed the constituent basic Rankine cycle in the form of water in a liquid state.

In all the cases in which the Installation has a Superheater (136) and a Turbine (137) for the regenerated vapor, there is a bypass line to the aspiration of the Pump (109) after the impulsion line of the condensate Pump (123).

For the Compressor (115) to work according to this Configuration-5 shown in FIG. 6, it is necessary for this Compressor (115) to have an additional first stage of compression to raise the pressure of the vapor entering it from the element (112) and match this with the pressure of the vapor entering the Compressor (115) from the Element (114).

The Installation according to the present teaching, whatever its design configuration, can be connected energetically with the outside only via:
- the heat Sources (101) and (132) as the only possible entry points for energy into the Combined Cycle;
- The points by which energy leaves the cycle, in addition to the inevitable real losses: the heat lost through the Sink (128), the net mechanical work obtained from the power Shaft (130) and the useful heat obtained for "cogeneration".

According to additional particular aspects, compatible with any of those described above, the installation further comprises,
- A Preheater (138) of the feed water prior to entering the Preheater (112). The Preheater (138) is located inside the CRC (103) and serves to increase the temperature of the water before being sent to the Preheater (112). Water driven by the pump (111) enters to the Heater (138) and the water heated in the Preheater (138) is sent to the inlet of the Preheater (112).

According to additional particular aspects, compatible with any of those described above, the installation further comprises,
- an additional turbine TMP (139) arranged between the superheaters (121), the high pressure turbine (122), and the element (132), The additional turbine TMP (139) of the fundamental (maximum pressure) constituent Rankine cycle, performs the function of generating work following the fundamental constituent Rankine cycle. According to this aspect, the TMP Turbine (139) is located at the exit of the tubular pipes of the last Superheater (121), leaving the Supplementary heat Source (132) downstream. When the TMP Turbine (139) is available, it works at the maximum pressure of the power cycle, exceeding the operating pressure of the Turbine (122), in which case, this Turbine (122) is no longer the TAP turbine that works at the highest pressure of the whole installation.

The TMP Turbine (139) receives steam from a bypass line from the superheated steam outlet coming from the Superheater (121) and the exhaust steam is sent to the Supplementary heat source (132).

According to additional particular aspects, compatible with any of those described above, the installation further comprises elements (140), (141) and (142), defined as follows
- An additional heat recovery conduit, CRC-2 (140). The CRC-2 corresponds to the gas side of an additional heat exchanger that recovers exhaust gas heat from the TPI Turbine (135). This heat contained in the turbine gases is used in the CRC-2 (140) to generate the additional steam of the essential constituent Rankine cycle by means of the additional Evaporator and Superheater tubular pipes (141). It also serves to heat a nitrogen superheater coil (146) when, optionally, the installation has an integrated ASU plant (143).

Finally, the water vapor always leaves the CRC-2 (140) to be sent to an additional reheater coil (142) with sufficient pressure to be able to subsequently reach the essential heat source (101).

An additional Evaporator and Superheater Tubular Pipe (141), which constitutes the heat exchange element located inside the CRC-2 (140). The additional Evaporator and Superheater Tubular pipe (141) generates additional steam under pressure from the constituent fundamental Rankine cycle, so it is necessarily connected in parallel with the Economizer (120) at the inlet and with the Superheater (121) at the steam outlet.

Water from the pump (119) enters the evaporator and superheater tubular pipes (141) and finally superheated steam comes out and is sent to the TAP Turbine (122) or to the supplementary heat source (132), or to the TMP Turbine (139).

an additional steam superheater (142) is the heat exchange element located inside the hottest zone of the CRC (103). The Reheater (142) has the task of raising the temperature of the steam leaving the CRC-2 (140) before being sent to the essential heat Source (101). Optionally, also, when this Reheater (142) is present, it can heat the steam leaving the final vapor compressor (117) prior to its entry into the Essential heat source (101), which is shown in FIG. 7, by means of the ducts connecting the aforementioned elements (142), (117) and (101).

According to additional particular realizations, compatible with any of those described above, the installation further comprises elements (143), (144), (145), (146) and (147), defined below:
- an integrated air separation plant (143)—ASU (air separation unit)—optional. This plant confers the capability to perform an optional air separation procedure whose purpose is to provide the necessary Oxygen combustion in case fuels are used in the heat sources (101) and (132) of the cycle.

This ASU plant is connected to the power shaft (130) of the power cycle from which it receives the mechanical work it needs to operate.

In addition to this Oxygen, Nitrogen (and other atmospheric gases) is obtained from the ASU plant (143) as a by-product. In the optional case of having an integrated ASU plant, the generated Nitrogen can be heated by means of additional exchangers (144-145) and (146) of the power cycle. Finally, the heated nitrogen is sent to the nitrogen turbine (147).

A Nitrogen preheating coil (144) from an optional ASU plant (143). This coil (144) together with an additional condensing duct (145) for Nitrogen preheating, constitute a heat exchanger. The cryogenic nitrogen obtained in an ASU plant (143) is circulated through the coil (144) to preheat it to near ambient temperatures. The gaseous nitrogen after being preheated in this coil (144) is sent to the nitrogen superheater (146) to further increase its temperature before passing to the Nitrogen Turbine (147).

An additional condensing duct (145) for nitrogen preheating. This additional duct (145) together with the Coil (144) constitute a heat exchanger. The additional duct (145) is a section of duct that takes part of the exhaust steam flow, through a Bypass line that is located after the TBP Turbine (127) and, in it, condensation heat is transferred to the preheater coil (144).

Condensed water comes out from the additional duct (145), which is sent to the suction of the Pump (123) through a Bypass, to be later returned to the low pressure steam cycle. The additional duct (145) works in parallel with the heat sink condenser (128).

A Nitrogen Reheater Coil (146), which is a heat exchange element housed inside the CRC-2 (140) from which it receives heat to reheat the Nitrogen stream coming from a Coil (144) when an integrated ASU plant (143) is provided. The hot Nitrogen output from this Nitrogen reheater coil (146) is sent to a Nitrogen Turbine (147), which is mechanically coupled to the power shaft (130) to generate additional work.

An additional Nitrogen Turbine (147), installed in case there is the integrated ASU plant (143) to reuse the enthalpy of the Nitrogen obtained as a by-product, previously heated in the additional exchangers (144-145) and (146). This Turbine (147) is connected to the power shaft (130) of the cycle to provide an additional amount of mechanical work. To the Turbine (147) enters the Nitrogen superheated in the element (146) and exits the free gas to the atmosphere.

For any configuration of the plant described in this report, the plant may also include a new bypass line between the condensate pump drive (129) and the suction of the feed water pump (119) of the fundamental constituent Rankine cycle (as shown in FIG. 7).

Determination of the Maximum Theoretical Performance of the Installation of the Present Teaching in Semi-Closed Cycle The maximum theoretical performance of an Installation generating useful energy from heat energy from fuels according to the present teaching can be estimated very simply and approximately using the present procedure:

As an example, the calculation of the theoretical performance of the cycle of the present teaching, employing only pure hydrogen as fuel, is carried out, with the following considerations:

The "useful energy" produced by the Installation is considered to be the sum of the heat taken from the CRC (103) for use external to the cycle in the form of "cogeneration" by means of the Element (133), plus the net mechanical work emerging from the Combined Cycle through its power Shaft (130), It is considered that there are no "real losses" and the Combined Cycle only loses heat energy through the Condenser (128) that performs the function of heat sink.

The calculations are taken to refer to 1 Kg of condensate in the return line with:

"X" the specific fuel: the number of kg of fuel burned for each 1 kg of "return condensate" water that returns to the cycle after the vacuum Condenser (128);

"PCS" the higher heating value of $H_2$, whose value is considered to equal 142,200 kj/kg "PCI" the lower heating value of $H_2$, whose value is considered to equal 120,240 kj/kg "$PCS_{H2O}$" is determined as the higher heating value of the specific fuel (for each 1 kg of water generated), considering that in the combustion reaction, for each 1 kg of $H_2$ that is burned, in stoichiometric terms, 9 kg of $H_2O$ are formed, so that:

$$PCS_{H2O} = 15{,}800 \text{ kj/kg}_{H2O \text{ generated}}$$

$$PCI_{H2O} = 13{,}360 \text{ kj/kg}_{H2O \text{ generated}}$$

"$\Delta H_{VC}$" is determined as the specific vapor condensation enthalpy gap in the heat Sink (128), considering the calculation for a notional theoretical Condenser implementing a vapor condensation enthalpy gap coinciding with the difference between $PCS_{H2O}$ and $PCI_{H2O}$, then:

$$\Delta H_{VC} = PCS_{H2O} - PCI_{H2O} = 2440 \text{ kj/kg}_{H2O}$$

"$M_V$" is determined as the amount of "condensed" vapor in the heat Sink (128); this quantity will be equal to 1 kg of water that is returned to the cycle, plus the amount of water formed in the combustion of $H_2$ (X) and which is eliminated from the cycle:

$$M_V = 1 + X \text{ (kg}_{H2O}\text{)}$$

"Lost energy" is determined, as the energy eliminated in the Condenser (128):

$$\text{Lost energy} = M_V * \Delta H_{VC} = (1+X)*(\Delta H_{VC}) = (1+X)* (PCS_{H2O} - PCI_{H2O})$$

$$\text{Lost energy} = (1+X)*2440 \text{ kj/kg}_{H2O}$$

The "Useful energy" of the cycle is determined, considering that "the energy entering is the same as the energy leaving the Cycle".

Useful energy = Combustion energy − Heat eliminated in Sink (128)

Useful energy $(kj/kg_{H2O}) =$
$$(X*PCS_{H2O}) - 2440*(1+X) = X*(PCS_{H2O} - 2440) - 2440$$

Useful energy $(kj/kg_{H2O}) = (X*PCI_{H2O}) - 2440$

The Performance of the Installation "$\eta_{PCS}$" with respect to the PCS is determined from the equation:

$$\eta_{PCS} = \frac{\text{Useful energy}}{\text{Combustion energy}} = \frac{(X*PCI) - 2440}{X*PCS}$$

$$\eta_{PCS} = \frac{PCI}{PCS} - \frac{2440}{PCS} * \frac{1}{X}$$

Replacing $PCS_{H2O}$ and $PCI_{H2O}$ by their numerical values:

$$\eta_{PCS} = \frac{13360}{15800} - \frac{2440}{15800} * \frac{1}{X}$$

-continued $$\eta_{PCS} = 0{,}8456 - 0{,}1544 * \frac{1}{X}$$

The Performance of the Installation "$\eta_{PCI}$" with respect to the PCI, which is what is habitually used as reference, is given by the expression:

$$\eta_{PCI} = \frac{\text{Useful energy}}{PCI} = \frac{(X*PCI) - 2440}{X*PCI}$$

$$\eta_{PCI} = \frac{PCI}{PCI} - \frac{2440}{PCI} * \frac{1}{X}$$

Replacing $PCI_{H2O}$ by its numerical value:

$$\eta_{PCI} = 1 - \frac{2440}{13360} * \frac{1}{X}$$

$$\eta_{PCI} = 1 - 0{,}1826 * \frac{1}{X}$$

The two final equations for the performance $\eta_{PCS}$ and $\eta_{PCI}$, give a very approximate result for the performance of the Combined Power Cycle of the present teaching. While it is true that these are not rigorously exact, these expressions yield the following conclusion: the performance of the Combined Cycle of the present teaching varies directly with the specific fuel burned. That is, the performance of the cycle rises as the specific consumption of fuel in the cycle does.

Nevertheless, it is not feasible to increase the specific consumption of fuel if a series of fundamental thermodynamic constraints to which the Combined Cycle is inexorably subject are not satisfied.

One of these fundamental constraints is that, in the Combined Cycle, it is imperative to fulfil the principle of conservation of energy, according to which the energy entering the Combined Cycle is always identical to the energy that leaves it. Pursuant to this principle, increasing the specific consumption of fuel could mean, depending on the design parameters of the Power Cycle, an excess of calorific energy which cannot be captured by the Evaporator and Superheater (121) of the constituent basic Rankine cycle, in which case it will be indispensable to provide some procedure for evacuating heat to the outside and/or some way of reducing the entry of heat into the CRC (103).

Some of the aspects of the Combined Cycle described earlier which unavoidably evacuate one part of the heat outside the Combined Cycle can avail of a heat exchanger Element (133) to carry out this function of evacuating heat to the outside but doing so at a temperature sufficient for this to be useful for meeting the heat demand of certain industrial processes, thus constituting a procedure of "cogeneration".

In those situations, in which it is unavoidable to reduce the entry of heat into the CRC (103), which can occur, especially at transitory moments or under changes of load, the configurations of the Power Cycle can avail of a "vapor relief system" at the outlet from the Turbine TAP (122) which reduces the amount of vapor entering the heat Sources (101) and (132) and therefore also entering the CRC (103). Such a vapor relief system increases a Reheater (134) and an auxiliary Turbine TPI (135) whose outlet vapor ends up being injected at some point of the final section of the CRC (103). It should be highlighted that this vapor relief system to the heat Sources does not represent any kind of improvement with respect to the mechanical performance of the Combined Cycle, although it can be very useful to enable the Installation to be modulated and change its load and, in addition, it makes possible certain design configurations of the Combined Cycle with a twin heat source and a very high yield of useful energy.

According to additional particular aspects, the procedure for the generation of energy based on a Combined Cycle which is carried out by means of the installation defined above, comprises
- carrying out a closed constituent Brayton or oxy-combustion cycle, regenerated by the action of the heat pump using water as thermal fluid, and producing mechanical energy in the high temperature turbine (102),
- carrying out a constituent Rankine cycle interconnected with the previous Brayton cycle, and exchanging matter and energy with it, since both use water as a common heat transfer fluid and producing mechanical energy in the TAP turbine (122),
- driving a heat pump (200) which exchanges energy with the constituent Brayton cycle
- obtain liquefied $CO_2$ in the regeneration Condenser (107)
- recover from the liquefied $CO_2$ adiabatic heat of compression between the successive stages by transferring it to the Condenser (107) so that the adiabatic heat cooling between the successive stages of compression is carried out at the same operating temperature of the cold reservoir of the heat pump which varies between 80° C. and 120° C.

According to additional particular aspects, the procedure for the generation of energy comprises:
- preheating the water to the preheater (138) by means of a bypass line from the impulsion of the regeneration condensate Pump (111),
- heating the water that has entered the preheater (138) prior to entry into the preheater (112),
- to discharge the water heated in the preheater (138) through a line connecting with the water inlet line to the preheater (112).

According to additional particular aspects, the procedure for the generation of energy comprises connecting in series the impulsion of pump (129) with the pump suction (119) by means of a bypass line.

According to additional particular aspects, the procedure for the generation of energy comprises connecting the steam outlet of the TPI Turbine (135) with the inlet to the TBP Turbine (127) by means of a bypass line.

According to additional particular aspects, the procedure for the generation of energy comprises:
- arranging an additional heat exchanger consisting of the additional heat recovery conduit, CRC-2 (140) and the turbine (135)
- generating additional superheated steam, coming from the feed water of the fundamental constituent Rankine cycle driven by the Pump (119), using part of the heat contained in the exhaust steam of the TPI Turbine (135) by means of an exchanger constituted by the elements (140) and (141).

According to additional particular aspects, the procedure for the generation of energy comprises regenerating superheated water vapor in the Steam Superheater (142):
- pressurized water vapor at the outlet of the Compressor (117) before entering the essential heat Source (101), and the exhaust steam from the additional heat recovery conduit, CRC-2 (140) before entering the essential heat source (101).

According to additional particular aspects, the procedure for the generation of energy comprises:
arranging a TMP Turbine (139) receiving all or part of the steam coming from the Superheater (121) and.
sending exhaust steam from this Turbine (139) to the secondary heat source (132).

According to additional particular aspects, the procedure for the generation of energy comprises:
separating air in an air separation plant—ASU (143)
providing the combustion Oxygen necessary in case fuels are used in the heat sources of the cycle (101) and (132),
heating the Nitrogen obtained as a by-product of the ASU plant (143) by means of the Nitrogen preheater coil (143) and then through the Nitrogen reheater coil (146) and then expanding it independently in a Nitrogen Turbine (146) to generate additional work to the Power Shaft (130).

The invention claimed is:

1. An installation to generate mechanical energy using a Combined Power Cycle including at least:
means to implement a closed or semi-closed regenerative constituent Brayton cycle which uses water as thermal fluid, said means to implement a closed or semi-closed regenerative constituent Brayton cycle comprising:
an essential heat source (101)
a high temperature turbine TAT (102)
a $CO_2$ liquefaction plant (107) comprising means for compression-intercooling-stripping facility
a regeneration reboiler (113)
a regeneration condensate pump (111)
a heat recovery exchanger (112) and
a condensate pump (129)
means to implement at least one constituent basic Rankine cycle, interconnected with the regenerative constituent Brayton cycle, said means to implement at least one constituent basic Rankine cycle comprising
economiser Coils (120) located inside a heat recovery Conduit CRC (103),
Evaporators and Superheaters for the water vapour (121) located inside the heat recovery Conduit CRC (103),
a high-pressure Turbine TAP (122)
a heat sink (128)
a condensate return pump (109)
a condensate return Preheater (110)
one condensation heat exchanger Element (106)
a feedwater pump (119) and
a power shaft (130) and
a heat pump (200) capable of working between the temperatures between which a cold reservoir (201) and a hot reservoir (210) work, which makes up a closed circuit that regenerates the regenerative constituent Brayton cycle.

2. The installation for the generation of energy according to claim 1,
wherein the cold reservoir (201) that works at temperatures between 80° C. and 120° C.,
wherein the hot reservoir (210), that works at a temperature higher than the temperature at with the cold reservoir works,
wherein the heat pump exchanges heat exclusively with the Power Cycle and
obtains mechanical work with the Power Shaft (130).

3. The installation for the generation of energy according to claim 1, wherein the essential heat Source (101), which is selected from:
a heat exchanger and
an oxy-combustion burner,
such that in the essential Heat Source (101), currents from the two cycles, the constituent Brayton and the constituent basic Rankine, come together.

4. The installation for the generation of energy according to claim 1, in which the regenerative Brayton cycle is semi-closed, with oxy-combustion and intrinsic capture of $CO_2$.

5. The installation for the generation of mechanical energy, according to claim 1,
wherein the $CO_2$ liquefaction plant receives work from the power shaft (130) and condenses gases in multiple stages and only transfers the heat released in the successive stages of compression of that $CO_2$ liquefaction plant to the cold reservoir (201) of the heat pump (200),
wherein the Reboiler (113), with which heat is returned returns heat to the Power Cycle from the hot reservoir (210) of the heat pump (200),
wherein the regeneration condensate Pump (111) drives the condensate obtained in the bottom of the $CO_2$ liquefaction plant (107), and makes it flow towards the Reboiler (113),
wherein the heat recovery Conduit (CRC) (103) generates water vapor,
wherein the high-pressure Turbine TAP (122) sends water vapor to the essential Heat source (101), and the high-temperature Turbine TAT (102) sends vapor to the heat recovery Conduit CRC (103),
wherein at least the common Power Shaft (130) obtains useful mechanical energy of the cycle,
wherein the heat Sink (128) condenses vapor in the bottom of, or after, the heat recovery conduit CRC (103),
wherein the condensation heat exchanger Element (106), before the entry of vapor and gases to the $CO_2$ liquefaction plant (107) relinquishes heat to the condensate return Preheater (110),
wherein the condensation heat exchanger Element (114), provided at the outlet of the Reboiler (113) relinquishes heat to the heat recovery exchanger (112) which in addition to preheating the intake water for the Reboiler (113) itself, heats the feedwater for the feedwater pump (119) and generates a vapor which is directed:
to a compressor (115) and/or
to a third turbine (137) after its temperature has been raised in a superheater (136), further comprising
one bypass line that joins the constituent Brayton cycle with the constituent basic Rankine cycle, situated between the impulsion line of the regeneration condensate Pump (111) and the aspiration of the feedwater Pump (119).

6. The installation for the generation of energy according to claim 5, in which the Power Cycle is semi-closed, using oxy-combustion it employs carbonated fuels, which includes:
an outlet for the $CO_2$ produced in the combustion, situated in the $CO_2$ liquefaction plant (107), and
an outlet for the liquid water produced by the combustion in the condensate return line from the bottom of the heat recovery conduit CRC (103).

7. The installation for the generation of energy according to claim 5, in which the power cycle is or semi-closed, using hydrogen as its sole fuel, in which the heat sink consists of a secondary Rankine cycle with the same fluid as the rest of the power cycle, being interconnected with the installation by means of the impulsion line of the condensate return Pump (109) and by a line that reaches the heat recovery Conduit CRC (103).

8. The installation for the generation of energy according to claim 5 further comprising an element for the supply of additional heat by a supplementary heat source (132) situated between the evaporators and superheaters for the water vapor (121) and the high pressure turbine TAP (122).

9. The installation for the generation of energy according to claim 5, further comprising the vapor compressor (115) or several vapor compressors (117), connected in series, situated at the vapor outlet of the condensation heat exchanger Element (114), and prior to the entry of vapor into the essential heat Source (101).

10. The installation for the generation of energy according to claim 9, further comprising a vapor cooling exchanger (116/118) between the Compressors connected in series (115) and (117).

11. The installation for the generation of energy according to claim 5 further comprising, in the condensate line from the bottom of the condensation heat exchanger Element (114), a return line to the Reboiler (113) along which part of this condensate is sent to the Reboiler itself.

12. The installation for the generation of energy according to claim 5, further comprising an "auxiliary heat relief system" formed by:
- a vapor Reheater (134) that receives vapor extracted from the high pressure Turbine TAP (122) and
- an auxiliary Turbine TPI (135) whose outlet vapor is injected at some point of the final section of the heat recovery conduit CRC (103).

13. The installation for power generation according to claim 12, further comprising:
- an additional heat recovery conduit, CRC-2 (140), which corresponds to the gas side of an additional heat exchanger that recovers exhaust gas heat from the auxiliary Turbine TPI (135), such that this heat contained in the turbine gases is used in the additional heat recovery conduit, CRC-2 (140) to generate the additional steam of the essential constituent Rankine cycle by means of additional Evaporator and Superheater tubular pipes (141), and such that the water vapor always leaves the additional heat recovery conduit, CRC-2 (140) to be sent to an additional reheater coil (142) with sufficient pressure to be able to subsequently reach the essential heat source (101),
- the additional Evaporator and Superheater Tubular Pipe (141), which constitutes the heat exchange element located inside the additional heat recovery conduit, CRC-2 (140) that generates additional steam under pressure from the constituent basic Rankine cycle and are connected in parallel with the Economizer coils (120) at the inlet and with the Evaporators and Superheaters for the water vapor (121) at the steam outlet,
- the additional reheater coil (142) is the heat exchanger element located inside the hottest zone of the heat recovery conduit CRC (103), and which raises the temperature of the steam leaving the additional heat recovery conduit, CRC-2 (140) before being sent to the essential heat Source (101).

14. The installation for power generation according to claim 13, further comprising:
- an integrated ASU plant (143)-ASU (air separation unit), connected to the power shaft (130) of the power cycle from which it receives the mechanical work it needs to operate,
- the Nitrogen preheating coil (144) from the integrated ASU plant (143) which together with an additional condensing duct (145) for Nitrogen preheating, constitute a heat exchanger,
- a condensing duct (145) for nitrogen preheating, which together with the nitrogen preheating Coil (144), constitute a heat exchanger and is a section of duct that takes part of the exhaust steam flow, through a Bypass line that is located after a Turbine TBP (127),
- a Nitrogen Reheater Coil (146), which is a heat exchange element housed inside the additional heat recovery conduit, CRC-2 (140) from which it receives heat to reheat the Nitrogen stream coming from the nitrogen preheating Coil (144) when the integrated ASU plant (143) is provided,
- a Nitrogen Turbine (147), to reuse the enthalpy of the Nitrogen obtained as a by-product, previously heated in the nitrogen preheating coil (144), the condensing duct (145) and the nitrogen reheater coil (146), such that the nitrogen Turbine (147) is connected to the power shaft (130) of the cycle to provide an additional amount of mechanical work.

15. The installation for power generation according to claim 14, further comprising a Bypass line between the steam outlet of the auxiliary Turbine TPI (135) and the steam inlet of the Turbine TBP (127).

16. The installation for the generation of energy according to claim 5, further comprising:
- a Fan (104), which takes the outlet vapors from the heat recovery Conduit CRC (103) and compresses them to send them to a condensation exchanger (105), housing at least one component section of an evaporator (125) of an independent secondary Rankine cycle.

17. The installation for the generation of energy, according to claim 14, further comprising:
- a heat Exchanger (108/124) in which, on the shell side (108), the condensate from the condensation exchanger (105) is cooled, and in whose interior there is housed an economizer (124) of the independent secondary Rankine cycle.

18. The installation for the generation of energy according to claim 5, in which the heat pump (200) further comprises:
- the cold reservoir (201) of gaseous ammonia, acting as cold reservoir, which exchanges heat solely with the $CO_2$ liquefaction plant (107),
- a secondary Generator (202), which receives a liquid phase from the hot reservoir (210), and sends the ammonia vapor to ammonia Compressors (203), while the remaining ammonia solution is sent to the cold reservoir (201),
- at least the two ammonia Compressors (203) are connected in series, with cooling in between and receive ammonia from the cold reservoir (201) and the secondary Generators (202)
- a compressed ammonia Condenser (207) which receives the ammonia compressed and cooled in a supercritical ammonia Evaporator (209), and transmits the heat to the secondary Generator (202),
- a Pump (208) for ammonia condensate from the compressed ammonia Condenser (207), which impels it to the supercritical ammonia Evaporator (209), where ammonia vapor is produced at supercritical pressure, the hot reservoir (210), which receives the vapor from the supercritical ammonia Evaporator (209) and dissolves it in an aqueous phase, and a transfer Pump (215) which transfers the dilute ammonia solution from the cold reservoir (201) to the hot reservoir (210).

19. The installation for the generation of energy, according to claim 16, in which the heat pump further comprises:

a heat Exchanger (213/214) between a dilute ammonia solution from the the cold reservoir (201) and a concentrated ammonia solution from the hot reservoir (210), a Coil (211) housed inside the supercritical ammonia Evaporator (209), which harnesses the heat contained in the concentrated ammonia solution from the hot reservoir (210), to produce supercritical ammonia, a first cooling Coil (206) for the compressed ammonia from the Compressors (203), which provides heat to the supercritical ammonia Evaporator (209).

20. The installation for the generation of energy, according to claim 19, wherein the heat pump (200) further comprises:

an additional Dilute Dilution Pump (219), which is connected in series with the transfer pump (215) and is located between the heat exchanger elements (214) and (216), in the dilute solution line to further increase the pumping pressure immediately before the dilute dilution enters the hot reservoir (210)

Additional economizer (220), that is an additional exchanger element that transfers heat to the reboiler (113) and transmits heat to the hot reservoir (210) of the power cycle; the Economizer (220) receives part of the hot concentrated solution leaving the hot reservoir (210) and is arranged downstream of the hot reservoir (210) through a bypass line and the concentrated solution coming from the additional economizer (220) is directly sent to the cold reservoir (201), Dilute solution preheater (221) is in the dilute solution line coming out of the cold reservoir (201), located between the transfer pump (215) and the heat exchanger (214) to preheat this solution, Additional concentrated solution subcooler coil (222), which, together with the dilute solution preheater (221), constitute an additional heat exchanger, wherein the additional subcooler coil (222) is fed from a bypass located in the concentrated solution line just downstream of the coil (211) which is housed inside the Supercritical Ammonia Evaporator (209), and the solution cooled flow exiting from the additional subcoiler coil (222) is distributed in two flow lines towards the cold reservoir (201) and the secondary generator (202) respectively.

21. The installation for the generation of energy, according to claim 18, further comprising:

one or two additional bypass lines, a $NH_3$ vapor outlet line from the secondary Generator (202) to the second stage of the ammonia Compressors (203), a dilution outlet line from the secondary Generator (202) to the dilute dilution line leaving the cold reservoir (201) located just downstream of the transfer pump (215).

22. The installation for power generation according to claim 18, further comprising:

an additional Preheater (138) of the feed water prior to entry into the heat recovery exchanger (112), such that the additional Preheater (138) is located within the heat recovery Conduit CRC (103).

23. The installation for power generation according to claim 5, further comprising:

an additional turbine TMP (139) arranged between the evaporators and superheaters for the water vapor (121), the high pressure turbine TAP (122), and the supplementary heat source (132), such that the additional turbine TMP (139) performs the function of generating work following the constituent basic Rankine cycle, receives steam from a bypass line which starts at the Evaporators and Superheaters for the water vapor (121), passes through the additional turbine TMP (139) and arrives at the Supplementary heat source (132).

24. The installation for power generation according to claim 5, further comprising:

a bypass line between the condensate pump (129) and the suction of the feed water pump (119) of the basic constituent Rankine cycle.

25. The installation for the generation of energy according to claim 1, further comprising a heat exchanger Element for cogeneration (133) provided inside the heat recovery Conduit CRC (103) from which it extracts useful heat energy.

26. A procedure for the generation of energy based upon the Combined Cycle which is implemented using the installation including at least:

means to implement a closed or semi-closed regenerative constituent Brayton cycle which uses water as thermal fluid, said means comprising:

an essential heat source (101)

a high temperature turbine TAT (102)

a $CO_2$ liquefaction plant (107) comprising means for compression-intercooling-stripping facility a regeneration reboiler (113)

a regeneration condensate pump (111)

a heat recovery exchanger (112) and a condensate pump (129)

means to implement at least one constituent basic Rankine cycle, interconnected with the regenerative constituent Brayton cycle, said means comprising economiser Coils (120), located inside a heat recovery Conduit CRC (103), Evaporators and Superheaters for the water vapour (121) located inside a heat recovery Conduit CRC (103), a high-pressure Turbine TAP (122)

a heat sink (128)

a condensate return pump (109)

a condensate return Preheater (110)

one condensation heat exchanger Element (106)

a feedwater pump (119) and a power shaft (130)

and a heat pump (200) capable of working between the temperatures between which a cold reservoir (201) and a hot reservoir (210) work, which makes up a closed circuit that regenerates the regenerative constituent Brayton cycle defined in claim 1.

27. The procedure according to claim 26, further comprising:

implementing the constituent Brayton cycle, closed or based on oxy-combustion, regenerated by the action of the heat pump (200) which uses water as thermal fluid and produces mechanical energy in a high-temperature Turbine TAT (102), implementing the constituent Rankine cycle interconnected with the foregoing Brayton cycle, and which exchanges matter and energy with it, as both use water as common thermal fluid, and produces mechanical energy at the high pressure Turbine TAP (122), using the heat pump (200) which exchanges energy with the constituent Brayton cycle to regenerate it and absorb mechanical energy in ammonia compressors (203) and carrying out a $CO_2$ liquefaction.

28. The procedure according to claim 27, in which fuels other than hydrogen are used, wherein the water vapor circulating through a $CO_2$ liquefaction plant (107) condenses completely as a consequence of the heat transmitted to the cold reservoir (210), leaving $CO_2$ as residue.

29. The procedure according to claim 28, further comprising:
condensing in a $CO_2$ liquefaction plant (107):
the water vapor at ambient pressure, relinquishing the heat obtained to the cold reservoir (201) of the heat pump (200) or
condensing the water vapor and the $CO_2$ relinquishing the heat obtained to the cold reservoir (201) of the heat pump (200),
and regenerating water vapor in the Reboiler (113) at a higher pressure than that at which it was condensed in a $CO_2$ liquefaction plant (107), using the heat provided by the hot reservoir (210) of the heat pump (200).

30. The procedure according to claim 28, further comprising:
the heat pump (200) is a refrigerating machine which functions by combining operations of compression and absorption, using $NH_3$ as thermal fluid and water as solvent,
the cold reservoir (201) of the heat pump (200) discharges the function of cold reservoir, absorbing the heat from the $CO_2$ liquefaction plant (107), exclusively,
the only cold reservoir of the heat pump (200) works at temperatures between 80° C. and 120° C.,
the hot reservoir (210) of the heat pump (200) transfers the heat to the Reboiler (113), exclusively,
in the heat pump (200), the compression of the $NH_3$ vapor takes place, in successive stages with cooling in between,
compressed ammonia vapor Condenser (207) of the heat pump (200) relinquishes all of the heat released by the secondary Generator (202), and
the supercritical ammonia Evaporator (209) of the heat pump (200) generates $NH_3$ in supercritical state with the heat
supplied to it by compressed ammonia cooling Elements: first coiling coil (204) and second coiling coil (206) between stages of compression and
with part of the latent heat held by the concentrated solution which emerges hot from the hot reservoir (210).

31. The procedure according to claim 26, in which the regeneration of the constituent Brayton cycle is conducted by the action of the heat pump (200), recycling the vapor condensation heat at the temperature of the cold reservoir (201) to subsequently return it to the cycle, by means of the hot reservoir (210), to regenerate water vapor at a higher pressure and temperature than those at which it was previously condensed.

32. The procedure according to claim 26, further comprising:
providing external energy from the essential heat Source (101), which is a pressurized burner when the cycle is semi-closed or a heat exchanger when the cycle is a closed cycle.

33. The procedure according to claim 26, which, without regard to the real losses, includes the use of a single heat Sink (128), by which the cycle transmits heat to the outside.

34. The procedure according to claim 33, in which the heat sink (128) of an independent secondary Rankine cycle performs the function of heat sink.

35. The procedure according to claim 26, further comprising using a heat recovery Conduit (103), the remaining heat from the outlet of the high temperature Turbine TAT (102) is used to generate superheated vapor of the constituent basic Rankine cycle.

36. The procedure according to claim 35, further comprising reducing the amount of vapor entering towards the essential heat Source (101), or towards the heat essential heat source (101) and the supplementary heat source (132), by means of an "auxiliary heat relief system" made up of a Reheater (134) and an auxiliary Turbine TPI (135), in such a way that an extraction of outlet vapor from the high pressure Turbine TAP (122) is performed, thus reducing the amount of heat entering the heat recovery conduit CRC (103).

37. The procedure according to claim 36, further comprising preheating the water entering a Reboiler (113) by means of the heat recovery exchanger (112) with heat from the condensation of the vapor that takes place in a condensation heat exchanger Element (114).

38. The procedure according to claim 37, further comprising raising the pressure of the vapor supplied by the heat recovery exchanger (112) and the pressure of the vapor from the Reboiler (113) and emerges from the condensation heat exchanger Element (114) using additional mechanical Compressors (115) and (117), connected in cascade, with intervening cooling and capable of supplying pressure sufficient to send this vapor to the essential heat Source (101).

39. The procedure according to claim 26, further comprising:
implementing an oxy-combustion Combined Cycle and which uses liquid or gaseous fuels, of general formula $C_xH_yO_z$, either pure or mixed, where x, y and z take values corresponding to real chemical compounds which are capable of burning with oxygen.

40. The procedure according to claim 26, wherein
the Combined Power Cycle burns only hydrogen, sends vapor directly from the heat recovery Conduit CRC (103) to the Turbine TBP (127) of the secondary Rankine cycle, which operates under vacuum conditions provided by the heat sink (128), from where the condensate is returned as feedwater to the constituent basic Rankine cycle.

41. The procedure according to claim 40, further comprising connecting the steam outlet of an auxiliary turbine TPI (135) with the inlet to the Turbine TBP (127) by means of a bypass line.

42. The procedure according to claim 26, further comprising aspirating the outlet gases from the heat recovery Conduit CRC (103), compressing them using a Fan (104) and sending them to a condensation exchanger Element (105), thus generating vapor in an Evaporator (125) of a secondary Rankine cycle.

43. The procedure for the generation of energy according to claim 26, further comprises:
carrying out the closed constituent Brayton or oxy-combustion cycle, regenerated by the action of the heat pump using water as thermal fluid, and producing mechanical energy in the high temperature turbine TAT (102), carrying out a constituent Rankine cycle interconnected with the previous Brayton cycle, and exchanging matter and energy with it, since both use water as a common heat transfer fluid and producing mechanical energy in the high pressure turbine TAP (122), driving a heat pump (200) which exchanges energy with the constituent Brayton cycle obtain liquefied $CO_2$ in the $CO_2$ liquefaction plant (107)

recover from the liquefied $CO_2$ adiabatic heat of compression between successive stages of compression by transferring it to the $CO_2$ liquefaction plant (107) so that the adiabatic heat cooling between the successive stages of compression is carried out at the same operating temperature of the cold reservoir of the heat pump which varies between 80° C. and 120° C.

44. The procedure according to claim 26, further comprising:

preheating the water to an additional preheater (138) by means of a bypass line from the impulsion of the regeneration condensate Pump (111), heating the water that has entered the additional preheater (138) prior to entry into the heat recovery exchanger (112), to discharge the water heated in the preheater (138) through a line connecting with the water inlet line to the heat recovery exchanger (112).

45. The procedure according to claim 26, further comprising connecting in series the impulsion of the condensate pump (129) with the feedwater pump (119) by means of a bypass line.

46. The procedure according to claim 26, further comprising:

arranging an additional heat exchanger consisting of the additional heat recovery conduit, CRC-2 (140) and an auxiliary turbine TPI (135)

generating additional superheated steam, coming from the feed water of the basic constituent Rankine cycle driven by the feedwater Pump (119), using part of the heat contained in the exhaust steam of the auxiliary Turbine TPI (135) by means of an exchanger constituted by the additional heat recovery conduit, CRC-2 (140) and Superheater tubular pipes (141).

47. The procedure according to claim 46, further comprising regenerating superheated water vapor in an additional heater coil (142) using pressurized water vapor at the outlet of a Compressor (117) before entering the essential heat Source (101), and the exhaust steam from the additional heat recovery conduit, CRC-2 (140) before entering the essential heat source (101).

48. The procedure according to claim 26, further comprising:

arranging an additional turbine TMP (139) receiving all or part of the steam coming from the Evaporators and Superheaters for the water vapor (121) and, sending exhaust steam from the additional turbine TMP (139) to a supplementary heat source (132).

49. The procedure according to claim 26, wherein the cycle is semi-closed, further comprising:

separating air in the integrated ASU plant (143)

providing the combustion Oxygen necessary in the essential heat source (101) and a supplementary heat source (132), heating the Nitrogen obtained as a by-product of the integrated ASU plant (143) by means of the Nitrogen preheater coil (144) and then through a Nitrogen reheater coil (146) and then expanding it independently in a Nitrogen Turbine (147) to generate additional work to the Power Shaft (130).

\* \* \* \* \*